United States Patent
Putnam et al.

(10) Patent No.: US 11,766,614 B1
(45) Date of Patent: Sep. 26, 2023

(54) UTILIZING MOBILE DEVICE CAPABILITIES TO KEEP A USER ENGAGED WITH A MOBILE APPLICATION

(71) Applicant: PJ HAMMER CORPORATION, Dallas, TX (US)

(72) Inventors: Pj Putnam, Dallas, TX (US); Ruben Hammer, Dallas, TX (US)

(73) Assignee: PJ HAMMER CORPORATION, Dallas, TX (US)

( * ) Notice: Subject to any disclaimer, the term of this patent is extended or adjusted under 35 U.S.C. 154(b) by 0 days.

(21) Appl. No.: 17/664,361

(22) Filed: May 20, 2022

(51) Int. Cl.
| A63F 13/533 | (2014.01) |
| G06F 3/01 | (2006.01) |
| G06T 7/73 | (2017.01) |
| A63F 13/79 | (2014.01) |
| A63F 13/65 | (2014.01) |

(52) U.S. Cl.
CPC ............ *A63F 13/533* (2014.09); *A63F 13/65* (2014.09); *A63F 13/79* (2014.09); *G06F 3/013* (2013.01); *G06T 7/73* (2017.01); *A63F 2300/308* (2013.01); *A63F 2300/5546* (2013.01); *A63F 2300/69* (2013.01); *G06T 2207/30201* (2013.01)

(58) Field of Classification Search
None
See application file for complete search history.

(56) References Cited

U.S. PATENT DOCUMENTS

| 2010/0035672 | A1* | 2/2010 | Root ................... G07F 17/3272 463/2 |
| 2010/0179867 | A1 | 7/2010 | Hughes et al. |
| 2012/0129585 | A1* | 5/2012 | Laycock ............... G06Q 10/10 463/9 |
| 2013/0073389 | A1 | 3/2013 | Heath |
| 2013/0085860 | A1 | 4/2013 | Summers et al. |
| 2013/0143182 | A1 | 6/2013 | Bruce |
| 2013/0267328 | A1* | 10/2013 | Heisler ............... G07F 17/3244 463/42 |
| 2014/0073410 | A1 | 3/2014 | Ramos et al. |
| 2014/0095337 | A1 | 4/2014 | Pigeon et al. |
| 2014/0309001 | A1 | 10/2014 | Root |
| 2015/0006280 | A1 | 1/2015 | Ruiz et al. |
| 2015/0185835 | A1* | 7/2015 | Ma ........................ G06V 40/193 345/156 |
| 2017/0021280 | A1* | 1/2017 | Sugavanam .......... A63F 13/335 |
| 2022/0121344 | A1* | 4/2022 | Pastrana Vicente ........................ G06F 3/04842 |

* cited by examiner

*Primary Examiner* — Jason T Yen
(74) *Attorney, Agent, or Firm* — KLEMCHUK PLLC

(57) ABSTRACT

Disclosed herein are systems and methods utilizing an application that utilizes the hardware and software capabilities of a mobile device to extend the time of user engagement. The hardware and software capabilities of the mobile device that are utilized can include gaze tracking, requiring user engagement for award redemption, requiring two-device confirmation in a trading system, blockchain tracking, geo-location reminders, Global Positioning System (GPS) reminders, and combinations thereof.

19 Claims, 27 Drawing Sheets

UTILIZING MOBILE DEVICE CAPABILITIES TO KEEP A USER ENGAGED WITH A MOBILE APPLICATION

FIELD

The disclosure relates to mobile applications, and more specifically to a mobile application utilizing device capabilities to interact with a user and keep the user engaged with the mobile application.

BACKGROUND

Research has shown the average person has more than 80 applications installed on their mobile device. While some of these applications may be system requirements that do not regularly require user engagement, the average person uses approximately 10 different applications per day and approximately 30 different applications per month. Most, if not all, of these applications utilize notifications to attempt to get a user to open and use those applications. At any time while using a mobile device, a user can receive notifications from any of the applications on their mobile device, which can pull attention and engagement from one application to another.

SUMMARY

The disclosed methods and systems provide a practical application by utilizing device capabilities to interact with a user and keep the user engaged with an event-related mobile application.

A first method can include one or more of: providing a virtual scoreboard with a graphical user interface on an application on a mobile device; displaying real-time information on the virtual scoreboard; receiving from the mobile device a user input for at least one of a plurality of units of gameplay within a prescribed time limit, wherein the plurality of units of gameplay are related to the real-time information; polling one or more data sources for updates to the real-time information; determining a target view point on a screen of the mobile device from a plurality of view points that a user looked at the most using gaze tracking; and moving information on the graphical user interface of the mobile device from a first position to a second position to encourage continued interaction with the virtual scoreboard wherein the second position is the target view point.

A first system can include one or more central processing servers in communication with at least one computer network and an application running on one or more mobile devices, wherein the central processing server is configured to: obtain real-time information from one or more data sources; present, via the application, a virtual scoreboard with a graphical user interface, wherein the virtual scoreboard is configured to display the real-time information and is configured to accept user input for a plurality of units of gameplay related to the real-time information within a prescribed time limit; receive and present, via the application, the user input for a plurality of units of gameplay, wherein the user input comprises a numeral from the one or more mobile devices; and a gaze tracking system that utilizes a camera of the one more mobile devices, wherein the camera uses one or more images of a user's eyes and facial features to determine a plurality of view points on a screen of the one or more mobile devices a user is looking; and wherein the application is configured to receive data from the gaze tracking system and change the graphical user interface of application seen by the user to present information to target view points from the plurality of view points determined to be viewed more frequently by the user to encourage continued interaction with the application.

A second method can include one or more of: providing a virtual scoreboard with a graphical user interface on a mobile device; displaying real-time information on the virtual scoreboard; receiving from the mobile device a user input for at least one of a plurality of units of gameplay within a prescribed time, wherein the plurality of units of gameplay are related to the real-time information; polling one or more data sources for updates to the real-time information; determining a user earned an award, associated with a merchant, based on the user input; and performing encrypted award redemption with a merchant server for the award.

A second system can include one or more central processing servers in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; and communicate with a merchant server associated with the award to redeem the award; and a user database configured to communicate with the central processing server.

A third method can include one or more of: providing a virtual scoreboard with a graphical user interface on a mobile device; displaying real-time information on the virtual scoreboard; receiving from the mobile device a user input for at least one of a plurality of units of gameplay within a prescribed time limit, wherein the plurality of units of gameplay are related to the real-time information; polling one or more data sources for updates to the real-time information; determining a user earned an award, associated with a merchant, based on the user input for one or more of the plurality of units of gameplay; providing a digital marketplace for users to trade earned rewards; requiring at least two mobile devices involved in a trade to confirm the trade; and during the step of requiring, displaying the updates to the real-time information.

A third system can include one or more central processing servers in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information and is configured to accept user input for a plurality of units of gameplay related to the real-time information within a prescribed time limit; receive and present, via the application, the user input for a plurality of units of gameplay, wherein the user input comprises a numeral from the one or more mobile devices; poll one or more data sources for updates to the real-time information; determine the user input matches the real-time information for one or more of the plurality of units of gameplay; and distribute an award for matching input; provide a digital marketplace, configured to allow users to trade earned awards; complete a trade between users who have agreed to trade earned awards; and a user database configured to communicate with the central processing server; wherein to complete a trade, the central processing server requires at least two mobile devices to confirm the trade.

A fourth method can include one or more of: providing a virtual scoreboard with a graphical user interface on a mobile device; generating a player registration number associated with a mobile device and annotating the player registration number on a distributed ledger; displaying real-time information on the virtual scoreboard; receiving from the mobile device a user input for at least one of a plurality of units of gameplay within a prescribed time limit, wherein the plurality of units of gameplay are related to the real-time information; polling one or more data sources for updates to the real-time information; generating one or more award numbers and annotating the one or more award numbers on the distributed ledger; determining a user earned an award, associated with a merchant, based on input for one or more of the plurality of units of gameplay; annotating the award and the player registration number associated with the user on the distributed ledger; and providing a digital marketplace configured to allow users to donate awards, trade awards, gift awards, sell awards, buy awards, redeem awards, and combinations thereof; wherein the distributed ledger is used to track the award and the distributed ledger is annotated each time the award is accessed or moved.

A fourth system can include one or more central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information and is configured to accept user input for a plurality of units of gameplay related to the real-time information within a prescribed time limit; receive and present, via the application, the user input for a plurality of units of gameplay, wherein the user input comprises a numeral from the one or more mobile devices; poll one or more data sources for updates to the real-time information; determine the user input matches the real-time information for one or more of the plurality of units of gameplay; distribute an award for matching input; and provide a digital marketplace configured to allow users to donate awards, trade awards, gift awards, sell awards, buy awards, redeem awards, and combinations thereof; a user database configured to communicate with the central processing server; and a distributed ledger networked with the central processing server, wherein the central processing server can annotate player registration numbers, Award Numbers, continuing actions, closing actions, and combinations thereof on the distributed ledger.

A fifth method can include one or more of: providing a virtual scoreboard with a graphical user interface on a mobile device; displaying real-time information on the virtual scoreboard; receiving from the mobile device a user input for at least one of a plurality of units of gameplay within a prescribed time, wherein the plurality of units of gameplay are related to the real-time information; polling one or more data sources for updates to the real-time information; determining a user earned an award, associated with a merchant, based on the user input; accessing a location of the mobile device; sending a notification to the mobile device when the mobile device is within a specified distance of a merchant location associated with the award; and presenting the award and a second virtual scoreboard for a rules-based event when the notification is selected.

A fifth system can include one or more central processing servers in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; access a location of the mobile device; provide a notification that a location for a merchant associated with the award is close; and provide directions to the location of the merchant.

A sixth method can include one or more of: providing a virtual scoreboard with a graphical user interface on a mobile device; displaying real-time information on the virtual scoreboard; receiving from the mobile device a user input for at least one of a plurality of units of gameplay within a prescribed time, wherein the plurality of units of gameplay are related to the real-time information; polling one or more data sources for updates to the real-time information; determining a user earned an award, associated with a merchant, based on the user input; accessing a GPS module of the mobile device; controlling the GPS module of the mobile device to transmit a signal at an interval from the mobile device to one or more merchant servers; receiving a message from one of the one or more merchant servers, wherein the message contains directions to a location of the merchant; and sending the message to the mobile device.

A sixth system can include one or more central processing servers in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; access a GPS module of the mobile device; receive a message from the one or more merchant servers; and send the message to the mobile device.

BRIEF DESCRIPTION OF THE DRAWINGS

The present system and method will be more fully understood by reference to the following detailed description of the preferred embodiments of the present system and method when read in conjunction with the accompanying drawings, wherein.

Figure 1:
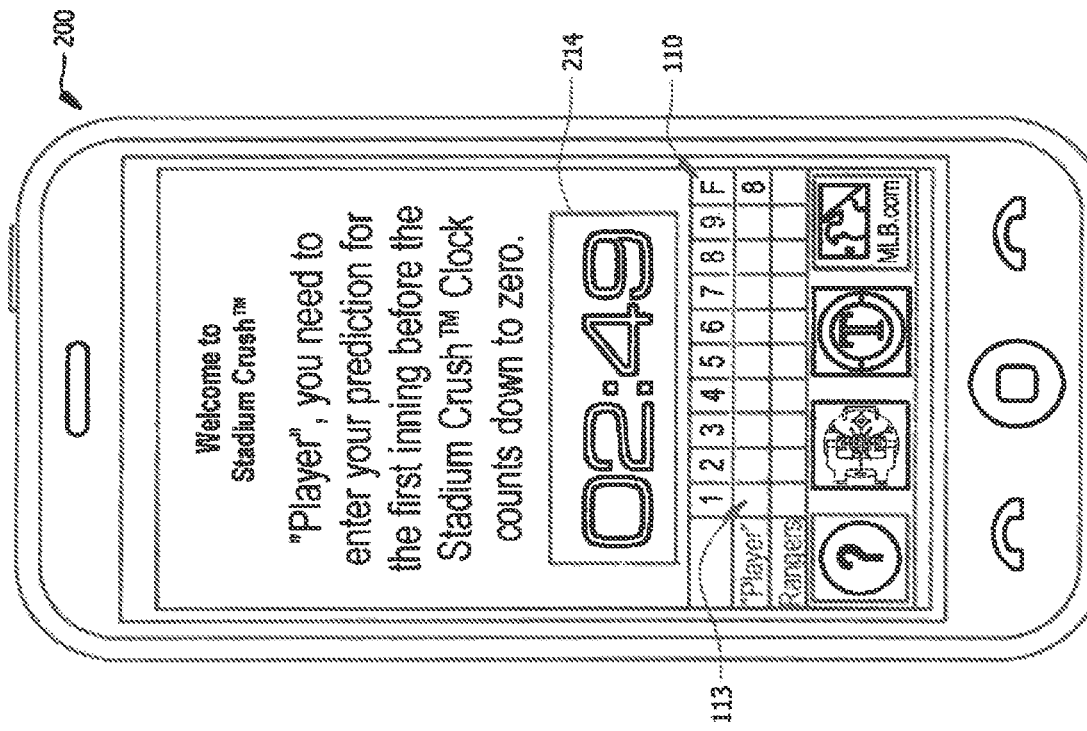
FIG. 1 illustrates a screenshot of a graphical user interface demonstrating a virtual scoreboard of the disclosure.

The above figures are provided for the purpose of illustration and description only, and are not intended to define the limits of the disclosed system and method. Use of the same reference number in multiple figures is intended to designate the same or similar parts. Furthermore, when the terms "first," "second," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present system and method have been read and understood.

DETAILED DESCRIPTION

"Application program" or "application" or "app" as used herein refers to instructions stored on and/or running on a computer, which when executed by a processor of the computer, causes the computer to perform a function(s) of the application disclosed herein.

Disclosed herein are systems and methods for improved fan engagement with an application running on mobile device by utilizing hardware and software capabilities of the mobile device to keep the fan engaged with the application. In aspects of the systems and methods, the application can include one or more features designed to keep a user engaged with the application instead of other competing applications. The different techniques implemented by the application using the hardware and software of the mobile device include gaze tracking, award redemption, a trading system, blockchain, geo-location reminders, Global Positioning System (GPS) reminders, and combinations thereof.

A technical problem associated with applications is the number of other applications providing notifications or other disruptions that compete for user engagement. Research has shown the average user has more than 80 applications installed on their mobile device. While some of these applications may be system requirements that do not regularly require engagement from the user, the average user engages with around 10 different applications per day and around 30 different applications per month. Most if not all of these applications utilize notifications to attempt to get a user to open and engage with those applications. At any time while using a mobile device, a user can receive notifications from any of the applications on their mobile device pulling attention and engagement from the application the user was in the process of using.

The systems and methods for fan engagement described below provides a technical solution for user engagement that 1) offers awards for engaging with the application and correctly predicting outcomes; 2) moves content on the display to the areas viewed more often by the user; and 3) offers a robust marketplace for trading awards. The technical solutions disclosed herein do not all need to be present in a single embodiment for the application to improve user engagement. One or more of the different embodiments can be included to best tailor the application to the event or target audience.

The disclosed systems and methods can utilize an application that is specific to a rules-based activity, such as an application for observing a sporting events and the like. These events can include past or live sporting events, such as events for baseball, basketball, football, hockey, soccer, tennis, golf, boxing, auto racing, bowling, horse racing, cycling, swimming, and any other team-based or individual competitive rules-based activity or contest. A rules-based activity or contest, as used herein, can also refer to any singular event, such as a baseball game or a football game.

FIGS. 1, 2, 3A, 3B, 4A, 4B, 5A-5N, 6, 7, and 8 are used to describe an exemplary mobile application environment for the systems and methods disclosed herein in FIGS. 9A-9D, 10, 11, 12A-12B, 13, 14, 15, 16, 17, 18, and 19 that have improved fan engagement with an application running on mobile device by utilizing hardware and software capabilities of the mobile device to keep the fan engaged with the application. The exemplary mobile application environment described for FIGS. 1, 2, 3A, 3B, 4A, 4B, 5A-5N, 6, 7, and 8 is in the context of a sporting event; however, it should be understood that the scope of use of the techniques disclosed herein may not be limited to mobile device applications that are specific to sporting events. FIGS. 9A-9D, 10, 11, 12A-12B, 13, 14, 15, 16, 17, 18, and 19 are used to describe the systems and methods for improved fan engagement.

Referring again to FIGS. 1, 2, 3A, 3B, 4A, 4B, 5A-5N, 6, 7, and 8, the exemplary mobile application environment can involve acquiring information regarding at least one sport or other activity, scheduled sporting events or other activities, at least one team or activity, or at least one individual competitor or activity to predict or guess. That information is then filtered using user input to generate a virtual scoreboard. The virtual scoreboard is configured to illustrate a scoreboard of the respective event provided through user input, with a second row to represent any user input or interaction with the virtual scoreboard.

Once the virtual scoreboard is built, the exemplary system for keeping a user engaged with a mobile application then facilitates accepting score guesses or predictions from users on the actual score of the event at any point in the game. As such, the disclosed technique establishes a game for guessing or predicting a score for a team or an individual competitor at a particular sporting event, and should the user correctly guess or predict the score for the team at the particular sporting event, then the user receives an award. For example, the disclosed technique can establish the score for items such as the total score for a team in a particular game, total score for a team during a particular period in the game, or virtually any other measurable statistic of an individual, team, or other collection of individuals in a given game. In one embodiment, a pre-determined time limit is set for accepting score guesses or predictions from users, so that users are not allowed to input a score guess or prediction right before the end of a gameplay period. As incentive to participate in correctly guessing or predicting a score, banners and materials from merchants and/or sponsors are presented with the virtual scoreboard, and the banners and materials include one or more awards for correctly guessing or predicting a score or statistic of the rules-based activity or contest. For example, in one embodiment, a food coupon from Chick-fil-A® can be awarded when before the second inning, a user guesses or predicts the score of the second inning of a baseball game for the chosen team to be played along with and after the second inning ends, the user's guess or prediction matches the score of the second inning In another embodiment, the award may be given for the closest guess or prediction among users.

Further, in one embodiment, third-party data sources are polled for information of the rules-based activity or non-rules based activity or contests, such as real-time scores of a baseball game and the current game clock and position of players and teams on a football field. The third-party data sources include sporting data sources, such as official sports associations or other sports data repositories. These third-party data sources are further discussed below with regard to FIG. 6. The banners and materials can also be retrieved from third-party data sources or a merchant and/or sponsor repository to be presented with the virtual scoreboard for a particular period of the rules-bases activity or contest.

Once the official contest, such as a game within a given sport, has taken place (or a certain portion of the contest has concluded), the actual score achieved by the specific team, player, or collection of players is determined, and the winning and losing scores are determined. The winning scores are rewarded by awards from merchants or sponsors of the event, sport, game, team, individual, or collection of individuals, as provided through the banners and/or materials presented with the virtual scoreboard. Users are allowed to store and organize awards for later use, presentation, and/or redemption by storing the awards in a user database and associating the awards to the users, which is further discussed herein. Users are presented an award notification once the technique has determined whether the users won the award.

As the contest continues, users may be given additional opportunities to submit a score guess or prediction and win subsequent awards associated with the additional opportunities. The awards can be physical awards or digital achievements that can be displayed on a user's profile. For example, a baseball game has nine innings, and banners and material for merchants and/or sponsors are presented to the user prior to the start of each inning of the baseball game, so the user has ten opportunities to correctly guess or predict scores of the baseball game, including the final score of the game. To help keep users continually engaged through the duration of the rules-based event, the windows to guess for different units of gameplay can vary. When users have things to interact and engage with throughout the game, they tend to continue engaging with the application over competing applications.

Another embodiment enables the use of trivia contests and pre-game activities for a chance to engage users before the rules-based event has begun. For example, choosing a correct answer to a trivia question may facilitate another award-winning opportunity. Trivia contests and pre-game activities may be limited based on geographical factors to incentivize users to attend sporting events in-person. Short trivia and pre-game activities can get users engaged as soon as the user arrives at the stadium.

Exemplary applications can be implemented via one or more secure websites or other similar dedicated sites accessible via a computer network. However, other embodiments can be facilitated in a physical location, such as a sports stadium or other similar establishments accessible by patrons. Furthermore, interactive merchant/sponsor material may be presented with more than the actual results of a contest, and may apply to any measurable statistic within a contest.

FIG. 1 illustrates a screenshot 100 of a graphical user interface demonstrating a virtual scoreboard. The graphical user interface comprises a virtual scoreboard 110, a series of links 120 to other sections of the mobile application, and additional content 130 to appeal to a user and keep them engaged with the application. The graphical user interface may be hosted or otherwise provided to users of the exemplary embodiment, or in another embodiment, it may be a site hosted by a third-party, such as an official sporting organization, as one or more pages within such a site. It should be noted that the screenshot 100 illustrated in FIG. 1 is merely exemplary, in both presentation and content, and thus is not intended to limit the scope of the disclosure.

As illustrated in FIG. 1, the exemplary interface can include links 120 to other sections of the mobile application. Such links 120 may facilitate access to a user's stored awards or links to third party websites. In the embodiment illustrated in FIG. 1, the rules-based activity on which score guessing or predicting as disclosed herein is facilitated, is baseball, and more specifically, the scores of the professional baseball team, the Texas Rangers. Thus, an exemplary interface may be a section having a link to the third-party website of the Texas Rangers, and another section having a link to the third-party website of the Major League Baseball. Links, also, allow the user to seamlessly move from one rule-based event to another. The links can open the websites within the application keeping the user in the application rather than opening a different competing application. Extensions of other applications can be used to fully implement these capabilities inside the application.

Exemplary interfaces may include additional content 130, such as live-streaming of the sporting event and images of the sporting event location. Some additional content 130 may incentivize users to attend sporting events in person, and the additional content may be provided by third-party data sources such as the Major League Baseball. In one embodiment, the additional content 130 comprises live streaming of the sporting event and the live stream feed may be a pay-per-view feed of the sporting event and synchronized with a local television channel to provide advertisements and commercials. In another embodiment, additional content 130 may comprise information about various players of the contest.

Looking specifically at the exemplary embodiment, in a specific example involving a user guessing or predicting on the scores of a baseball game, for example, using the exemplary interface illustrated in FIG. 1, a user can select one of the rows of the virtual scoreboard 110. The virtual scoreboard 110 may have multiple rows reflecting score guesses or predictions and actual scores from the sporting event. In the exemplary embodiment, the virtual scoreboard 110 comprises three rows: one row for labeling the columns of the virtual scoreboard 110; a second row 111 for user input labeled "Player," which contains a user's name; and a third row 112 reflecting the actual scores of each inning the baseball game. This exemplary virtual scoreboard 110 facilitates the user inputting his or her score guesses or predictions in the row labeled "Player". The row 112 may be updated as the sporting event progresses. The virtual scoreboard 110 is also divided into multiple columns reflecting the units of gameplay for a sport. In the exemplary embodiment, the virtual scoreboard 110 is divided into 12 columns: one column to label the row, nine columns for each inning of a baseball game, and a last column for a total score of the baseball game. The number of columns of the virtual scoreboard 110 may be dynamically changed based on the progress of the sporting event. For example, the virtual scoreboard 110 may dynamically add columns for extra innings after the $9^{th}$ inning to account for additional innings In other embodiments, besides the first and last columns, the virtual scoreboard 110 may comprise any number of columns depending on the sport; a football virtual scoreboard may comprise four columns, besides the first and last columns, to accommodate for each quarter of the game; a financial market virtual scoreboard may comprise many columns, besides the first and last columns, to accommodate multiple predictions or guesses for pre-set chronological or calendar events.

The exemplary embodiment does not limit users to guessing or predicting scores of a rules-based activity or contest, and can be used with guessing or predicting any and all information about any activity or contest. In another embodiment, any attribute of a rules-based activity or contest can be used, including statistics of individual players, e.g., number of runs batted in. Furthermore, in yet another embodiment, any attribute of a non-rules-based activity or contest can be used, including predictions for elections and financial markets. The application can offer smaller awards for correctly guessing statistics for gameplay units, for sports, or segments of time, for elections or financial markets, to keep users engaged in the application and away from competing applications through the entirety of the event.

As discussed above, the user selects the cell 113 corresponding with an upcoming inning to input a score guess or prediction into the cell 113. The user has a pre-determined time limit to enter or modify his or her score guess or prediction into the cell 113, and the pre-determined time limit may be presented as a timer on the interface, as shown as the timer 214 in FIG. 2. The interface may facilitate user input by providing a native number pad or by providing another interface with a number pad for user input.

In alternative embodiments, the user can provide score guesses or predictions to other statistics of a sport, sporting event, team, individual, or group of individuals. For example, the user can guess or predict how many hits a player of a baseball game scores in the game, or the user can guess how many pitches a pitcher of a baseball game will throw during the game. Other embodiments can limit the user's ability to provide score guesses to multiple games or contests.

The mobile application allows the user to access the interface as shown in the screenshot 100 of FIG. 1 by filtering the information from a server on a client, which is discussed further below. The user is allowed to navigate the system through a series of interfaces that present various sets of information. For example, one interface prompts the user to choose an activity, such as baseball. A second interface then prompts the user to choose a contest of the activity from a list of contests, such as a list of baseball games scheduled to occur on a particular day. A third interface then prompts the user to choose an individual, a group of individuals, or a team of the selected contest, such as the home team of a baseball game. These alternative exemplary interfaces allow the user to navigate to the interface as shown in screenshot 100, and provides the user input to generate the virtual scoreboard for the user. Filtering information may be based on various filters, such as user history and geographic location, and accordingly, the interface can be tailored for users.

In alternate embodiments, a user is prompted when trying to guess or predict scores for a second activity or contest that is different from the first activity or contest. The system allows the user to stop interacting with the virtual scoreboard of a particular activity or contest, and instead to start interacting with a virtual scoreboard of a different activity or contest. For example, the system can be designed to allow users to interact with a virtual scoreboard of one baseball game, one football game, etc., so long as the user interacts with one virtual scoreboard of each sport. Thus, when a user attempts to switch to a second virtual scoreboard of a certain genre of activities or contests, the system can notify the user that by navigating away from the first virtual scoreboard, the user can lose all unresolved guesses, predictions, or user input of the virtual scoreboard 110. By doing so, the system informs users about losing any existing, but unresolved, guesses or predictions in the first virtual scoreboard. For example, a user has entered guesses or predictions for multiple upcoming innings of a first baseball game currently ongoing, and then wants to navigate to a second baseball game that is also ongoing. The system prompts the user with a notification that informs the user by leaving the interface, the user loses all of his or her unresolved guesses in the virtual scoreboard of the first baseball game. If the user confirms leaving, then all of the user's unresolved guesses are removed. In other embodiments, these guesses or predictions are saved by the client or by the server; however, these guesses or predictions may or may not be eligible for awards until the user navigates back to the interface of the first baseball game. In these embodiments, the system allows the users to have one active game or rules-based activity or contest for each genre of rules-based activities and contests. For example, the user can make guesses or predictions for one baseball game but can make guesses or predictions at the same time for a football game. The system can allow the user to re-activate the first virtual scoreboard and de-activate the second scoreboard. In other embodiments, users can provide guesses and/or predictions to any number of games or activities or contests without limitation.

With some embodiments, a user's mobile device may not be active when an activity or contest concludes, and the user has input a guess or prediction for the score of the rules-based activity or contest. In anticipation of an inactive user mobile device, the user's mobile device transmits to the system any and all guesses or predictions provided by the user, and the system stores the user's guesses and predictions with any other user information sent from the user's mobile device. So, when an activity or contest concludes and at least one of the user's guesses or predictions matches the result of the activity or contest, the system automatically rewards the user with the corresponding award, and when the user activates his or her mobile device, the user receives an award notification for the corresponding award.

In other embodiments, users can browse through any and all games or activities or contests, and users can also browse through possible awards of any and all the games, activities, and contests. Users can then pick and choose which games or activities or contests to which they would guess or predict the scores or statistics.

The flexibility of the exemplary embodiment provides numerous benefits. For example, fan engagement is not limited to correctly guessing or predicting a single score, such the final score of a game, and instead guesses can be made on any measurable statistic during a contest within an activity. Offering a wide array of awards for different statistics and categories can help keep users engaged with the application over other competing applications for the duration of the event. Also, the application is not limited to certain players, teams, or collection of players within a particular contest or event; any type of activity can be made the subject of the disclosed methods. While the present example is discussed in terms of baseball scores, other embodiments may be contextually applied to any other sport having players, collections of players, or team. Still, further embodiments are not limited to sports, and may extend to any activity or event that has a measurable performance benchmark. Examples can include elections, where users can guess or predict the performance of a candidate or perhaps how certain demographics or geographic areas may vote on a candidate or issue; and, financial markets, where users can guess or predict the performance of specific financial instruments, entity performance, and even the performance of stock, industries, indices, and economies. Additionally, the exemplary embodiments are designed to increase attendance at activities and/or contests, to increase television viewership where applicable, and to increase application traffic and retention when compared to competing applications, all while rewarding frequent and casual players with awards.

Furthermore, another exemplary embodiment may extend beyond a single "league" or user, and can instead be as large a group of users as desired, and perhaps directed to one or more specific contests/events within a rules-based activity. For example, in embodiments discussed below in further detail, the one or more contests can be implemented within one or more activities in a given location. Specifically, users may be patrons within a bar, or chain of restaurants or bars, having televisions broadcasting the contests. Similarly, users may include some or all of the attendees of an event, such as a stadium hosting the event. Thus, the exemplary embodiment does not limit the number of users or leagues because any number of users can be given the opportunity to place guesses or to predict on any measurable performance benchmark for any individual, collection of individuals, or team, in any type of activity, in any number of event or events, and in any geographic location.

Figure 2:
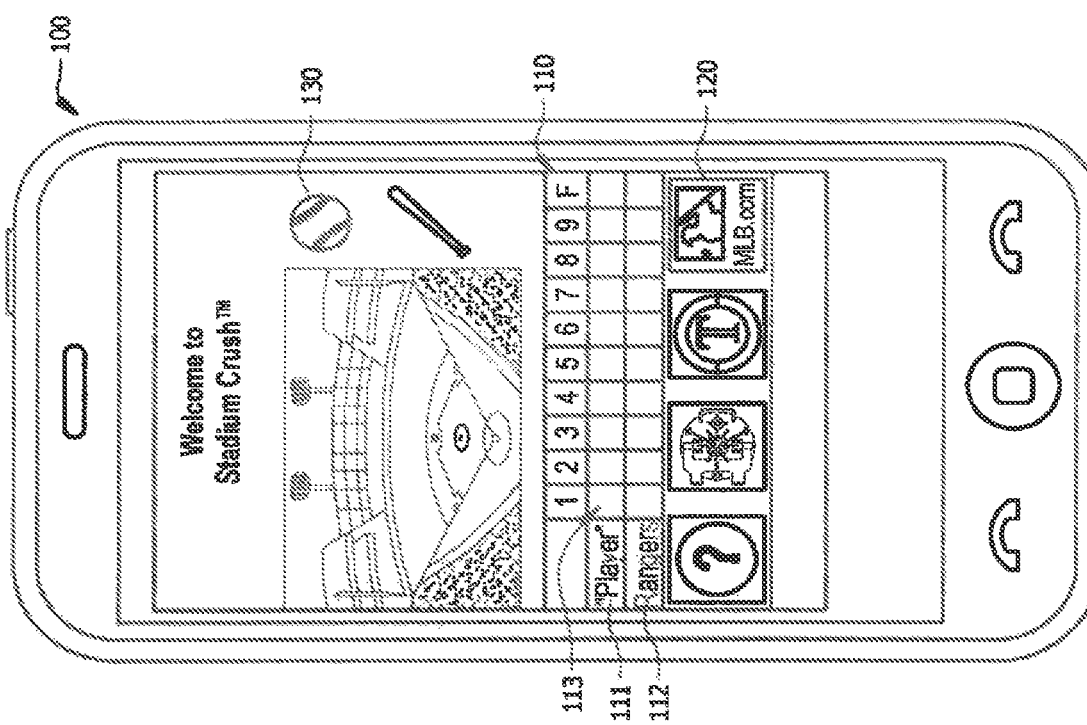
FIG. 2 illustrates a screenshot of a graphical user interface demonstrating the predetermined time limit as a timer in conjunction with the virtual scoreboard of the disclosure.

Turning now to FIG. 2, illustrated is an exemplary embodiment of another screenshot 200 of a graphical user interface, such as an Internet website or a mobile application. The interface provided in this screenshot 200 differs from the interface discussed with respect to FIG. 1 in that this interface illustrates the pre-determined time limit as a timer 214 for user input into the virtual scoreboard 110. The pre-determined time limit may vary depending on the activity or on the contest of the rules-based activity. For example, the exemplary embodiment allows a user to input his or her guess or prediction for the final score of a baseball game up until the start of the baseball game, and for any inning, the user can input his or her guess or prediction for the score of the respective inning up until the start of the respective inning. The predetermined time limit can comprise the time period between innings, in the exemplary context of a baseball game, or the time period between quarters, in the context of a football game. In alternate embodiments, the predetermined time limit may range from one minute to three minutes before the start of the upcoming gameplay time unit of the contest. A gameplay time unit is based on how a rules-based activity or contest is divided, such as quarters, innings, sets, periods, laps, rounds, races, stages, and halves.

Figure 3B:
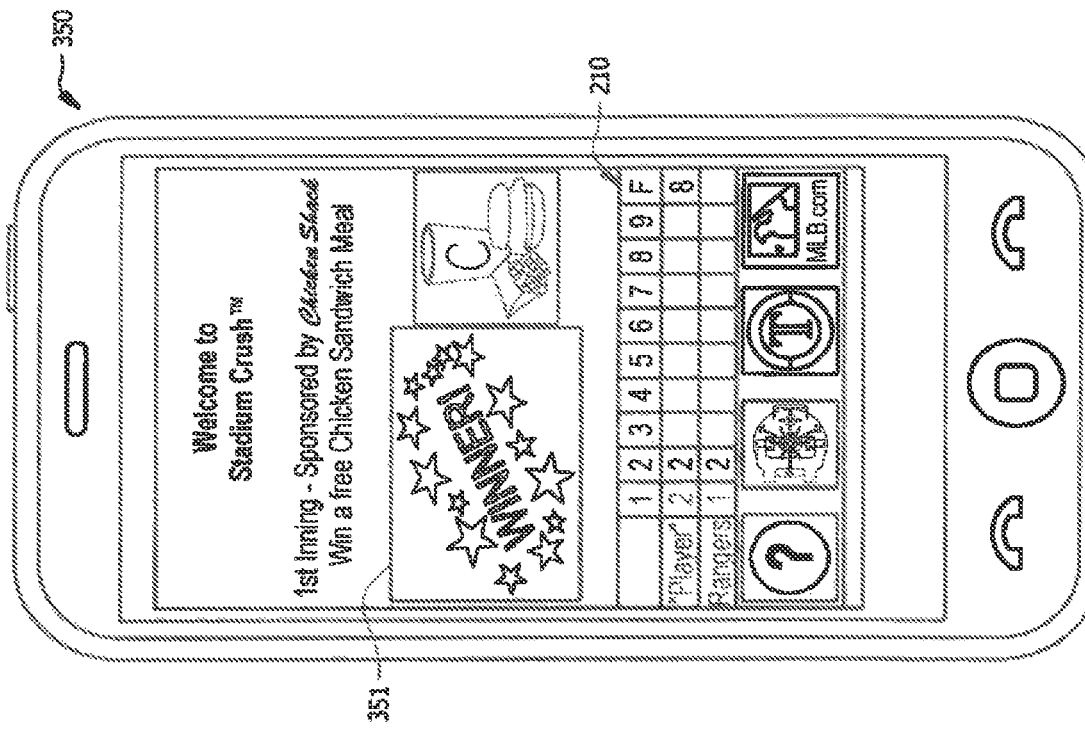
FIGS. 3A and 3B illustrate screenshots of a graphical user interface demonstrating user input and retrieved updates to real-time sports information to the virtual scoreboard of the disclosure.
Figure 3A:
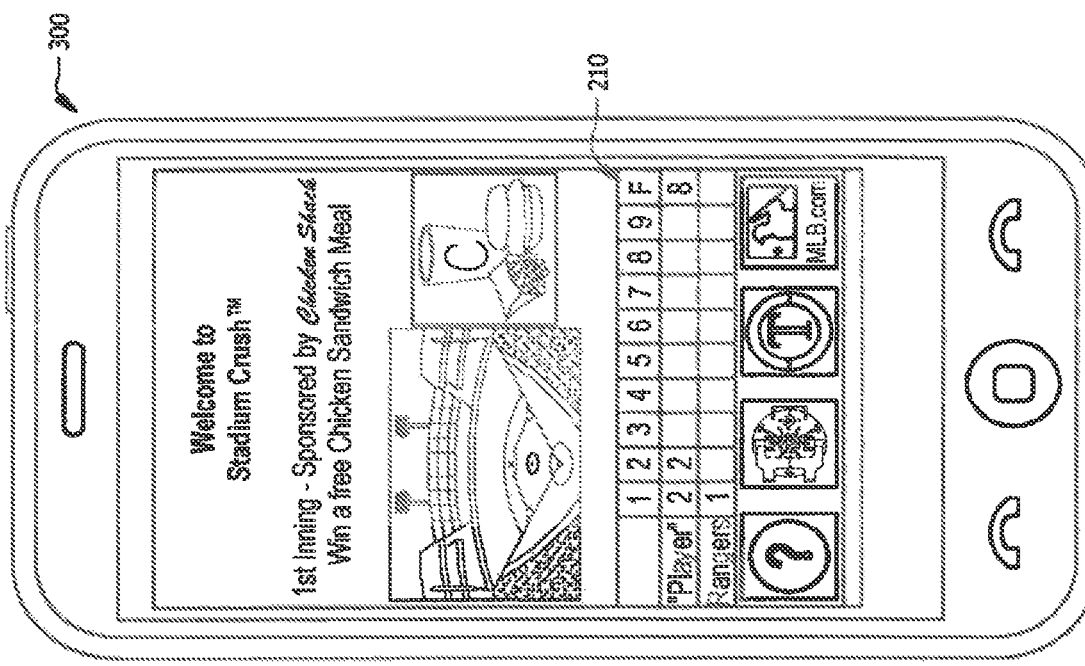

Turning now to FIGS. 3A and 3B, illustrated is an exemplary embodiment of screenshots 300, 350 of a graphical user interface, such as an Internet website or a mobile application. The interface providing these screenshots 300, 350 differs from the interface discussed with respect to FIGS. 1 and 2 in that this interface illustrates how a user can win a listed award from a merchant and/or sponsor based on correctly guessing or predicting a performance benchmark of an official contest. In the exemplary embodiment, the user provided "two" as his or her guess or prediction on the number of runs in the second inning, as shown in the virtual scoreboard 210, and then the virtual scoreboard 210 updates its information to reflect the real-time information from a third-party data source, such as the Major League Baseball. As shown with FIG. 3B, once an official contest within an activity, such as an inning in baseball, ends, the exemplary embodiment determines whether the user has correctly guessed or predicted the actual result of the official contest, and if the user has provided a correct score guess or prediction, then the user is presented an award notification 351 via the interface indicating that the user has been rewarded for providing a correct score guess or prediction. The award notification 351 occurs after the contest has ended and after retrieving real-time information from the third-party data source. The award notification 351 can stay on the interface for a predetermined time limit before the next contest starts. In other embodiments, the notification can occur as soon as the unit of gameplay the guess was for is completed. Using the example above, if the user's guess for the inning was two runs, once that inning is complete and the system has processed the score, the award notification 351 can appear. Frequent award notifications 351 can keep a user engaged with the event and away from competing applications as the user can be focused on seeing if the guess provided was correct.

Figure 4A:
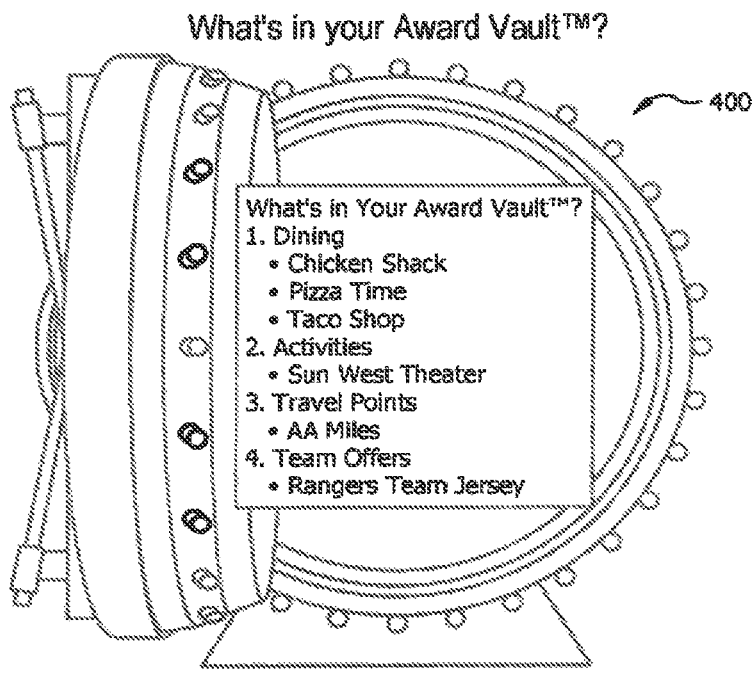
FIGS. 4A and 4B illustrate screenshots of an interface demonstrating the virtual storage and organization of awards from a variety of advertising materials and sponsors of the disclosure.
Figure 4B:

Turning now to FIGS. 4A and 4B, illustrated is an exemplary embodiment of another interface 400. The interface 400 of FIG. 4 provides the user access to various awards won by the user for providing score guesses or predictions in various contests. As mentioned previously, users win awards for guessing or predicting the actual result of a contest, and the awards may be stored for later use or redemption. The awards interface 400 allows for users to access the various awards for use or redemption, and to organize users' awards. When the user selects an award for use or redemption, the interface 450 presents an image of the award for use and redemption, as illustrated in FIG. 4B.

Other exemplary interfaces can comprise user profiles, messaging interfaces further discussed below, pre-game trivia interfaces, interfaces for information regarding rules-based activities or contests and statistics; other bonus game interfaces available to users with profiles that have fulfill predetermined requirements; translation-available interfaces; and localized versions of the exemplary interfaces. Additionally, the system can store, analyze, and utilize a user's preferences, browsing history, location, and other information provided by the user in generating interfaces for navigation or for the user's use in organizing the interfaces.

Figure 5B:
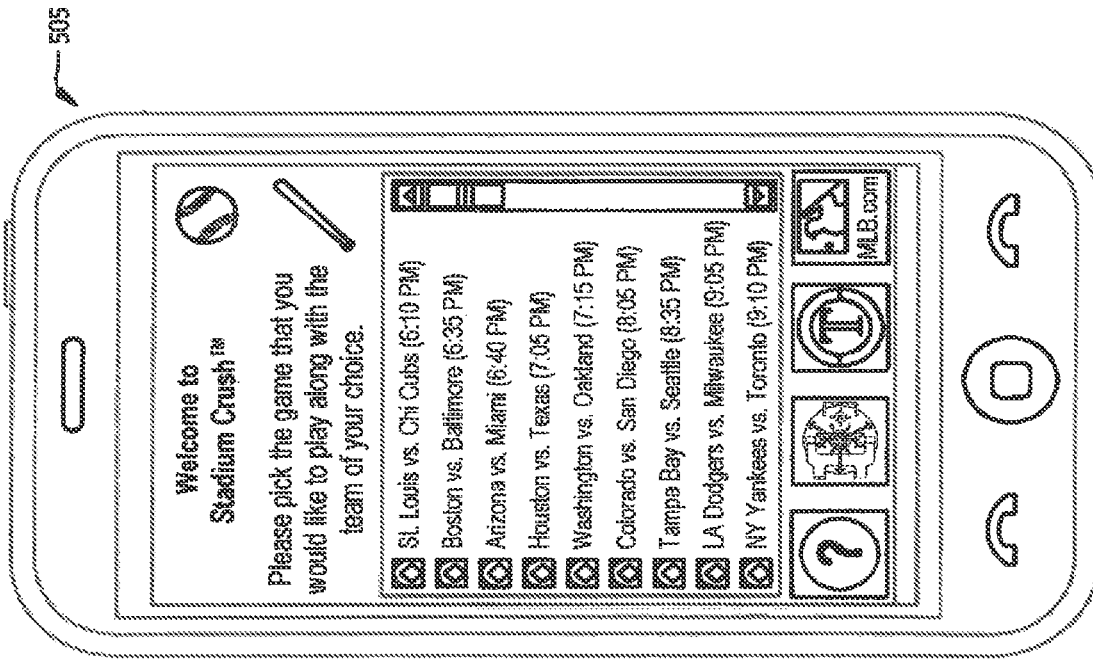
FIGS. 5A-5N illustrate a series of screenshots of interfaces.
Figure 5A:
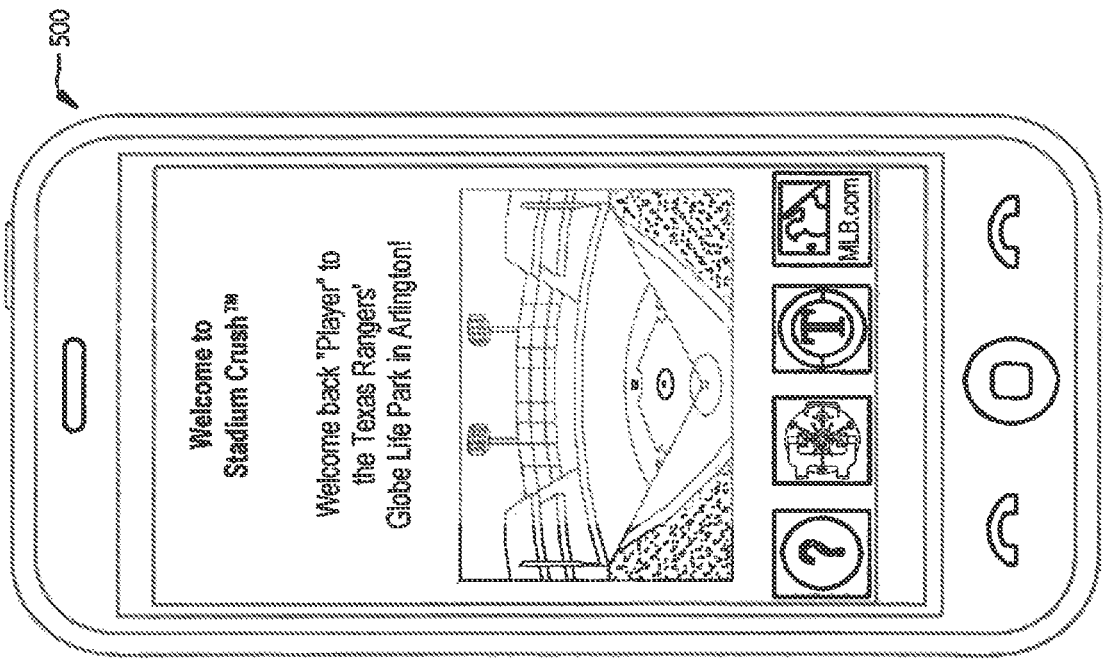
Figure 5D:
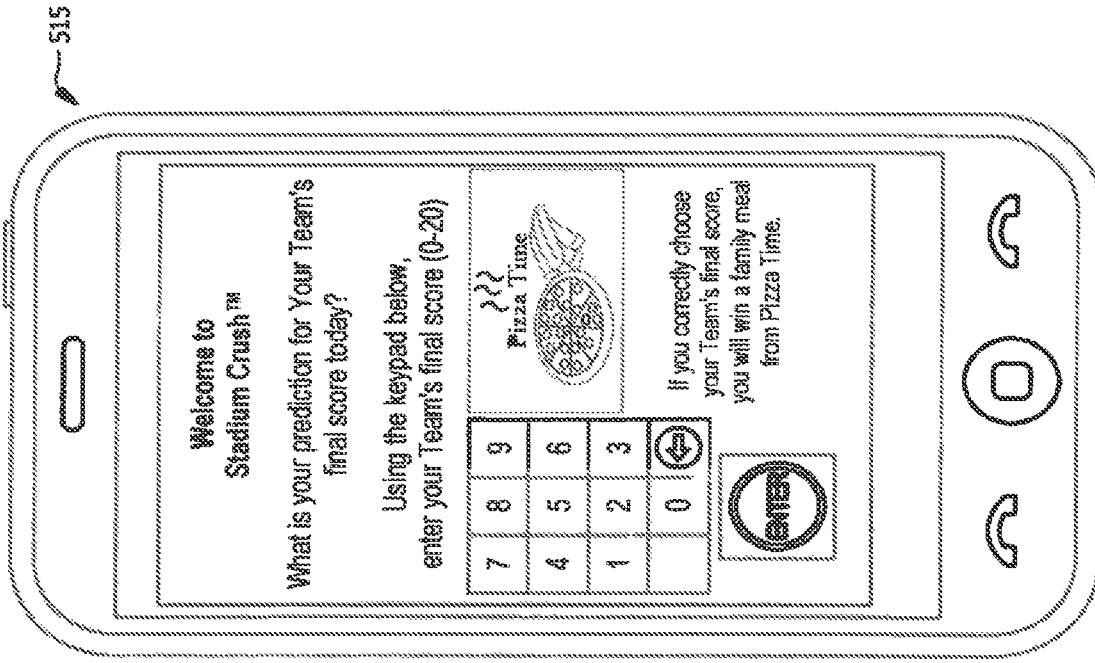
Figure 5C:
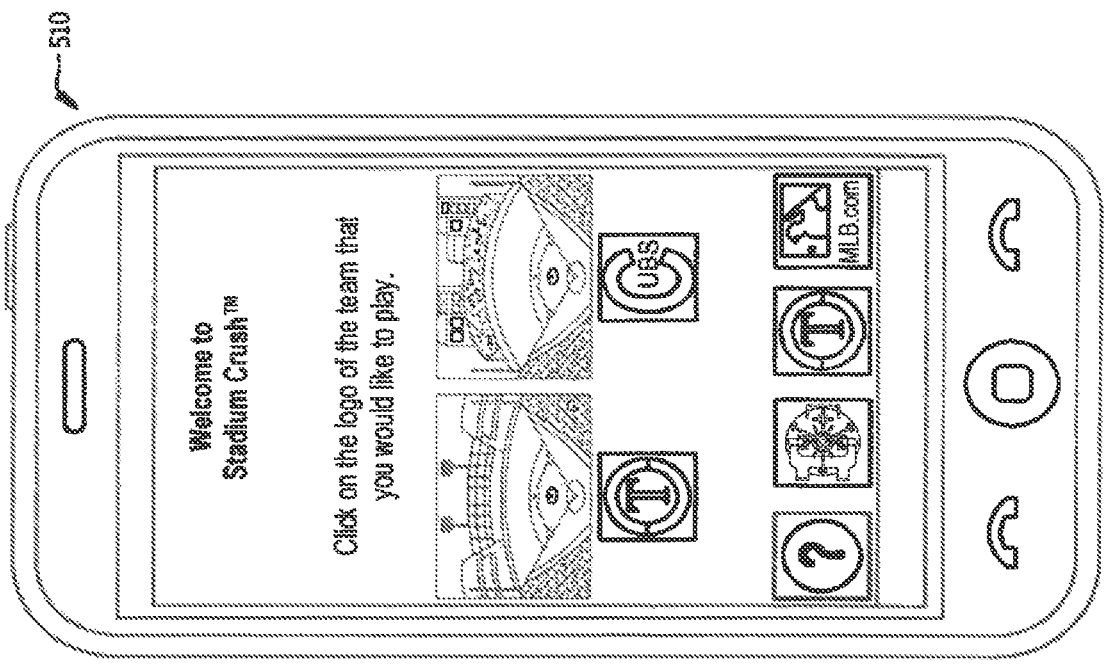
Figure 5F:
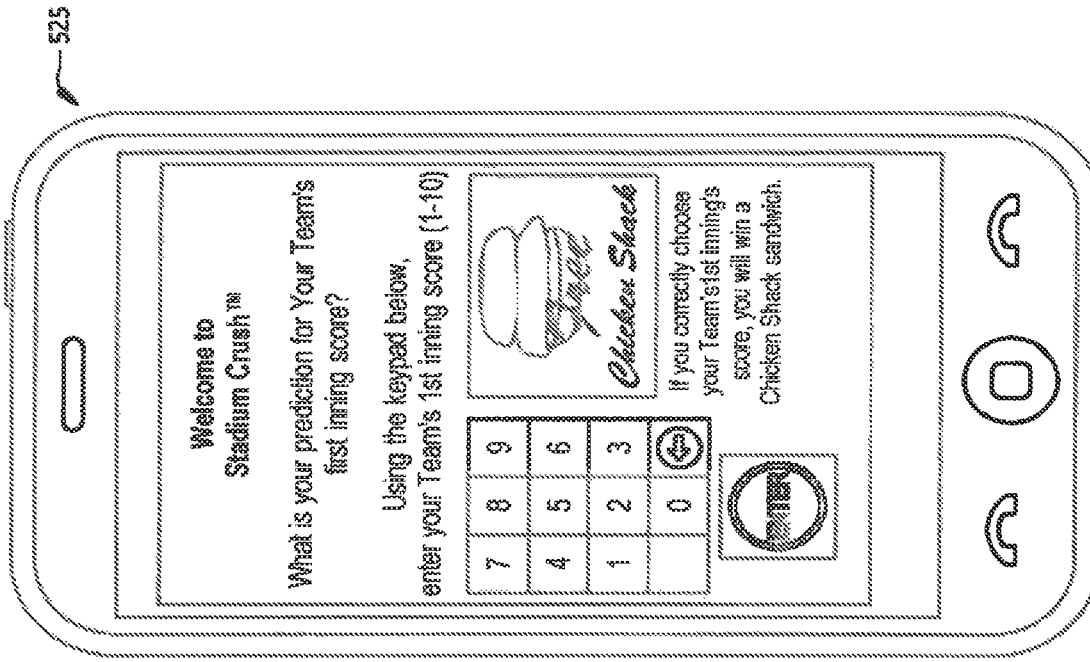
Figure 5E:
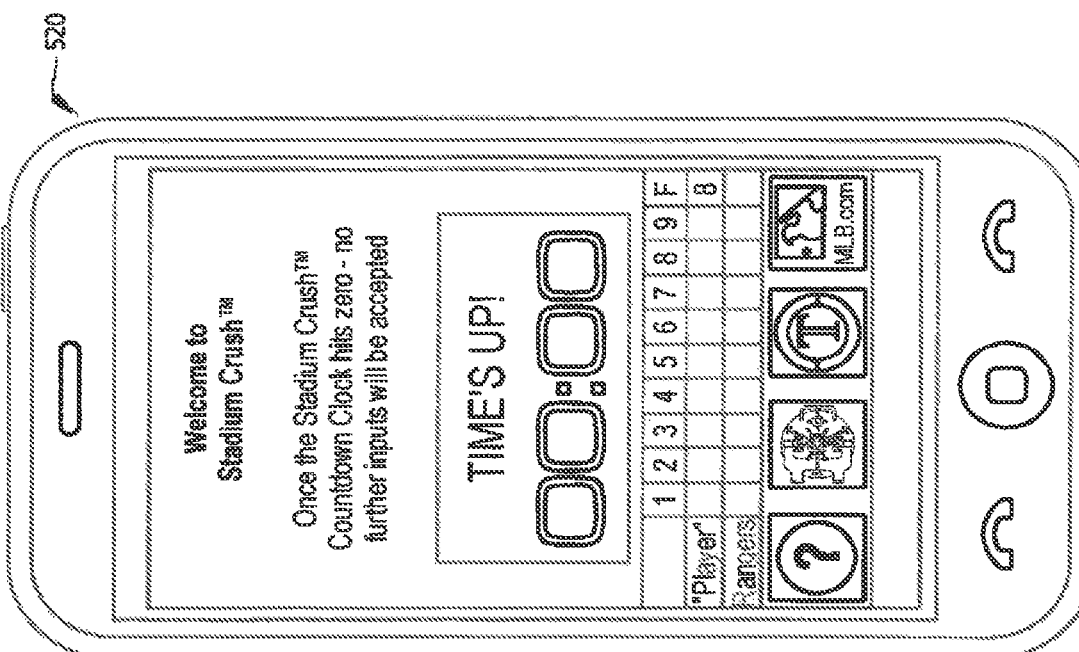
Figure 5H:
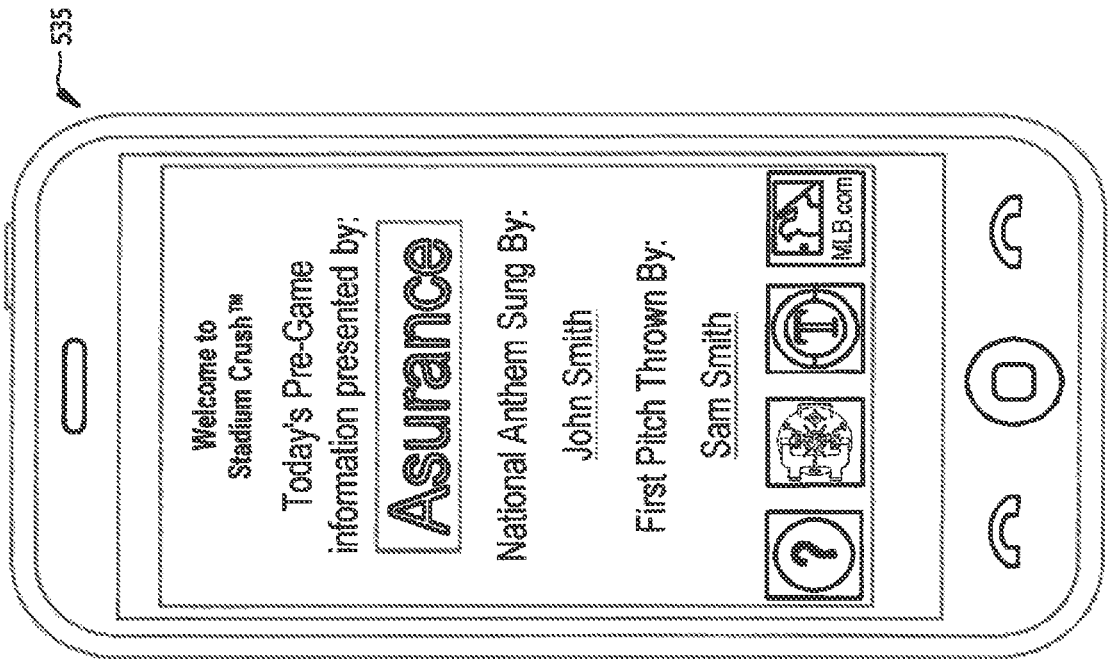
Figure 5G:
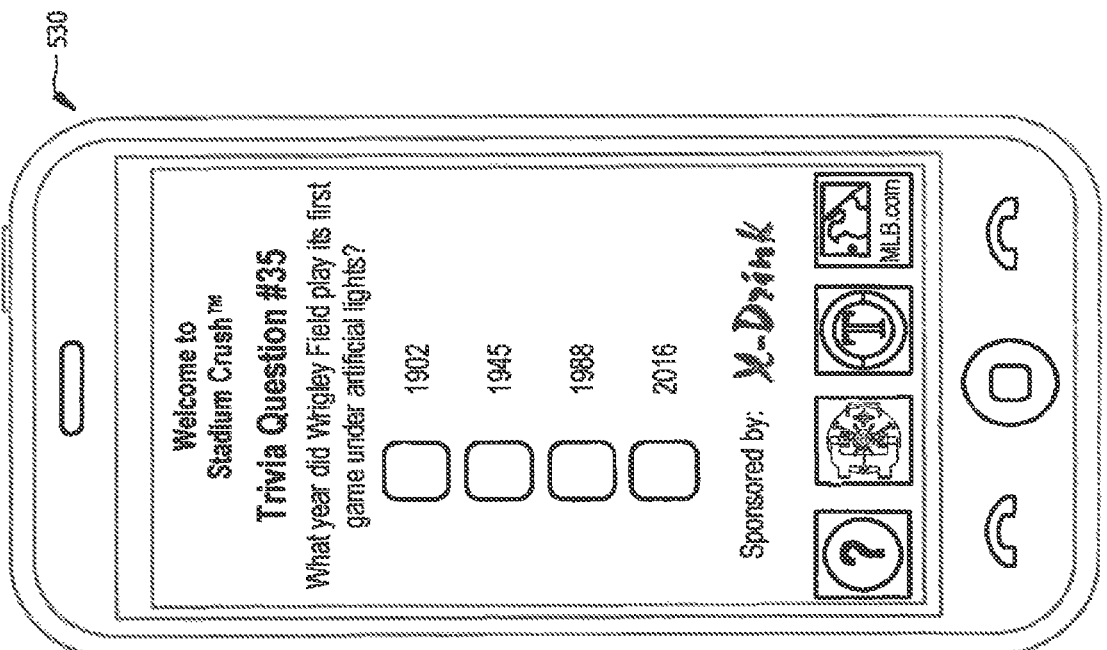
Figure 5J:
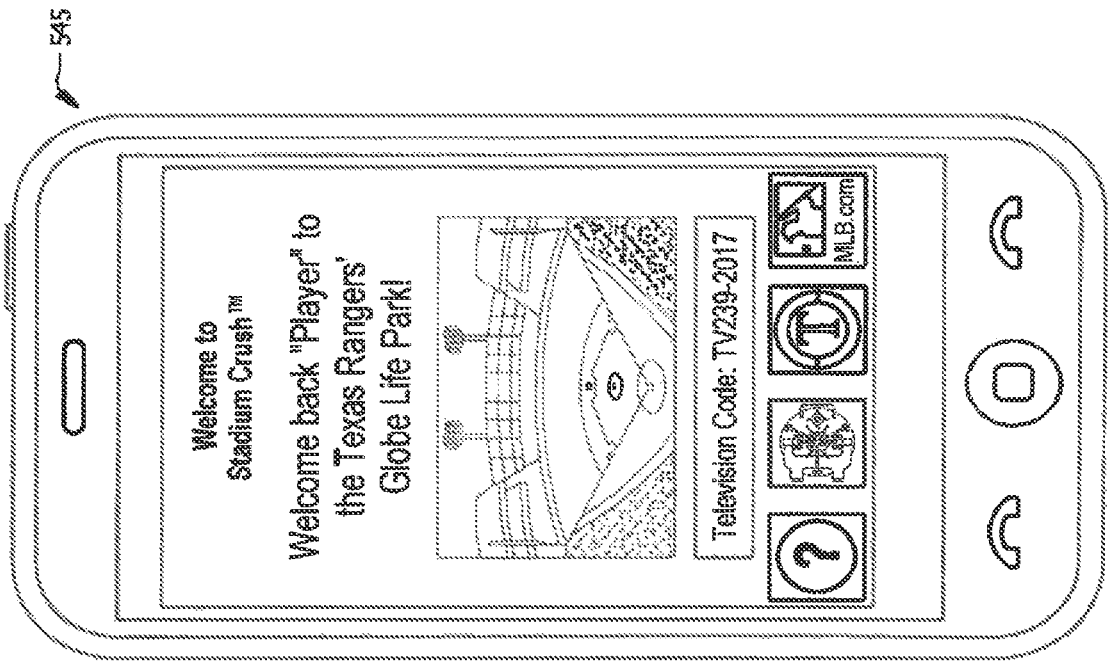
Figure 5I:
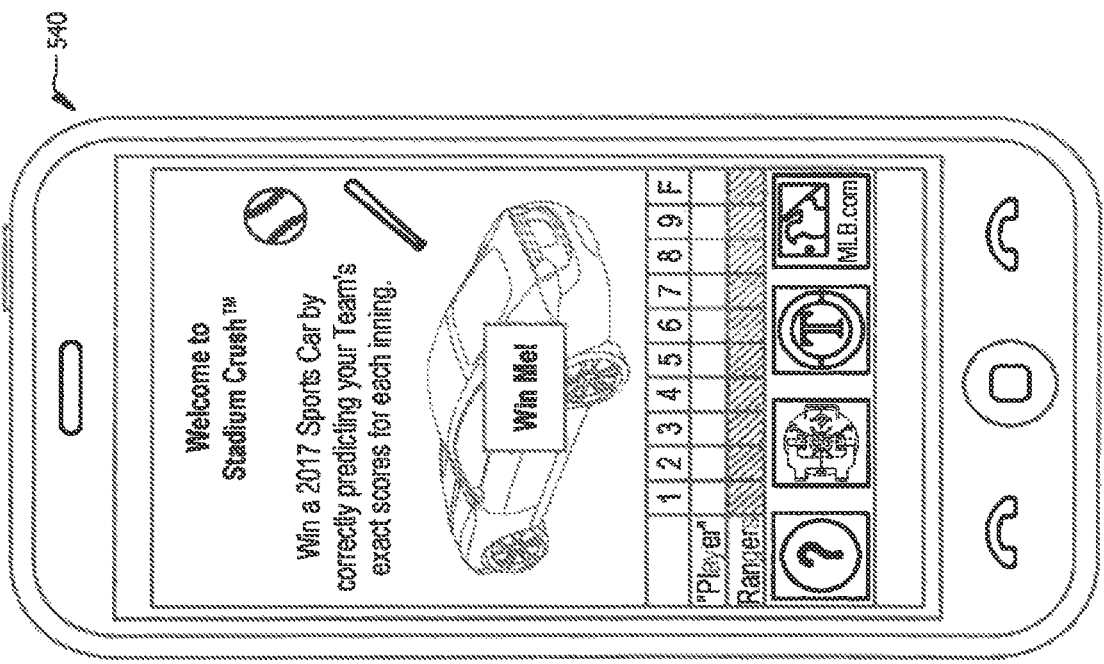
Figure 5L:
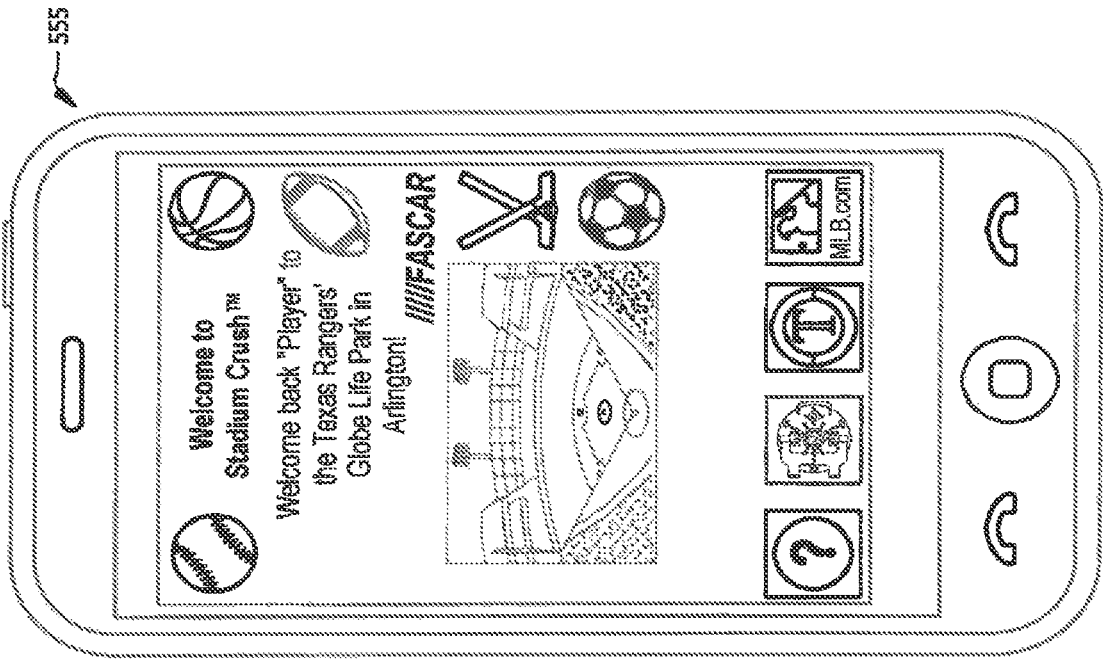
Figure 5K:
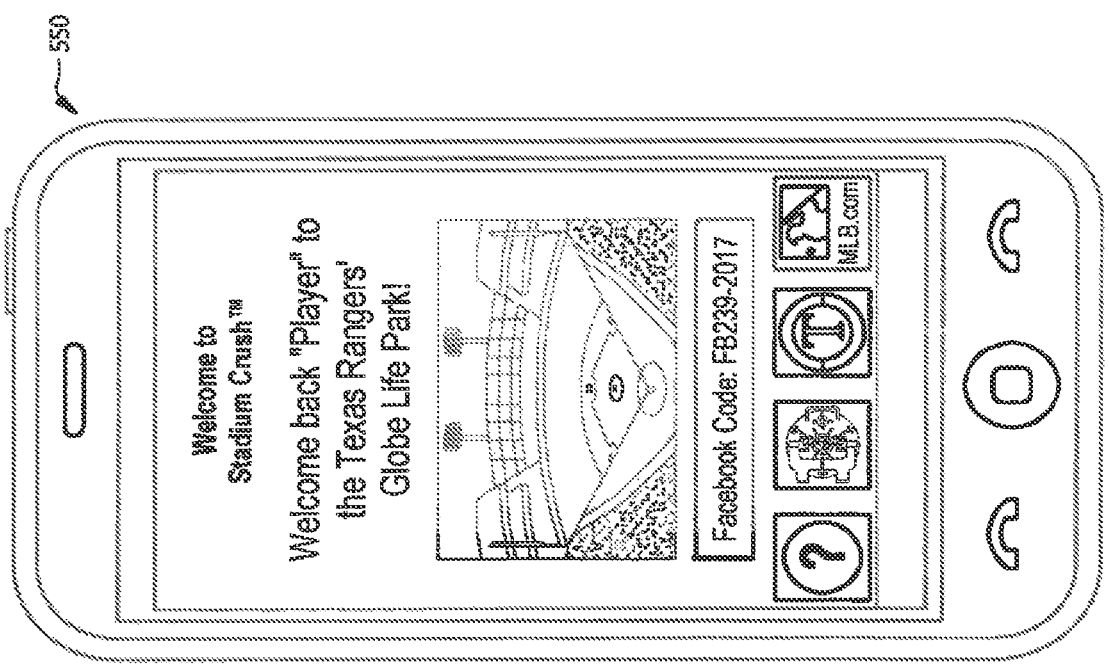
Figure 5M:
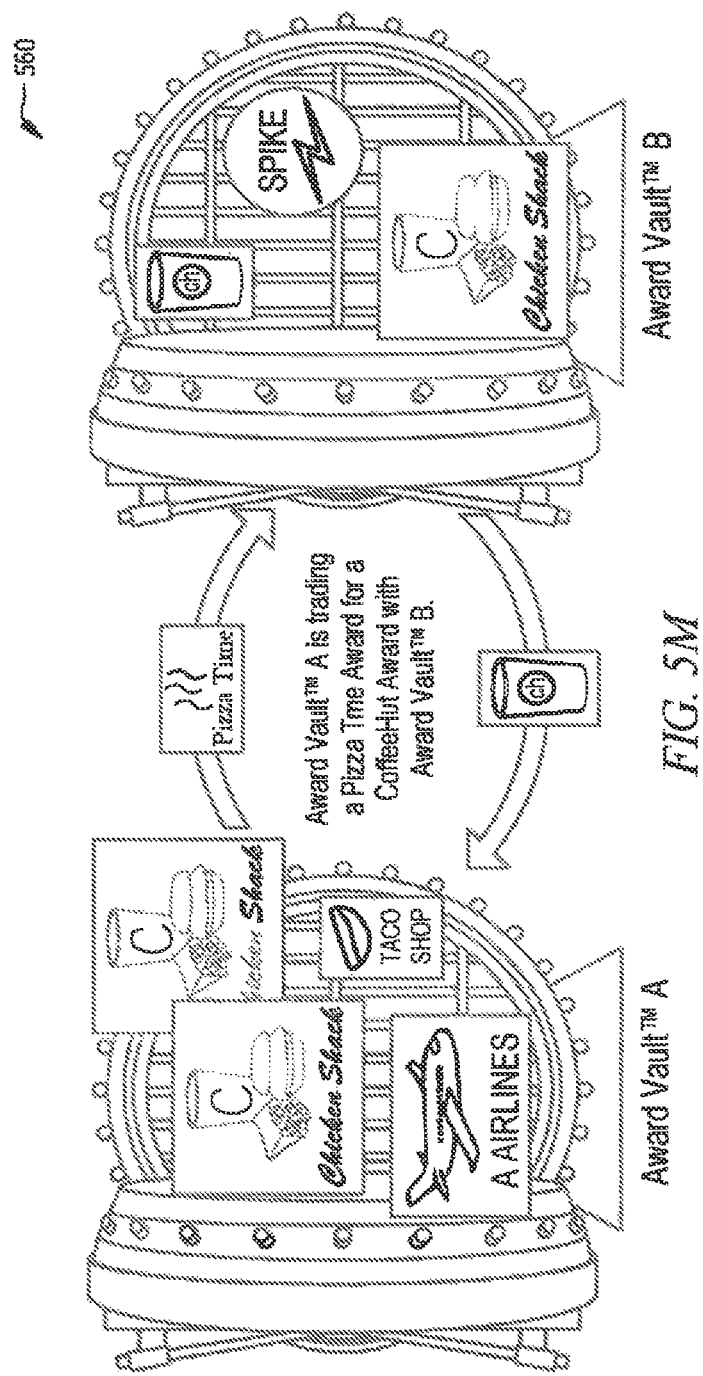
Figure 5N:
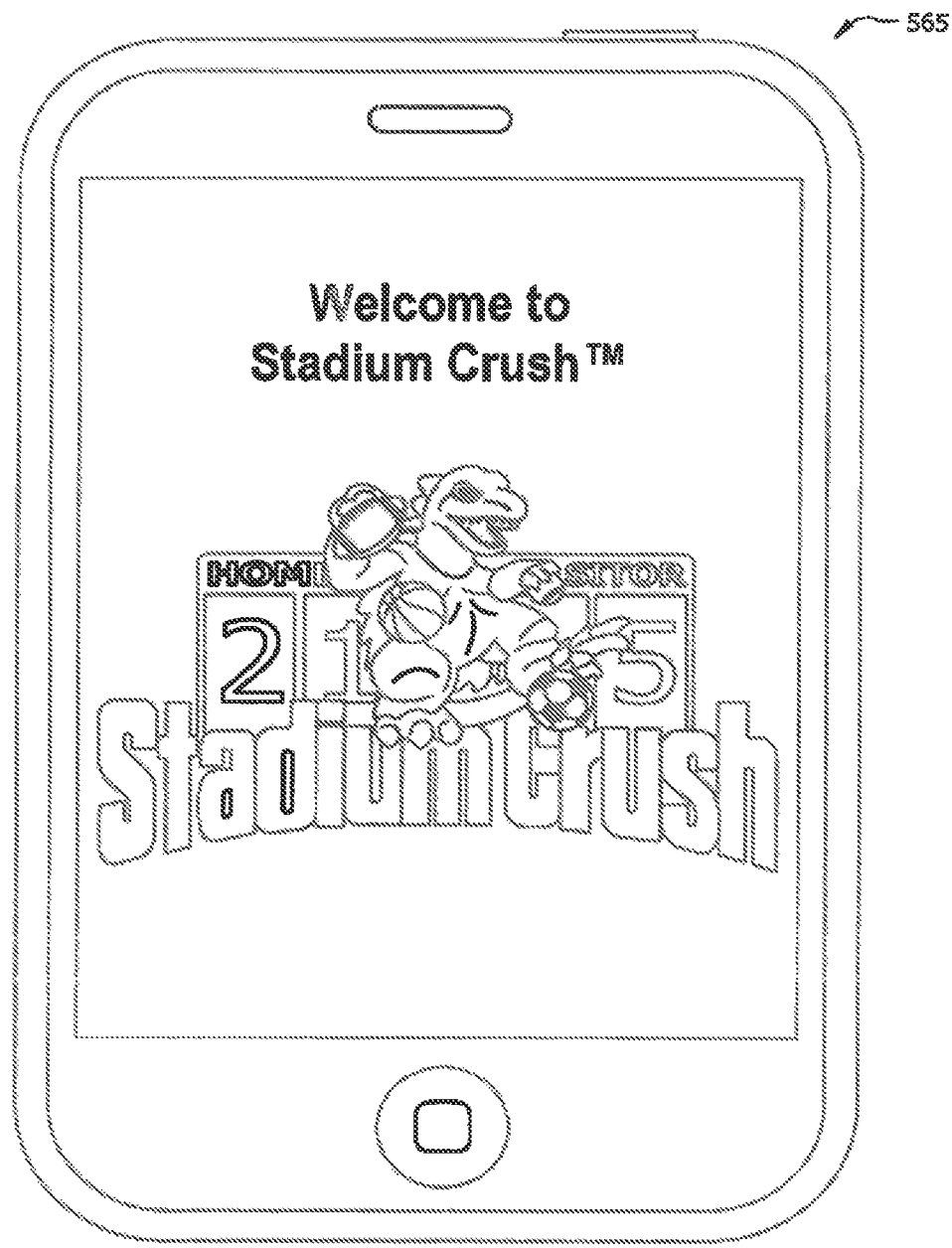

Examples of the above mentioned exemplary interfaces are illustrated in FIGS. 5A to 5N.

FIG. 5A illustrates an exemplary embodiment of a screenshot 500 of a graphical user interface which welcomes back a user while providing a series of navigation links and an image of a geographic location where a rules-based activity or contest takes place. This introductory interface can be customized for easier navigation by the user.

FIG. 5B illustrates an exemplary embodiment of a screenshot 505 of a graphical interface, which provides a list of activities and contests. This list of activities may be filtered by the user or by the mobile application based on geographic location, availability of an activity or contest, type of activity or contest, individual(s) participating in the activity or contest, user preferences, user history, etc. The user and the mobile application can use any information as a basis for filtering a list of activities or contests provided by third-party data sources, such as Major League Baseball and the National Football League.

In an alternate embodiment, the graphical interface can comprise of one or more interface buttons to change to another list of rules-based activities and contests. With these interface buttons, users can change between genres of activities and contests, or between live activities and contests and simulated activities and contests. Other lists of activities and contests can include lists based on the user's preferences, the user's history, the user's favorite teams, graphical units, and other information from the user and the user's client. Simulated activities and contests are discussed in more detail further below. Using these interface buttons, users can switch between lists of activities and contests to choose one of the activities and contests.

FIG. 5C illustrates an exemplary embodiment of a screenshot 510 of a graphical user interface where a user is presented a choice between two sides of an activity or contest. In this exemplary screenshot, the user is asked to choose between the Texas Rangers or the Chicago Cubs, so that the system can generate a virtual scoreboard and the corresponding graphical user interface based on the user's choice to play along with. This choice can be based on any subset of information provided about the activity or contest: between teams, between individuals, or any other type of statistic available for activities or contests.

FIG. 5D illustrates an exemplary embodiment of a screenshot 515 of a graphical user interface where a user is provided a number pad for providing a score guess or prediction. In the present graphical user interface, the user is asked to provide a score guess or prediction for the final score of a team of a rules-based activity or contest—baseball in this case. The graphical user interface in FIG. 5D illustrates the award for correctly guessing or predicting the final score of the team at the end of an activity or contest.

FIG. 5E illustrates an exemplary embodiment of a screenshot 520 of a graphical user interface where the predetermined time limit shown as a timer is expired. In this screenshot, the user has already input a score guess or prediction into the last column of the virtual scoreboard, indicating that he or she guessed or predicted that the chosen team of the activity or contest will score 8 runs by the end of the activity or contest.

FIG. 5F illustrates an exemplary embodiment of a screenshot 525 of a graphical user interface where a user is provided a number pad for providing a score guess or prediction. In the present graphical user interface, the user is asked to provide a score guess or prediction for the first inning of a baseball game. The graphical user interface of FIG. 5F illustrates the award for correctly guessing or predicting the score of the first inning of the user's chosen team at the end of an activity or contest—in this case, the first inning of the baseball game.

FIG. 5G illustrates an exemplary embodiment of a screenshot 530 of a graphical user interface where a user is given a trivia question. In the exemplary embodiment, the trivia question takes the form of a multiple choice question, and the trivia question itself relates to an activity or contest. The trivia question and answers can take any form and can be related to the activity or contest in any form, ranging from questions about historical facts about the activity to present day facts about the activity. The trivia question can also present an award opportunity to users, so merchant and/or sponsor material may be presented on the graphical user interface alongside the trivia question.

FIG. 5H illustrates an exemplary embodiment of a screenshot 535 of a graphical user interface where the user is provided pre-game information. The pre-game information can include a variety of information, including the singer of the national anthem of a particular activity or contest, and information about any other type of ceremonial activities, such as first pitch information. All of this information can also include the sponsor of those activities. This information can appear in the form of hyperlinks to third-party web sites or to other portions of the system.

FIG. 5I illustrates an exemplary embodiment of a screenshot 540 of a graphical user interface where the user is presented an award opportunity. The award opportunity as illustrated in FIG. 5I are presented to the user for correctly guessing or predicting a user's chosen team's scores for the entirety of an activity or contest. In the present screenshot, the user is presented the opportunity to win an automobile for correctly guessing or predicting his or her team's scores for each inning in the game. The disclosed technique and system can analyze statistics of an activity or contest and tailor awards and merchant and/or sponsor materials for any set or subset of statistics of the activities or contests. Alternatively, third-parties can interact with the mobile application for a preset number of opportunities for the activity or contest.

FIG. 5J illustrates an exemplary embodiment of a screenshot 545 of a graphical user interface where the user can input a television code, and FIG. 5K illustrates an exemplary embodiment of a screenshot 550 of a graphical user interface where the user can input a Facebook® code. As discussed later, users can access software similar to the mobile application and formatted to run on other types of computing devices, such as television and a computing device accessing Facebook®. The exemplary embodiment provides access codes through these other types of devices, and users may submit the provided access codes through the graphical user interface to get additional credits towards awards and to get awards associated to or presented with the access code.

FIG. 5L is an exemplary embodiment of a screenshot 555 of a graphical user interface providing a variety of links to other activities and contests. In the exemplary screenshot, the links appear as images of other activities and contests, where interacting with the images would direct the user via the computing device to either a third-party website, or another section of the mobile application or program for facilitating another rules-based activity. For example, a user can select the basketball icon and it could transfer the user to a third-party website or to a series of interfaces similar to FIGS. 5A and 5B for basketball. The user can perform similar actions with other icons of activities and contests presented on the exemplary embodiment.

FIG. 5M is an exemplary embodiment of awards exchanges 560. Awards may be exchanged between users, and the system facilitates exchange actions by associating the rewards to different users after confirmation of an exchange of awards. The awards exchange is discussed in further detail below.

FIG. 5N is an exemplary embodiment of a screenshot 565 of the graphical user interface as a waiting or loading screen. While the waiting or loading screen is visible, the system authenticates the user's client terminal and activates a series of processes associated with starting up the system for the user's access. These series of processes include retrieving information from third party data sources, the user database, or any other part of the system.

The exemplary embodiments discussed with respect to FIGS. 1, 2, 3A, 3B, 4A, 4B, and 5A to 5N relate to a mobile application, and thus may be downloaded to a mobile device. Other embodiments contemplate the exemplary embodiments can relate to a computer program running on a host server, and the computer program can be accessed by user computer devices, such as a smartphone, a tablet computer, or laptop. For example, users may download the mobile application using hardwired connection, such as a computer connected via a modem and an Internet server provider, or via wireless telephone networks or a wireless computer network (e.g., Wi-Fi). Moreover, users may download the mobile application via a website or other software installed on their computer devices.

Moreover, as mentioned above, the exemplary embodiments may be implemented in other environments, such as contests, promotions, financial and economic activities, board games, game shows, gambling activities, political elements, or any other activity on which a performance benchmark may be achieved or measured and the actual performance of an individual, collection of individuals, or a team in that activity can be measured.

In order for users to participate in or interact in some manner with an event or activity, the user or more accurately the user's mobile computer device may be required to be located within a predetermined distance of a geographic location having a computer network facilitating access to a system for keeping a user engaged with a mobile application, relating to the rules-based activity. As used herein, such a system is "related to" an activity in that it may facilitate users to participate in, input score guesses or predictions, or simply receive information about, the activity, while within the predetermined distance of the location. However, in these embodiments, a user can access such a system when the user's computing device is within a predetermined distance of a geographic location. The location may be, for example, a restaurant or bar offering the event for viewing, a collection of such establishments, or could be the actual location of the event, such as a sports stadium, arena, golf course, racetrack, bowling alley, etc. The location could be real as a wagering facility, such as a casino, or the location could be as large as an entire city, state, nation, or other politically independent territory or electronic as a telex or the location may be virtual. Also, the location can be a movable environment, such as automobiles, riverboats, ships, airplanes, buses, and trains.

Thus, generally speaking, exemplary embodiments include systems that can include a mobile application on a user's mobile device physically located within a predetermined distance surrounding a specific geographic location, or direct connection by a user via his or her computing device, whether mobile or not. A service computer, e.g., running at a specific location or across a computer network as discussed above, may provide entry to the user, via a mobile application or direct connection of the user's computing device, via a network where such entry is still limited based on the geographic location of the computer device. The interface of the service computer in such exemplary systems may be further configured to receive access information as the participant is accessing a mobile application, and the mobile application may communicate access information, including geographic location and an access code or other unique identifier. The service computer verifies access by the user based on the geographic location of the user's computing device and the specific access code entered by the user. Depending on the desired application, any type of location technologies or techniques, either now existing or later developed, may be employed to confirm the geographic location of the user's computing device. These include but are not limited to GPS-based technology, computer network technologies, and cellular telephone network technology. More specifically, exemplary location technologies and techniques employable include GPS technology, Assisted GPS technology (AGPS), Differential GPS (DGPS) technology, Time of Arrival (TOA) technology, Enhanced Time of Arrival (ETOA) technology, Maximum Likelihood (ML) and Least-Square (LS) location techniques, Angle of Arrival (AOA) location technique, Received Signal Strength (RSS) localization, Signal Fingerprinting, MAC address, Wi-Fi or other wireless computer/telecommunications technology location systems, Internet Protocol (IP) address, and RFID technology.

Figure 6:
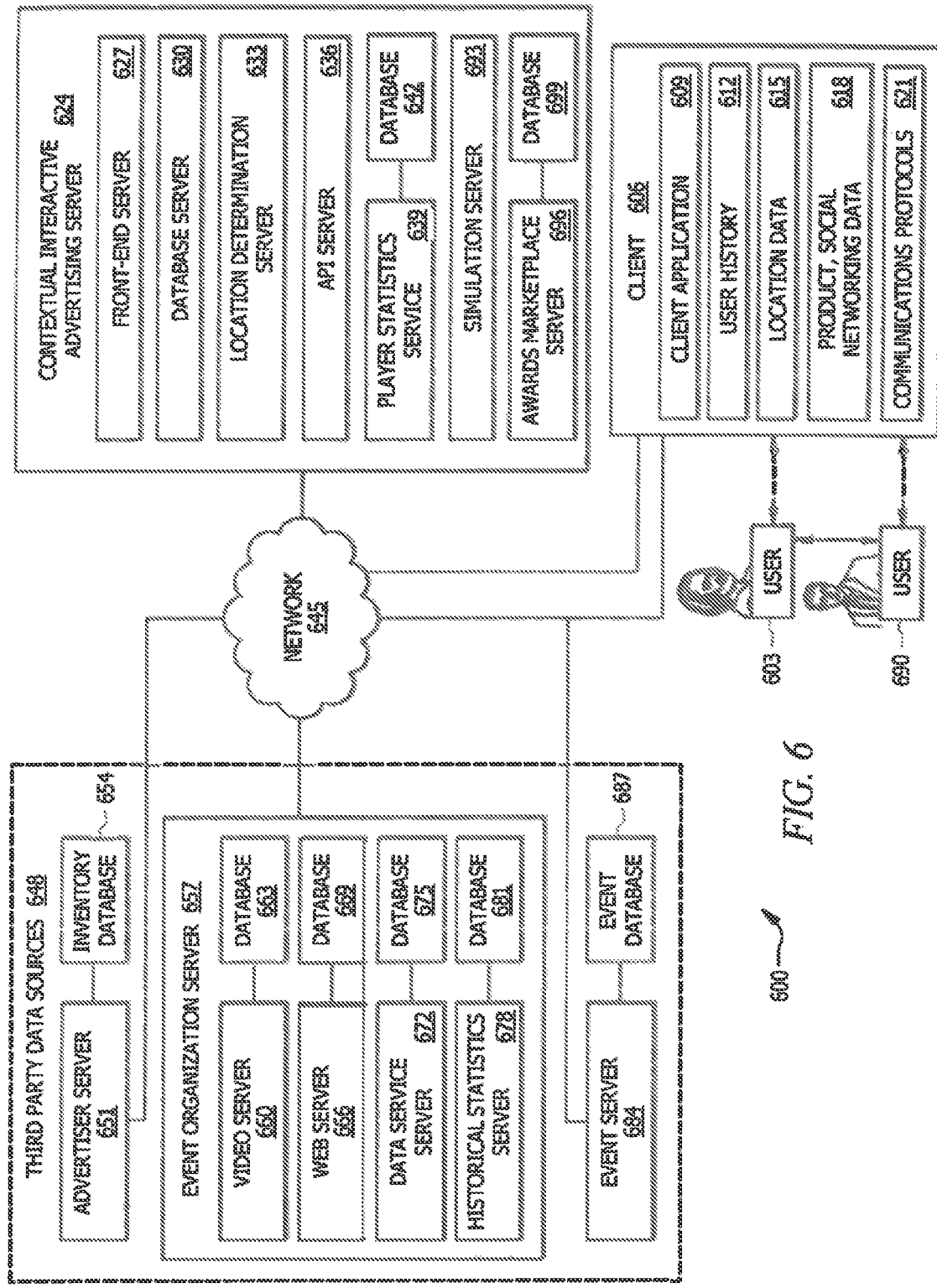
FIG. 6 illustrates a block diagram of a system for keeping a user engaged with a mobile application

Looking at FIG. 6, illustrated is a block diagram of an exemplary system for keeping a user engaged with a mobile application 600 in accordance with one or more embodiments. The system 600 can present merchant and/or materials to a user 603 through the use of an application 609 on a mobile device 606, and the merchant and/or sponsor materials can relate to one or more activities or contests and are communicated to the server 624 from third-party data sources 648. For example, the merchant and/or sponsor materials provides an award that incentivizes the user 603 to interact with the application 609. The application 609 is available through the mobile device 606, which can incorporate a display for presenting the application 609 and the merchant and/or sponsor material and also input/output devices for interacting with the application 609. The user can interact with the mobile device 606 for the prospect of winning the product presented. The application 609 has access to user history 612, location data 615, product and social network data 618, and communications protocols 621 and this information can be stored on the mobile device 606 and retrieved from third-party data sources 648.

While the term "product" is used herein as associated with the merchant and/or sponsor materials and awards, it should be appreciated that the product may actually be a product, a collection of products, a subscription, a service, media, licenses, any other goods, any other services, or any combination thereof. For example, the product may be food coupons, automobiles, a subscription to an online streaming services, tickets, games, sports memorabilia, airline miles, or any other product or service that can be described in an electronic coupon or award that can be redeemed by the user.

One or more mobile devices 606 may be coordinated by a server 624, and can comprise mobile telephones, personal data assistants, tablet computers, notebook computers, or any other type of computing device. Within the system 600, the mobile device 606 is configured to connect to the server 624 via a computer network 645, such as the Internet. The server is also configured to connect to a computer network 645 such as the Internet. Of course, other means of connecting the mobile device 606 and the server 624 to a computer network 645 may also be used, either now existing or later developed In an exemplary embodiment, the system 600 include the determination of the geographic location of the mobile device 606 associated with users accessing the system for keeping a user engaged with a mobile application 600 associated with the activities. In one embodiment, the geographic location of one or more of the mobile devices 606 may be provided or confirmed using GPS satellite location techniques. More specifically, one or more GPS satellites may be used in connection with GPS-based hardware/software in one or more of the mobile devices 606 to determine the location of such mobile devices 606 within a predetermined distance of a geographic location, such as a sports stadium or the grounds immediately surrounding the sports stadium. Alternatively, the geographic location of one or more of the mobile devices 606 may be provided or confirmed using one or more cellular towers. In such embodiments, mobile device geographic location is determined by a mobile telecommunications network via, for example, the location of the cell tower (i.e., the actual node on a cell tower servicing the mobile device), which is updated by the mobile device when it changes from one cell tower to another.

Still further, one or more of the mobile devices 606 may comprise an application 615 loaded thereon that facilitates the determination of the geographic location of the computing device having the application. Moreover, such an application 615 may be specifically associated with or developed by the provider of the one or more systems. Discussion of such an application 615 is provided in greater detail below. In yet other embodiments, a computer network may simply detect when the mobile device 606 is within a predetermined distance proximate the venue location having the network. In these embodiments, a mobile application 615, such an application similar to the application just discussed, may provide the location of the mobile device 606 by pinging a local network. Alternatively, rather than an application 615, a mobile device 606 may include hardware or software, such as RFID technology or Bluetooth. Other possible location technologies or techniques, whether specifically in a mobile device application or not, may include GPS technology, Assisted GPS technology (AGPS), Differential GPS (DGPS) technology, Time of Arrival (TOA) technology, Enhanced Time of Arrival (ETOA) technology, Maximum Likelihood (ML) and Least-Square (LS) location techniques, Angle of Arrival (AOA) location technique, Received Signal Strength (RSS) localization, Signal Fingerprinting, MAC address, Wi-Fi or other wireless computer/telecommunications technology location systems, Internet Protocol (IP) address, BEACON, and RFID technology. Of course, these techniques for location determination are simply exemplary, and thus can encompass any computing device location technique, either now existing or later developed.

In some embodiments, regardless of the technique used to confirm the geographic location of a user's mobile device 606, even if one or more mobile devices 606 are equipped with GPS-based or cellular tower-based location technology, or any other geolocation technology, once these mobile devices 606 are determined to not be within the predetermined distance of a specific geographic location, such as a sports stadium, these mobile devices 606 would not be permitted to access portions of the system for keeping a user engaged with a mobile application 600 associated with the rules-based activity. Thus, by confirming the geographic location of users 603, 690, access to such system for keeping a user engaged with a mobile application 600 can be limited to users within a predetermined distance of the specific geographic location, such as a sports stadium.

In addition to determining and confirming the geographic location of the mobile devices 606 associated with users 603, 690, access to the contextual interactive system 600 may also require the use of an identifier by the user attempting to access the system 600. In one embodiment, the access code may be provided by the host of an activity or contest, such as a sports stadium, so that users may access the system for keeping a user engaged with a mobile application 600 associated with the activity (in addition to confirmation of geographic location, as discussed above). Such an access code may be the same for all users wishing to access the system for keeping a user engaged with a mobile application.

Access codes can also be provided in other embodiments from one user to another user, so that users can get credit for interacting with the system 600. For example, a user may utilize two mobile devices 606 in accessing the system for keeping a user engaged with a mobile application 600, such as a laptop and a mobile phone, and uses the laptop for live streaming through the system for keeping a user engaged with a mobile application 600 and uses the mobile phone for interacting with the application 615 and the virtual scoreboard 110 therein. The system 600 may provide access codes associated with the live-streaming to input into the mobile phone for credit with the application 615.

The server 624 can be a centralized computing system for coordinating a plurality of system clients 606. The server 624 can coordinate and communicate through a computer network 645 such as the Internet with a plurality of third-party data sources 648 for merchant and/or sponsor material and information for activities or contests. Also, the server 624 may communicate and coordinate with a database server 630 for user information, marketing data, and information collected from the client 606.

The server 624 can comprise a front end server 627 for handling web page requests from users, and processing the request and returns the data, an application programing interface server 636, a database server 630, and a location determination server 633. The contextual interactive server 624 can also contain any number of servers required to operate the interactions between the server 624, the mobile device 606, and the third party data sources 648. One of such servers is a player statistics service 639 connected to a database 642 for storing user statistics.

Third-party data sources 648 may comprise any type of computing system that provides and communicates information to the system for keeping a user engaged with a mobile application 600. These third-party data sources 648 may be any individual or organization desiring to advertise a product or service through the system for keeping a user engaged with a mobile application 600. For example, third parties may be a manufacturer, a vendor, a marketing company, or any other merchant of goods and/or services, including the teams themselves. Additionally, third-party data sources 648 can comprise official associations of activities or contests, such as Major League Baseball and the National Football League. The server 624 can provide an interface for third parties, such as merchants, to configure associated awards and merchant and/or sponsor materials. Merchant and/or sponsor materials may include graphics, video, animations, music, audio, text content, memes, emoticons, and various other media elements.

FIG. 6 illustrates two different third-party data sources: a merchant or sponsor server 651 in communication with an inventory database server 654, an event organization server 657, and an event server 684. The merchant or sponsor server 651 can be operated by a merchant, sponsor, charity, or marketer, and provides merchant and/or sponsor materials to the system for keeping a user engaged with a mobile application 600 via a computer network 645. Likewise, the event organization server 657 can be operated by an organization for an activity or contest, such as Major League Baseball and National Football League. The event organization server can comprise a video server 660, a web server 666, a data service server 672, and a historical statistics server 678, and each of these servers can communicate with respective databases 663, 669, 675, and 681. A historical statistics server 678 operated by the user or a third-party vendor stores historical statistics that can be used for the simulations described below. Additionally, a series of event servers 684, connected to a database 687 for storing information, in parallel or cascade operated by the user or farmed to a third-party to keep data and statistics on each of the events, in this case a particular sport (e.g., baseball) can be an event. In this context, other examples of an event can be: other sports, a political race, a financial stock prediction, and board game.

Furthermore, third-party data sources 648 can provide the additional content 130 to present to the user on the mobile device 606 alongside the virtual scoreboard 110. As mentioned previously, the additional content can comprise live-streaming of an activity or contest specific to the virtual scoreboard 110. For example, the system 600 determines that the user is interacting with the mobile device 606 with respect to the baseball game, currently televised or to be televised. The system 600 then prompts the user 603 for live-streaming of the event, through the third-party data sources 648, such as the video server 660 of the event organization server 657; the system 600 may prompt the user 603 for subscription information for the third-party data sources 648. This live-stream of the activity or event provides the context for the user 603 to interact with the system 600. The third-party data sources 648 provide additional content 130 comprising daily schedules of activities or contests, statistics for players or members of the activities or contests, and pre-game trivia with dynamic merchant and/or sponsor materials and opportunities. The event database interfaces with the Network by providing data for the app to create the scenario for which the user will interact. In addition to wireless communications, there may be opportunities for hard-wired internet and communications solutions along with close-feed video to be incorporated (e.g., gambling activities).

Additional content can include virtual competitive simulations of activities between players, past, and present. These virtual competitive simulations can be generated in real-time and are based on known and historical statistics of players or members of activities and contests. For example, a virtual competitive simulation can be generated for a baseball game between the 1976 Cincinnati Reds and the 2000 New York Yankees, and because this game never occurred, the system 600 uses statistical data and information about these two teams to simulate a game between them as if they had played or could play each other. The system 600 can simulate the scores; the plays made by teams, players, or individuals; and any other information for an activity or contest. Virtual competitive simulations are generated using artificial intelligence-driven algorithms stored on and executed by a simulation server connected to the server 624. The simulation server 693 connects to and retrieves from a database server comprising statistics and information about players and members of activities and contests. These players can be currently active players and members, retired players and members, or past players and members. The simulation server 693 takes in the information from the database server and generates information for the simulated game. In an embodiment, users of the system can select any team, individual, or collection of individuals of an activity or contest for any virtual competitive simulation, and in another embodiment, the parties of an activity or contest is predetermined for the user by a third party. For these virtual competitive simulations, users can be given an opportunity to win awards by correctly guessing or predicting the score of the simulated rules-based activity or contest. The system and the user can treat these simulated activities or contests as any other activity or contest. The simulations can be presented to the user in "real-time," which in this embodiment means that events of a simulated activity or contest is presented to the user as if the events happened in real life. For example, the user simulates a baseball game in real-time, so the system presents strikes, outs, hits, and runs to the user based on an average time for these types of events. In other embodiments, the simulations can be presented to the user in an expedited manner. For example, the user simulates an expedited football game, so the system presents a quarter of a football game in the span of a few minutes as compared to the 30 minutes a normal football quarter would take. Alternative embodiments comprise generated videos of the virtual competitive simulations of activities, generated play charts for showing the plays, and side-by-side charts and comparisons of the simulated game data to known and historical data and information.

In conjunction with third-party data sources 648, the system for keeping a user engaged with a mobile application 600 can communicate with payment and financial systems so that users can take full advantage of the system and the awards of the dynamic merchant and/or sponsor materials.

In some embodiments, the system for keeping a user engaged with a mobile application 600 provides an interface on the mobile device 606 to interact and communicate with an individual, a group of individuals, or a team of an activity or contest. In turn, the server 624 facilitates the communication by providing an interface with third-party data sources 648 for continued interaction and communication with users. This in turn allows for users 603 to interact with members of an activity or contest without disclosing private information to others.

The interface on the mobile device 606 can be used to communicate with other users 603. The interface of the mobile device 606 can comprise of messaging groups, forums, social networking posts, and other types of social networking that currently exist or are later developed. This embodiment can be used by users 603 to facilitate social gatherings, group deals and discounts, and other types of social activities. The system for keeping a user engaged with a mobile application 600 and mobile device 606 can also incorporate and facilitate different communication protocols, such as text, email, voice, currently available and later developed communication protocols, into the messaging capabilities available to users 603. In some embodiments, the application 615 can use other applications already installed on the device as extensions to allow these communication protocols through the application 615. This can allow users 603 to have access to communication functions without leaving the application 615.

The interface of the mobile device 606 can also be used as a marketplace for exchanging awards between users 603, and the system 600 can facilitate such by providing access to a user's stored awards. Using such a marketplace-type interface, users may be able to share with other users 603 offers for trades of stored awards. In alternate embodiments, users 603 may exchange stored awards with the system 600 to get credits for a system-based store of awards. This marketplace interface embodiment allows users 603 flexibility with awards. For example, a user 603 wins a food award comprising a chicken sandwich from Chick-Fil-A®, but so happens to be a vegetarian; with the marketplace interface with the mobile device 606, the user 603 can communicate with other users 603 to exchange the chicken sandwich food award for another award. Alternatively, the user can interact with a system-based store to exchange the food award for credits toward another award. The mobile device 606 can facilitate the marketplace and user social networking so as to maximize a user's experience with the awards provided by the system 600.

In further embodiments, the system for keeping a user engaged with a mobile application 600 analyzes users' interactions with the system for keeping a user engaged with a mobile application 600 and respective mobile device 606, and this analysis can comprise information on what merchant and/or sponsor materials to which users 603 respond. For example, the system 600 may determine that a user 603 primarily interacts with the application 615 for merchant and/or sponsor materials with food awards, so the system 600 may then tailor the incentivizing awards so that the user 603 interacts with the application 615 more. Further, the system 600 can track how often a user 603 attends an activity or contest, and the location of the user 603 as the user 603 interacts with the system for keeping a user engaged with a mobile application 600 and respective mobile device 606. By keeping track of the user's activities in relation to the system for keeping a user engaged with a mobile application 600, the system 600 can provide analytic graphs and statistics to the user 603 through the mobile device 606 and to third parties, such as charts of a user's attendance at games and charts of users with the highest attendance at activities or contests. Using the analysis generated from tracking a user's activities with the system 600 and the mobile device 606, the system 600 permits third parties to provide further merchant and/or sponsor material to the user 603. The system 600 can provide third parties a full range of analytic data based on the materials and/or banners used.

Figure 7:
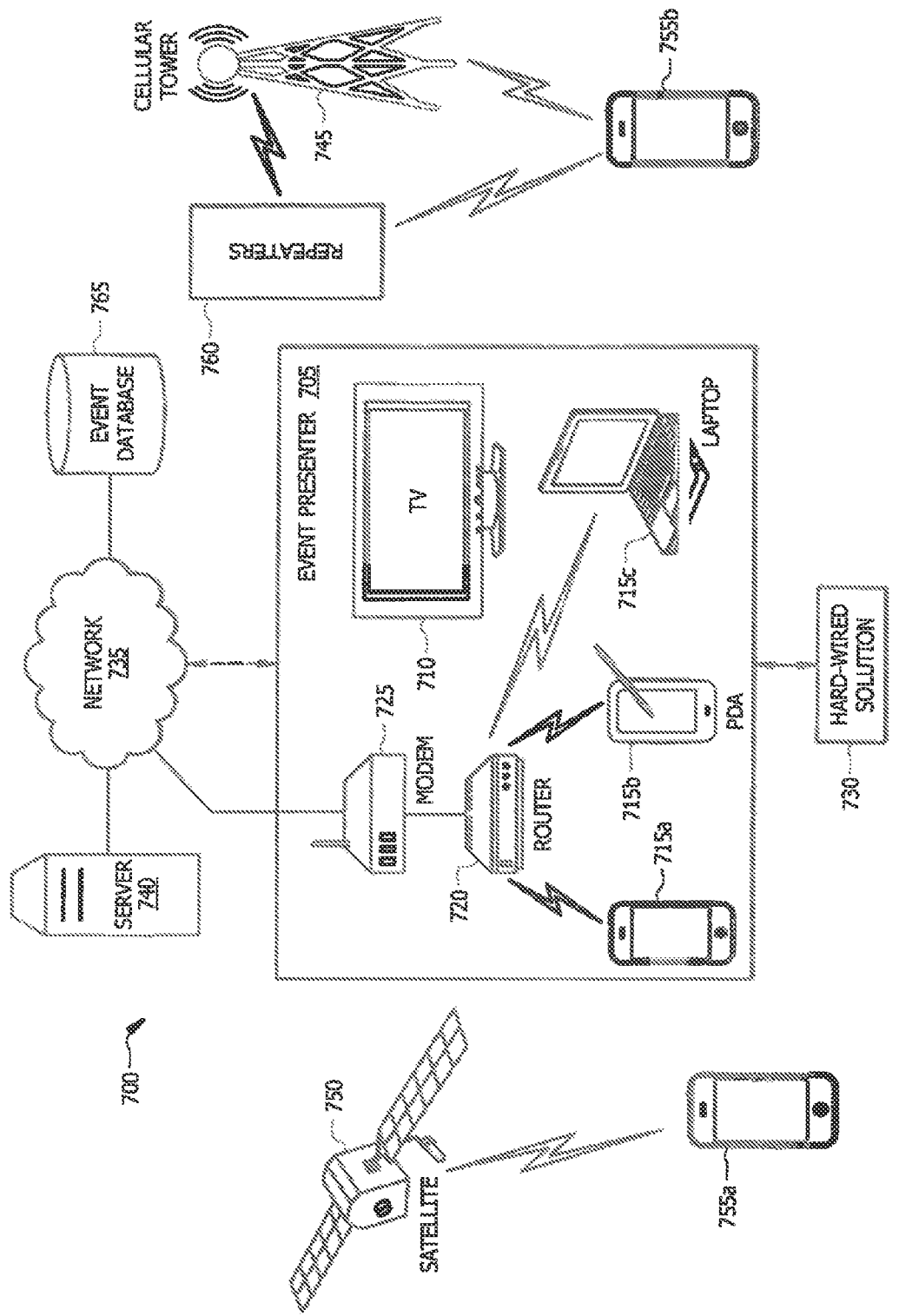
FIG. 7 illustrates another exemplary system for providing access to a system for keeping a user engaged with a mobile application for one or more rules-based activities.

Turning now to FIG. 7, illustrated is another exemplary system for providing access to a system for keeping a user engaged with a mobile application 700 for one or more activities while at a single location displaying an event related to the activities. More specifically, the system 700 includes an event presenter 705 that presents an event within the activity for display to its patrons. For example, the event presenter 705 may be a restaurant or bar having televisions 710 for presenting the event to its patrons. In such embodiments, the event may be a sporting event, but any type of event may be presented.

Within the event presenter 705 may be one or more patrons, each with a mobile device 715a, 715b, 715c. The mobile devices 715a, 715b, 715c may be mobile telephones, personal data assistants, tablet computers, notebook computers, or any other type of computing device. The mobile devices 715a, 715b, 715c can also include wearable technology and implantable technology. While within the event presenter 705, the mobile devices 715a, 715b, 715c may communicate with a wireless communications device 720, such as a wireless router. The wireless communications device 720 may be connected to a network device 725 configured to connect to one or more servers via a computer network, such as the Internet. Such network device 725 may be a modem, server, or any other type of computing device configured to facilitate such a network connection. Moreover, the event presenter 705 may provide hardwire connections to patrons using the network device 725. Thus, by providing the ability for patrons' mobile devices 715a, 715b, 715c to connect to a computer network via wireless or hardwired connections, the event presenter 705 has established a local area network for its patrons. The patrons' mobile device 715a, 715b, 715c can also connect to a hard-wired solution 730 to access the computer network 735, the central processing server 740, and any or all event databases 765.

Alternatively, regardless if a local area network is provided or not, patrons may directly connect their mobile devices 715a, 715b, 715c to a computer network 735 via a wireless telephone network. In such embodiments, the computing devices 755a, 755b may connect using a voice network or a data network, such as through a telecommunications tower 745 or satellites 750. A series of relays and repeaters work to ensure that wireless signals are transmitted and received without interruptions. Of course, other means of connecting a computing device 755a, 755b may also be used, now existing or later developed.

Connection via the local area network of the event presenter 705 or via another network connection means facilitates access to one or more systems via the computer network 735 or other computer network. Such systems may be hosted by a server across the computer network 735 and may be related to facilitating one or more activities that may occur at any location around the world. For example, the system may facilitate one or more of the events, such as a sporting event, in the exemplary manner discussed above. In addition, the system may provide information specifically related to one of the events, and each type of events may have its own dedicated secure system accessible by users in a manner discussed in the exemplary embodiments above.

The use of a local area network secures the system for keeping a user engaged with a mobile application when in use in conjunction with an activity or contest. Further, using a local area network or locating users of the system for keeping a user engaged with a mobile application during an activity or contest can provide valuable analytics to merchants, charities, or sponsors.

Figure 8:
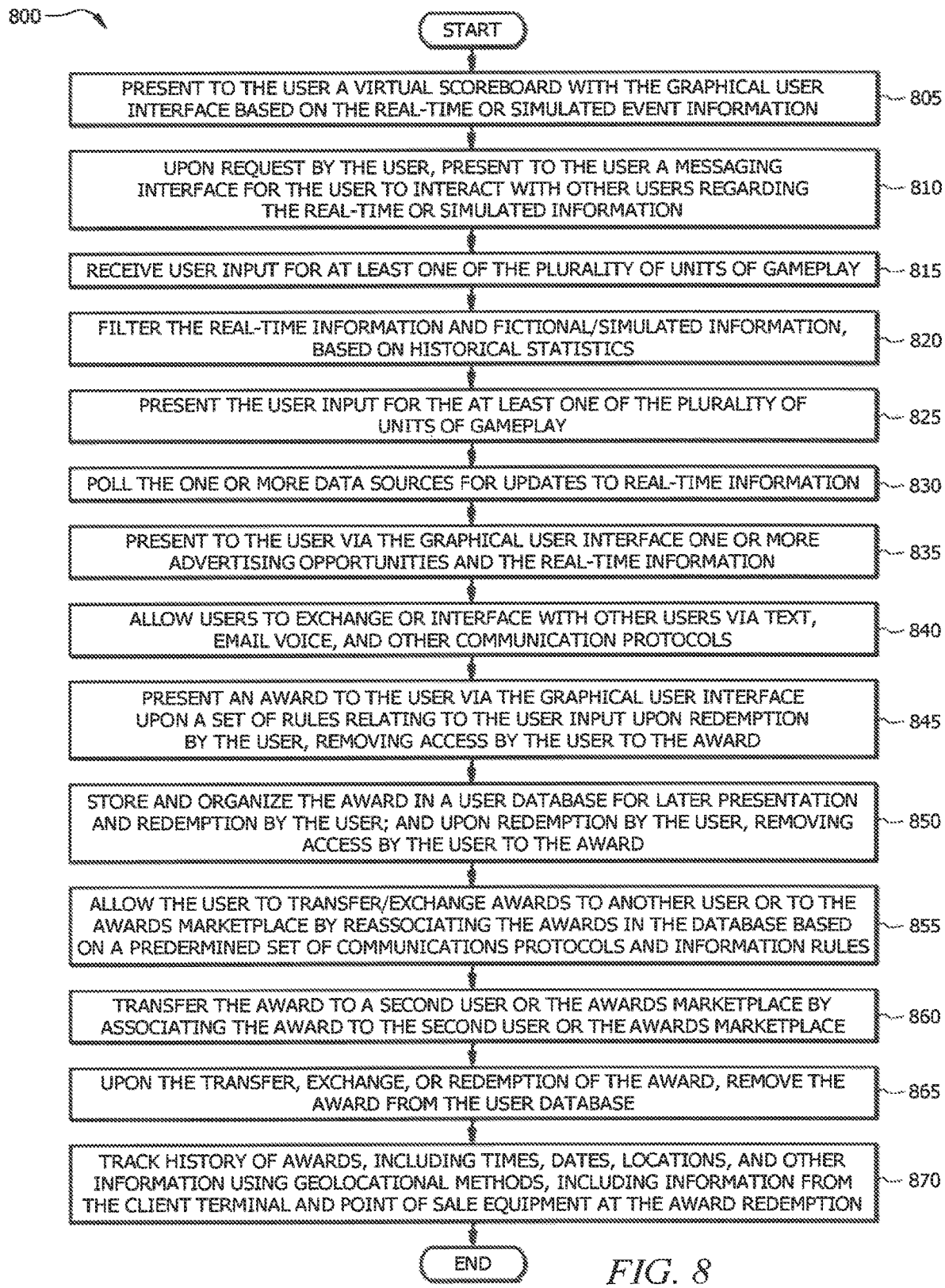
FIG. 8 illustrates flow diagrams of an exemplary method for interactive fan engagement.

FIG. 8 illustrates a flow diagram of an exemplary method 800 for the mobile application environment described hereinabove. The method comprises providing at least one processor having computer-reading program code stored therein that, when executed by the at least one process, causes the processor to perform the following method steps comprising: (1) providing a virtual scoreboard with a graphical user interface on a client terminal, wherein the virtual scoreboard is configured to accept user input for a plurality of units of gameplay within a prescribed time limit and is configured to display real-time information (805); (2) obtaining and presenting user input for at least one of the plurality of units of gameplay (815) (825); (3) polling one or more data sources for updates to the real-time information (830); (4) retrieving at least one opportunity before the user interacts with the virtual scoreboard (835); (5) presenting the at least one opportunity and the real-time information on the client terminal, wherein the at least one opportunity encourages interaction with the virtual scoreboard (835); (6) allowing users to transfer/exchange awards with other users by re-associating the awards notification to the other user, based upon a predetermined set of communications protocols and informational rules (840); (7) presenting an award notification to the user via the client terminal upon a set of rules relating to the user input and the real-time information, wherein the award notification relates to the at least one opportunity (845); and (8) storing and organizing the reward notification in a user database for subsequent presentation to the user via the client terminal (850). In other embodiments, the real-time or simulated information is filtered based on factors set forth in the above embodiments (820). The virtual scoreboard can be based on the real-time or simulated information. Upon request by the user, a messaging interface can present to the user for the user to interact with other users regarding the real-time or simulated information (810). Also, the award can be transferred to a second user by associating the award to the second user in the user database (860). Further, upon redemption by the user, access can be removed from the user to the award (865). Additionally, the method can also comprise the following: upon redemption, removing the award notification from the user database (860); and tracking the history of awards, including time, date, location and other information client terminal of award redemption (870).

Figure 9A:
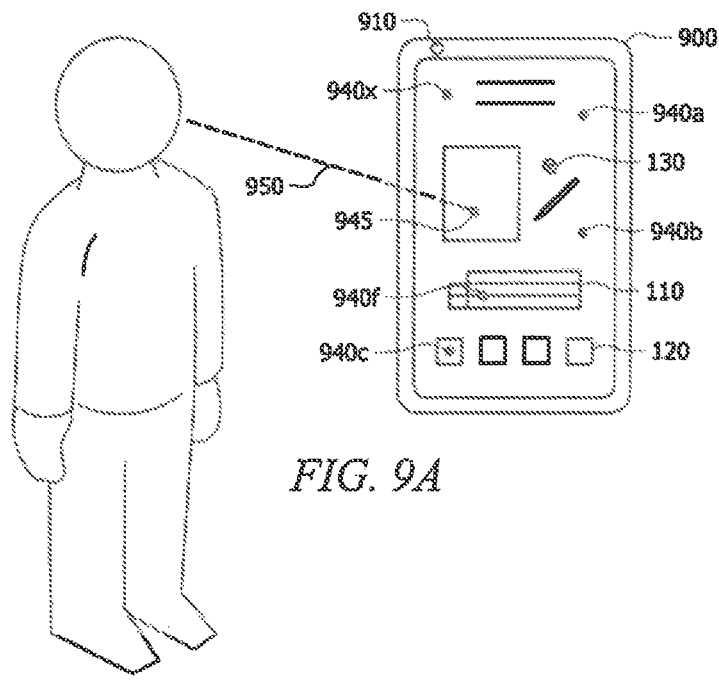
FIGS. 9A-9D illustrate a system for keeping a user engaged with a mobile application with gaze tracking according to an embodiment of the disclosure.

Mobile Device Gaze Tracking to Improve Fan Engagement with the Mobile Application An embodiment of a system and method for keeping a user engaged with a mobile application can utilize mobile device 900 gaze tracking to move information to the positions the user is looking to help keep the user engaged with the mobile application running on the device 900. FIG. 9A illustrates a mobile device 900 configured with gaze tracking. The mobile application can be configured to present links 120, additional content 130, and a virtual scoreboard 110. The mobile device 900 can include an integrated camera 910. The mobile application can have permission to access the camera module 920 of the mobile device 900, giving access to the camera 910 and integrating the camera's 910 features into mobile application.

The mobile device 900 can include a gaze tracking system 930 that uses the camera 910 of the mobile device 900 to track the user's eye movements while using the mobile device 900 and that corresponds the sensed eye movements to positions on the graphical user interface (GUI) of the mobile device 900. This positional information can be stored, allowing logic in the gaze tracking system 930 to determine the portions of the screen of the mobile device 900, and the contents thereon, that are drawing the user's attention most frequently during a given time period. Sponsor information or information on potential awards can then be moved to the positions identified by the gaze tracking system 930. The mobile device 900 can be a mobile phone, tablet, smart watch, laptop, other computing device, or combinations thereof. The gaze tracking system 930 can also keep a record of when the camera 910 stops recording because the user has left the application running on the mobile device 900. This allows the gas tracking system 930 to track where the user was looking before the camera 910 stopped recording. The gaze tracking system 930 can determine what content was on the display of the mobile device 900 at the time and determine if many users are leaving the application after viewing that content. If user churn is determined to be related to the content, the mobile application can remove the content or adjusted content position on the screen of the mobile device 900 to keep users engaged with the application.

The application can access the camera 910 of the mobile device 900. The camera 910 can either take periodic still images or take a continuous feed of the user's face. Through the still images or the video feed, the gaze tracking system 930 can first determine the facial features of the user. The gaze tracking system 930 can have executable instructions that allow the gaze tracking system 930 to determine the features of a human head from a 2D image. These facial features can include eyes, nose, mouth, eyebrows, eyelashes, cheekbones, the brow line, other distinguishing features, or combinations thereof. The gaze tracking system 930 can then take the 2D image of the facial features and map them in 3D space. This process is run by an algorithm in the gaze tracking system 930, helps determine the actual distance between certain features, and is important in determining the angle of the user's face and eyes. As the gaze tracking system 930 maps the features to the 3D space, the gaze tracking system 930 can also determine the center of the user's eyes. The gaze tracking system 930 can then use the center of the eyes and the 3D mapped facial features to determine the viewing angle 950 for each eye. In certain embodiments, the gaze tracking system 930 can access a built-in level application or function of the mobile device 900. The gaze tracking system 930 can then use the level application or function to aid in determining the angle, relative to a calibrated flat, that the mobile device 900 is being held.

Figure 9B:
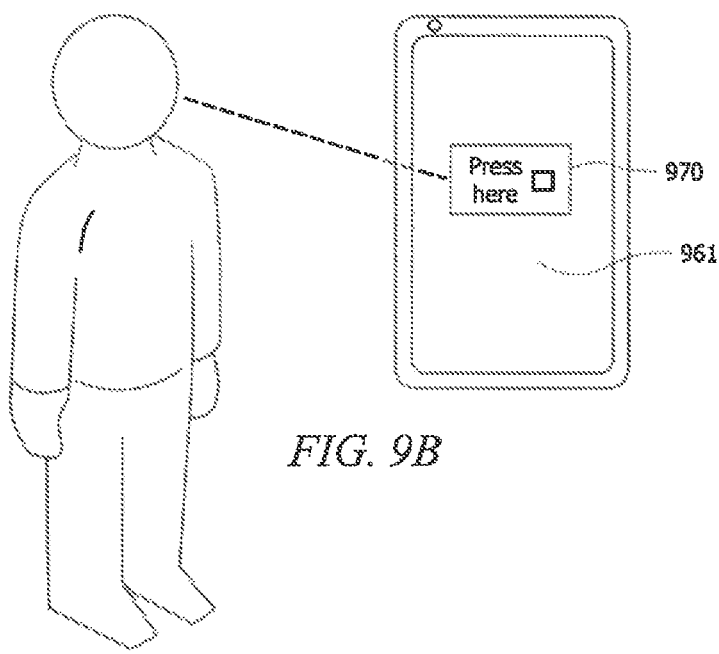
Figure 9C:
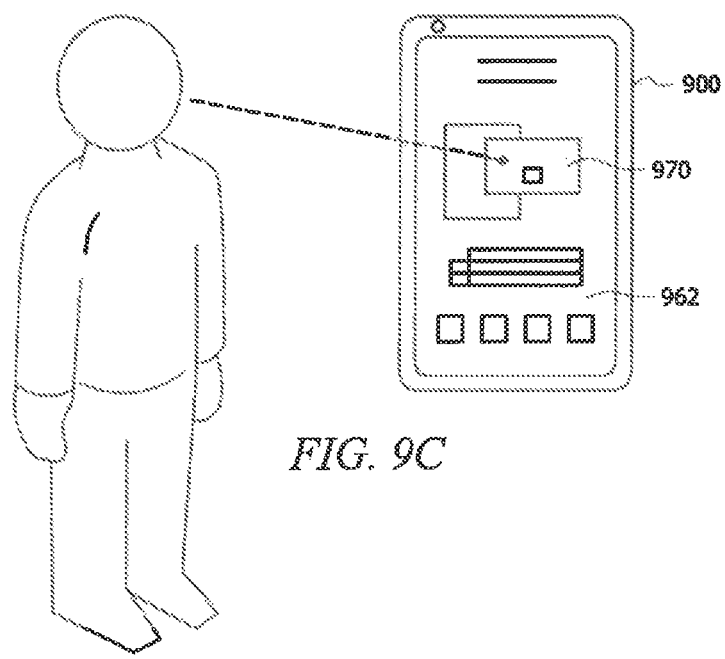

The gaze tracking system 930 can also have one or more calibration systems 960 to increase the accuracy of determining the center of the eye and the viewing angles as seen in FIGS. 9b and 9c. FIG. 9B depicts a first calibration method, an initial calibration system 961, occurs when a user uses the application on the mobile device 900 for the first time. The application accesses the camera 910 of the mobile device 900 through the camera module 920. The camera 910 can take a still image or continuous feed of the user's face. The gaze tracking system 930 can then begin the calibration process. During the calibration process the gaze tracking system 930 can provide target visuals 970 at specific positions on the screen of the mobile device and ask the user to look at the target visual 970. The gaze tracking system 930 knows the locations of these target visuals 970 and therefore is able to make calculations and calibrate to a specific user's face for these known positions. Once the calibration process has been completed, the gaze tracking system 930 can use the completed calibration stored in the user's application history to improve the overall effectiveness of the gaze tracking system 930

FIG. 9C depicts an active calibration system 962. The active calibration system 962 can be used in conjunction with or in place of the initial calibration system 961. The active calibration system 962 can, at intervals, populate a target visual 970, in the form of a message, on the system for keeping a user engaged with a mobile application that requires interaction from the user. The gaze tracking system 930 knows the location of the target visual 970 and therefore is able to make more precise calculations about the center of eyes and viewing angles 950. These calculations can then be stored to improve future performance.

Once the viewing angle 950 for each eye is determined, the gaze tracking system 930 can determine the intersection point 945 of the viewing angles 950 for the eyes. This intersection point 945 informs the gaze tracking system 930 where the user is looking, as long as the user is looking at the mobile device 900. The gaze tracking system 930 can then correspond the intersection point 945 to a position on the GUI of the mobile device 900. The gaze tracking system 930 can then store that position as a first view point 940*a*.

The gaze tracking system 930 can then either use the camera 910 of the mobile device to take another still image or use the continuous feed to repeat the process of determining the viewing angles 950, intersection point 945, and determining a second view point 940*b*. This process can be conducted continuously to generate a plurality of view points 940*a-n* as long as the screen of the mobile device 900 is active. At specified intervals the gaze tracking system 930 can pull the plurality of view points 940*a-n*. The gaze tracking system 930 can determine a position on the screen of the mobile device with the most view points 940, or a target view point 940*x* that was viewed more than any other view point 940. The gaze tracking system 930 can divide the screen of the mobile device into sections to determine the most viewed position or can use the layout of the user interface (UI) and use the information and components on the screen. For example, the gaze tracking system 930 can divide the screen into 6 sections, left and right sides and top, middle, and bottom of each side respectively. This can allow the gaze tracking system 930 to group multiple view points 940*a-n* in similar areas together but may lack a correlation to the information on the screen of the mobile device 900. In embodiments where the gaze tracking system 930 is connected to the UI of the mobile device 900, the gaze tracking system 930 would be able to determine if multiple view points 940*a-n* were focused on different portions of the virtual scoreboard 110 even if the multiple view points 940*a-n* were not all at the same position. In embodiments where the gaze tracking system 930 is connected to the UI, the gaze tracking system 930 would also note if the screen was changed to a different page or section of the application and can then correspond the subsequent view points 940*a-n* to the information or content of those sections and not just sections of the screen in general.

After determining the position or content with the most view points 940*a-n*, or the target view point 940*x* with more views than any other of the plurality of view points 940*a-n* in a given period of time, the gaze tracking system 930 can store this information as use data. The application can analyze the use data as well as send the use data to the central processing server 740 and event databases 765. The application can use the use data to change the layout of the UI in real-time to put different information at or near the position or content that had the most view points 940*a-n* or the position of the target view point 940*x*. In this way the application can encourage continued interaction with specific content displayed on the mobile device 900, including the virtual scoreboard, by placing the information or content at or near the content or position most frequented by the user.

Figure 9D:
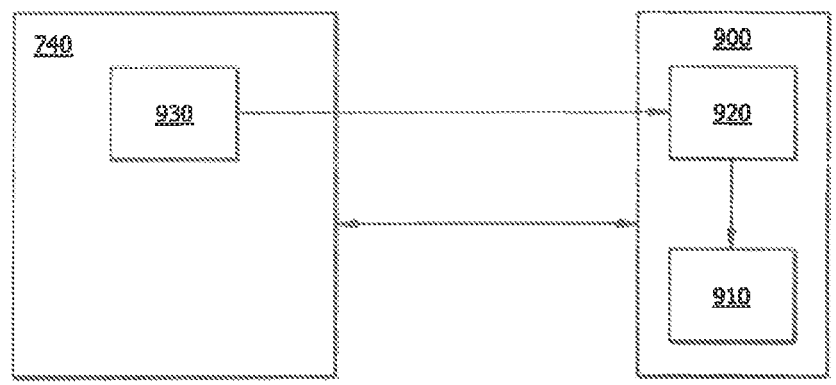

FIG. 9D illustrates the camera 910 and camera module 920 on the mobile device 900 and the gaze tracking system 930 on the central processing server 740. The central processing server 740 can be in communication with the mobile device 900. When the mobile application is active on the mobile device 900, the mobile device 900 can communicate with the central processing server 740. Once the central processing server 740 receives communication from the mobile device 900 that the mobile application is running, the central processing server 740 can activate the gaze tracking system 930. The gaze tracking system 930 can control the camera module 920 of the mobile device 900 to access and control the camera 910 of the mobile device 900 during use of the mobile application.

System Requiring Fan Engagement with a Mobile Device for Award Redemption

Figure 11:
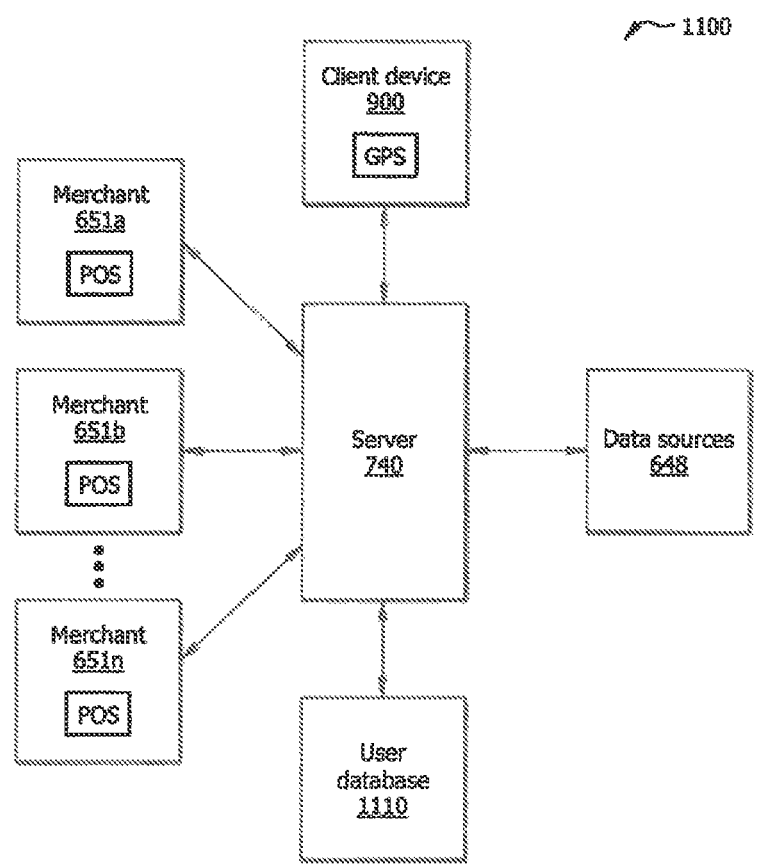
FIG. 11 illustrate a system for keeping a user engaged with a mobile application according to an embodiment of the disclosure.

FIG. 11 depicts another embodiment of the system for keeping a user engaged with a mobile application. The system for keeping a user engaged with a mobile application can provide a central processing server 740, a user database 1110, one or more data sources 648, one or more mobile devices 900, and a plurality of merchant servers 651*a-n*. The central processing server 740 can be configured to provide a virtual scoreboard 110, accept user input, update real-time information presented in the virtual scoreboard 110, determine if the user input matches the real-time information in the virtual scoreboard 110, distribute one or more awards for matching input, and redeem the earned awards. The user database 1110 can store the awards earned by the users before the awards are redeemed, as well as information on the awards after redemption.

The central processing server 740 can include one or more processors, memory, networking cards or interfaces, and other equipment for performing the method disclosed herein for providing an interactive fan engagement application. The central processing server 740 can be multiple computers, located in a brick-and-mortar location, local to the administrator of the system for keeping a user engaged with a mobile application, in the cloud, or a combination thereof. The central processing server 740 can be configured to communicate simultaneously with the one or more data sources 648, the mobile device 900, a user database 1110, and a plurality of merchant servers 651*a-n*.

The central processing server 740 can be configured to control and send information over a computer network 735 to an application running on the mobile device 900. Through the application, the central processing server 740 can present a virtual scoreboard 110 with a graphical user interface (GUI), wherein the virtual scoreboard 110 is configured to display real-time information. The real-time information can be retrieved by the central processing server 740 from one or more data sources 648. The one or more data sources 648 can be websites, databases, live streams, other sources of sporting information, or combinations thereof. The one or more data sources 648 can be operated by the sports league, sports teams, third-parties, or combinations thereof.

The virtual scoreboard 110 can also be configured to accept user input for a plurality of units of gameplay related to the real-time information within a prescribed time limit. The units of gameplay can include quarters, innings, sets, periods, laps, rounds, races, stages, halves, cycles, other specified period of counting time, or combinations thereof. The units of gameplay can also be other measurements of time if the selected rules-based event is not a sporting event. The user input can be received by the application and sent over the computer network 735 to the central processing server 740. The application can also present the user input in the GUI so the user can review their input and change it before the prescribed time limit.

The central processing server 740 can poll the one or more data sources 648 for updated information. As the rules-based event proceeds, the central processing server can, at set intervals or continuously, receive updated information for the rules-based event from the one or more data sources 648. As the central processing server 740 receives updated information from the one or more data sources 648, the central processing server 740 can send that information over the computer network 735 to the application on the mobile device 900.

After a unit of gameplay is complete, or the rules-based event is complete the central processing server 740 can determine if the user input matches the real-time information for one or more of the plurality of gameplay units. The central processing server 740 can distribute selected awards for any of the plurality of gameplay units that the central processing server 740 determined matched the user input.

In embodiments where an award is earned for the closest user input to the real-time information, the central processing server 740 can receive all of the user input from a plurality of mobile devices 900 for a selected rules-based event. After a unit of gameplay or at the end of the rules-based event, the central processing server 740 can compare the real-time information to all of the collected user input for the plurality of gameplay units. The central processing server 740 can determine the one or more user input with the closest numerical value to the real-time information for each of the plurality of gameplay units. The central processing server 740 can then send the selected awards to the mobile devices 900 associated with the users with the closest input for each of the units of gameplay.

The system for keeping a user engaged with a mobile application can also include a user database 1110. The user database 1110 can include one or more processors, memory, networking cards or interfaces, and other equipment such that the user database 1110 can store user and award data. In embodiments, the user database 1110 can be considered to be a part of the central processing server 740; while in other embodiments, the user database 1110 is separate from the central processing server 740. The user database 1110 can be configured to store award and user data that is written to memory by processor(s) of the central processing server 740 and that is accessible by the central processing server 740. The user database 1110 can store any earned awards as well as information for any previously redeemed awards. The central processing server 740 can retrieve the award information when the award information is needed to redeem the award from the associated merchant.

The mobile device 900 is illustrated in FIG. 11 as a smartphone; however, the one or more mobile devices 900 can be embodied as a personal data assistant, laptop, tablet, smartwatch, other computing device configured to run the application described, or combinations thereof. The mobile device 900 can have a GPS or other location device and a camera. The mobile device 900 can be configured to run the application of the system for keeping a user engaged with a mobile application. The mobile device can be configured to communicate with the central processing server 740 using wireless internet connection, Global System for Mobile Communication (GSM), Code-division multiple access (CDMA), General Packet Radio Service (GPRS), Evolution-Data Optimized (EV-DO), Enhanced Data Rates for GSM Evolution (EDGE), Universal Mobile Telecommunications system (UMTS), other wireless communication methods, or combinations thereof. The mobile device 900 can be configured to share GPS or other location data with the central processing server 740 when requested. The application run by the central processing server 740, on the mobile device 900, can have access to other functions of the mobile device 900 when needed.

The plurality of merchant servers 651a-n can each include one or more processors, memory, networking cards or interfaces, and other equipment. The plurality of merchant servers 651a-n can be configured to communicate with the central processing server 740. The central processing server 740 can have a location saved for each of the locations for a particular merchant. When a user requests to redeem an earned award from one merchant of the plurality of merchants, the central processing server 740 can send a message to the merchant server 651a associated with the selected merchant with the award data retrieved from the user database 1110. Once the merchant server 651a has verified the award, the merchant server 651a can send an encrypted information packet to the central processing server 740. The central processing server can then send the encrypted information packet to the mobile device 900.

Each of the plurality of merchant servers 651a-n can be configured to communicate with one or more point-of-sale devices associated with a specific merchant. The one or more point-of-sale devices can include a handheld barcode scanner, a tablet, a smartphone, a computer, other computing devices, or combinations thereof. The point-of-sale devices can be configured to communicate with the associated merchant server 651. In certain embodiments, the point-of-sale devices can also be configured to simultaneously communicate with the mobile device 900; while in other embodiments, the point-of-sale device can be configured to recognize a code on the display of the mobile device 900. The type of point-of-sale device used by the specific merchant can be saved in the merchant server 651a. The central processing server 740 can send proper instructions to the mobile device 900 to use a method of verification matching the type of device used by the selected merchant.

Figure 13:
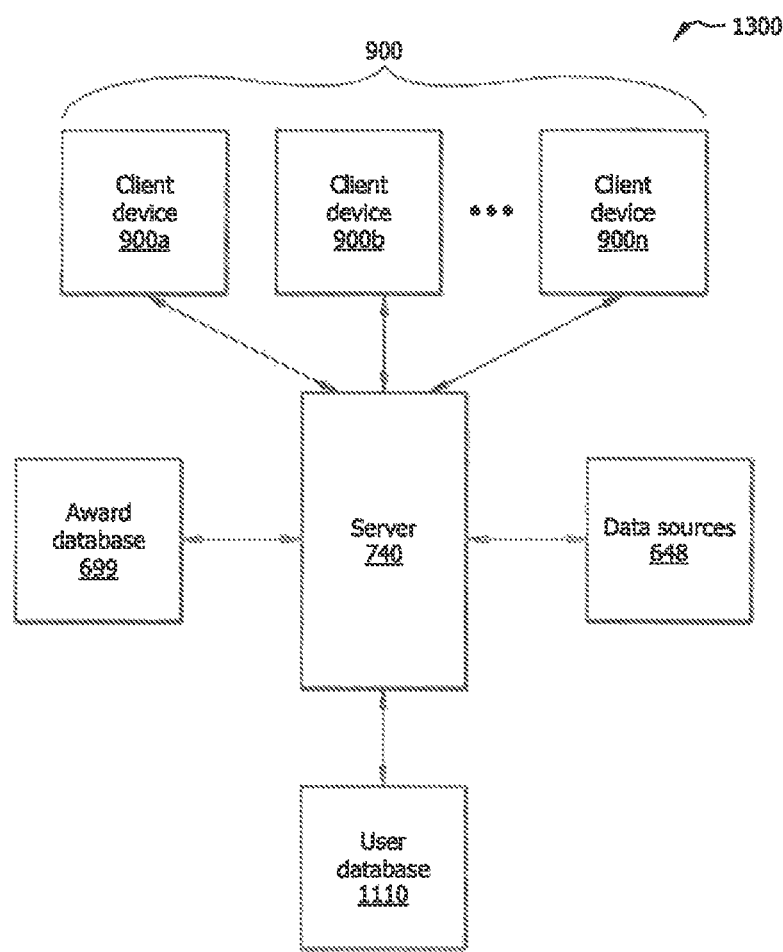
FIG. 13 illustrate a system for keeping a user engaged with a mobile application according to an embodiment of the disclosure.

System Requiring Two-Device Confirmation to Improve Fan Engagement with the Mobile Devices FIG. 13 depicts an embodiment of the system for keeping a user engaged with a mobile application with a trade and barter system. The system for keeping a user engaged with a mobile application can include a central processing server 740, a user database 1110, an award database 699, one or more mobile devices 900, one or more data sources 648. The central processing server 740 can be networked to all other components of the system for keeping a user engaged with a mobile application through different means. Each of the components shown in FIG. 13 can be embodied with computer equipment such as one or more processors, memory, networking cards or interfaces, and other equipment for processing data (e.g., sending/receiving messages containing data) associated with the system for keeping a user engaged with a mobile application. The central processing server 740 can be networked via any wired internet connection, wireless internet connection, local area network (LAN), wired intranet connection, wireless intranet connection, or combinations thereof.

The central processing server 740, one or more mobile devices 900, one or more data sources 648, and user database 1110 function as described above in FIG. 11. The components of the embodiment of the system for keeping a user engaged with a mobile application depicted in FIG. 13 have the same functionality as the components in FIG. 11, with additional features.

The central processing server 740 can be configured to provide a digital marketplace. The digital marketplace can be used by users to trade, buy, and/or sell their earned awards with other users The central processing server 740 can provide a page of the application that shows a user all their current earned awards. The central processing server 740 can retrieve a user's earned awards from the user database 1110 when the user accesses this page to provide the most up to date information. Each user can create a list of earned awards "For Trade", where the users can designate any currently owned awards, the user would be willing to trade for a different award. Users can also browse a list of possible awards and choose one or more possible awards to place on a "Wish" list. Users can search for one or more awards present on any user's "For Trade" list that the user wants. If an award User 1 wants is present on the "For Trade" list of User 2, User 1 can then review User 2's "Wish" list to determine if User 2 is looking for an award that User 1 has earned. User 1 can send a proposed trade to User 2. The proposed trade can be sent as a message from a first mobile device 900*a* to the central processing server 740 then to a second mobile device 900*b*.

In other embodiments, the central processing server 740 can review all of the "For Trade" and Searching For" lists from every user. The central processing server 740 can find matches between two users' "For Trade" and "Wish" lists and send a proposal to the first mobile device 900*a* and the second mobile device 900*b*. Once a trade proposal has been received by a user, that user has the opportunity to review the trade. Each user can confirm the trade by selecting a confirmation button on their mobile device 900 before the trade will be executed by the central processing server 740. This can be known as double confirmation and can aid in security by requiring each user to affirmatively confirm a trade before allowing the trade to proceed. The double confirmation can also encourage continued use of the application by presenting a method to earn more awards the user desires, while maintaining a secure method of trading. Once a trade or sale has been completed, a record of the transaction can be sent by the central processing server 740 to the awards database 699.

The ability to trade, sell, and buy awards can allow users to feel that their time is not wasted by participating in an event, even if there is not an award available that a specific user would not want. The ability to exchange unwanted awards for value, credit or a desired award, can keep users engaged with the application even after discovering no specific awards the user might want for the event that user is participating in.

The user database 1110 can include one or more processors, memory, networking cards or interfaces, and other equipment such that the user database 1110 can store earned award information. As described in FIG. 11, the user database 1110 can store information on earned and redeemed awards for each user of the system for keeping a user engaged with a mobile application. The user database 1110 can be networked with the central processing server 740 to allow access to award information at any time.

The award database 699 can include one or more processors, memory, networking cards or interfaces, and other equipment such that the award database 699 can store transactional records from the digital marketplace. In embodiments, the award database 699 can be considered to be part of the central processing server 740; while in other embodiments, the award database 699 is separate from the central processing server 740. The award database 699 can be a database (e.g., memory storage media) configured to store transactional record data that is written to the memory by processor(s) of the central processing server 740 and that is accessible by the central processing server 740 for retrieving the transactional records from the award database 699.

The one or more mobile devices 900 and the one or more data sources 648 can function the same as described in FIG. 11. The embodiment of the system for keeping a user engaged with a mobile application depicted in FIG. 13 can include networking between two or more of the one or more mobile devices 900. In embodiments a trade proposal can be sent from a first mobile device 900*a* to the central processing server 740, and then from the central processing server 740 to a second mobile device 900*b*; in other embodiments, the trade proposal can be sent from the first mobile device 900*a* to the second mobile device 900*b*. The first mobile device 900*a* and the second mobile device 900*b* can communicate over the internet or mobile data network.

System Using Blockchain to Track Fan Engagement with a Mobile Application

Figure 15:
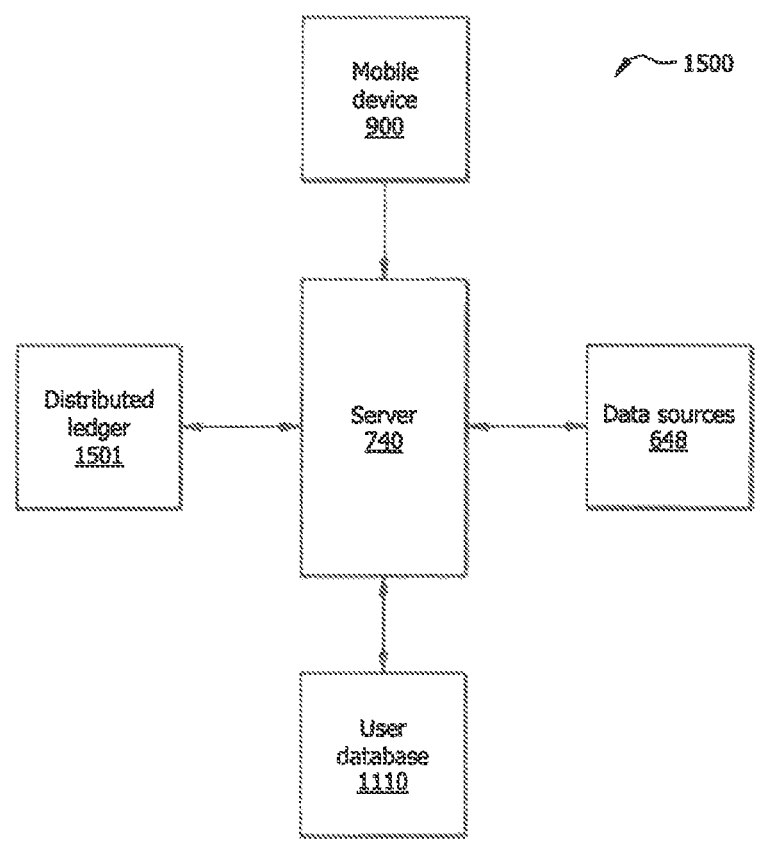
FIG. 15 illustrate a system for keeping a user engaged with a mobile application using blockchain according to an embodiment of the disclosure.

FIG. 15 depicts an embodiment of the system for keeping a user engaged with a mobile application 1500 that can utilize a distributed ledger. The system for keeping a user engaged with a mobile application 1500 can include a central processing server 740, a distributed ledger 1501, a user database 1110, an award database 699, one or more mobile devices 900, and one or more data sources 648. The central processing server 740 can be networked to all other components of the system for keeping a user engaged with a mobile application 1500 through different means. Each of the components shown in FIG. 15 can be embodied with computer equipment such as one or more processors, memory, networking cards or interfaces, and other equipment for processing data (e.g., sending/receiving messages containing data) associated with the system for keeping a user engaged with a mobile application 1500. The central processing server 740 can be networked via any wired internet connection, wireless internet connection, local area network (LAN), wired intranet connection, wireless intranet connection, or combinations thereof.

The central processing server 740, one or more mobile devices 900, one or more data sources 648, user database 1110, and award database 699 can function as described above in FIG. 13. The components of the embodiment of the system for keeping a user engaged with a mobile application 1500 depicted in FIG. 15 have the same functionality as the components in FIG. 13, with additional features.

The distributed ledger 1501 is external of the central processing server 740 and can include one or more computing devices that are networked to one another via any combinations of networks (e.g., Internet, mobile Wi-Fi, LAN, WAN, or any combination thereof). As cyber security becomes a greater concern among the general public, more users are reducing the number of applications interacted with that do not have some kind of added security like blockchain. By using a block chain, users of the system for keeping a user engaged with a mobile application 1500 can feel more confident in the security of transactions and awards on the system for keeping a user engaged with a mobile application 1500. This security and confidence can lead users to remain more engaged with the application and not competing applications.

When one of the one or more mobile devices 900*a* accesses the system for keeping a user engaged with a mobile application 1500 for the first time, a telephone number can be used to register the user. The phone number used will be assigned a unique registration number. After the user completes registration, the unique registration number assigned to the mobile device 900*a* and user can be annotated on the distributed ledger 1501. The distributed ledger 1501 can be annotated with the unique registration number, associated telephone number, username, date and time of registration, or combinations thereof. After registration, the user may continue using the system for keeping a user engaged with a mobile application 1500 as described above. Registration is not required to use the system for keeping a user engaged with a mobile application; however, a user will not be able to redeem awards or participate in the digital marketplace without registering. Requiring registration to redeem awards and participate in the digital marketplace can ensure a more robust and detailed distributed ledger 1501.

Each award can also have a unique code, referred to as an Award Number, that can consist of a series of 25 letters and numbers. The first six places of the Award Number can represent the date of the event the award was available. The six places can have two places each for the year, month, and day in the date. The next place in the Award Number can be C or O, denoting if the award is a closed loop award or an open loop award. A closed loop award is an award that is merchant specific, meaning it can only be redeemed at a specific merchant or specific merchant location. An open loop award is brand specific and can be redeemed at any number of specified merchants. The next seven places of the Award Number can be a combination of letters and numbers that denote the location the event took place. For example, if the event was a Texas Rangers game, the location portion of the Award Number could be GLOBFLD representing Globe Life Field. Numbers can be used to differentiate multiple locations with similar names. The next three places of the Award Number can represent the country that the award is taking place in. Using the Texas Rangers example above, the places could be USA. The next five places of the Award Number can be a combination of letters and numbers used to designate the product being earned by the award. The final three places of the Award Number can be used to represent the merchant that is sponsoring or providing the award.

The central processing server 740 can create and store complete and partial Award Numbers before the associated awards are earned by users. Once an event has opened and awards are available to be selected by users, the Award Numbers for those awards can be annotated on the distributed ledger 1501. The distributed ledger 1501 can be updated each time an award is viewed, selected, and/or earned by one or more users. If an award is selected by a user, but not earned, the distributed ledger 1501 can be annotated and the central processing server 740 can maintain the award for a future event, or be cancelled by the associated merchant, in which case the distributed ledger 1501 for that award is closed.

After an award is earned by a user, that user has five options to use the award. The user can donate the award, redeem the award, trade the award, gift the award, or sell the award. Until the user chooses an option to use the award, the central processing server 740 can update the distributed ledger 1501 each time the award is accessed, viewed, and/or interacted. When the award is donated or redeemed the distributed ledger 1501 can be closed. When the award is traded, gifted, or sold, then the distributed ledger 1501 can be annotated with the action and the unique registration number for the new user and the distributed ledger 1501 remains open until a user chooses an option that closes the distributed ledger 1501.

Figure 17:
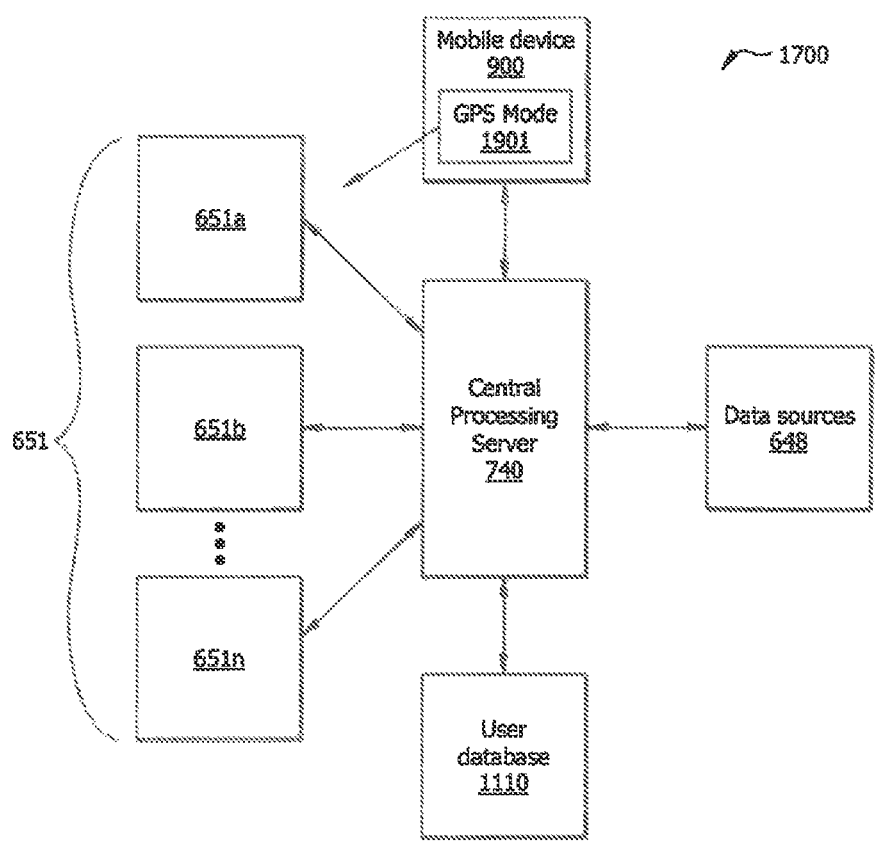
FIG. 17 illustrate a system for keeping a user engaged with a mobile application according to an embodiment of the disclosure.

System Using Mobile Device Location to Improve Fan Engagement with the Mobile Application FIG. 17 depicts another embodiment of the system for keeping a user engaged with a mobile application 1700. The system for keeping a user engaged with a mobile application 1700 can provide a central processing server 740, a user database 1110, one or more data sources 648, one or more mobile devices 900, and a plurality of merchant servers 651*a-n*. The central processing server 740 can be configured to provide a virtual scoreboard 110, accept user input, update real-time information presented in the virtual scoreboard 110, determine if the user input matches the real-time information in the virtual scoreboard 110, distribute one or more awards for matching input, and redeem the earned awards. The user database 1110 can store the awards earned by the users before the awards are redeemed, as well as information on the awards after redemption.

The central processing server 740 can include one or more processors, memory, networking cards or interfaces, and other equipment for performing the method disclosed herein for providing a system for keeping a user engaged with a mobile application 1700. The central processing server 740 can be multiple computers, located in a brick-and-mortar location, local to the administrator of the system for keeping a user engaged with a mobile application 1700, in the cloud, or a combination thereof. The central processing server 740 can be configured to communicate simultaneously with the one or more data sources 648, the one or more mobile devices 900, a user database 1110, and a plurality of merchant servers 651*a-n*.

The central processing server 740 can be configured to control and send information over a computer network 735 to an application running on the mobile devices 900. Through the application, the central processing server 740 can present a virtual scoreboard 110 with a graphical user interface (GUI), wherein the virtual scoreboard 110 is configured to display real-time information. The real-time information can be retrieved by the central processing server 740 from one or more data sources 648. The one or more data sources 648 can be websites, databases, live streams, other sources of sporting information, or combinations thereof. The one or more data sources 648 can be operated by the sports league, sports teams, third-parties, or combinations thereof.

The virtual scoreboard 110 can also be configured to accept user input for a plurality of units of gameplay related to the real-time information within a prescribed time limit. The units of gameplay can include quarters, innings, sets, periods, laps, rounds, races, stages, halves, cycles, other specified period of counting time, or combinations thereof. The units of gameplay can also be other measurements of time if the selected rules-based event is not a sporting event. The user input can be received by the application and sent over the computer network 735 to the central processing server 740. The application can also present the user input in the GUI so the user can review their input and change it before the prescribed time limit.

The central processing server 740 can poll the one or more data sources 648 for updated information. As the rules-based event proceeds, the central processing server 740 can, at set intervals or continuously, receive updated information for the rules-based event from the one or more data sources 648. As the central processing server 740 receives updated information from the one or more data sources 648, the central processing server 740 can send that information over the computer network 735 to the application on the mobile device 900.

After a unit of gameplay is complete, or the rules-based event is complete, the central processing server 740 can determine if the user input matches the real-time information for one or more of the plurality of gameplay units. The central processing server 740 can distribute selected awards for any of the plurality of gameplay units that the central processing server 740 determined matched the user input.

In embodiments where an award is earned for the closest user input to the real-time information, the central processing server 740 can receive all of the user input from a plurality of mobile devices 900 for a selected rules-based event. After a unit of gameplay or at the end of the rules-based event, the central processing server 740 can compare the real-time information to all of the collected user input for the plurality of gameplay units. The central processing server 740 can determine the one or more user input with the closest numerical value to the real-time information for each of the plurality of gameplay units. The central processing server 740 can then send the selected awards to the mobile devices 900 associated with the users with the closest input for each of the units of gameplay.

The system for keeping a user engaged with a mobile application 1700 can also include a user database 1110. The user database 1110 can include one or more processors, memory, networking cards or interfaces, and other equipment such that the user database 1110 can store user and award data. In embodiments, the user database 1110 can be considered to be a part of the central processing server 740; while in other embodiments, the user database 1110 is separate from the central processing server 740. The user database 1110 can be configured to store award and user data that is written to memory by processor(s) of the central processing server 740 and that is accessible by the central processing server 740. The user database 1110 can store any earned awards as well as information for any previously redeemed awards. The central processing server 740 can retrieve the award information when the award information is needed to redeem the award from the associated merchant.

One of the one or more mobile devices 900a is illustrated in FIG. 17 as a smartphone; however, the one or more mobile devices 900 can be embodied as a personal data assistant, laptop, tablet, smartwatch, other computing device configured to run the application described, or combinations thereof. The mobile device 900a can have a GPS or other location device and a camera. The GPS or other location device can be controlled by the GPS module 1701. The GPS module 1701 can allow the mobile device 900a to send and receive locational data to and from satellites. The GPS module 1701 can communicate with applications on the mobile device 900a and send the locational data received to the applications. When an application is installed and started for the first time, if the application needs location data, a prompt can be presented to the user asking for permission to access the GPS module 1701. The mobile device 900a can be configured to run the application of the system for keeping a user engaged with a mobile application. The mobile device 900a can be configured to communicate with the central processing server 740 using wireless internet connection, Global System for Mobile Communication (GSM), Code-division multiple access (CDMA), General Packet Radio Service (GPRS), Evolution-Data Optimized (EV-DO), Enhanced Data Rates for GSM Evolution (EDGE), Universal Mobile Telecommunications system (UMTS), other wireless communication methods, or combinations thereof. The mobile device 900a can be configured to transmit GPS or other location data to the central processing server 740 when requested. The central processing server 740 can also have access to send data to other third-party applications present on the mobile device 900a. For example, the central processing server 740 can send a location or address to a third-party navigation application to provide the mobile device 900a directions to the provided location or address. The application run by the central processing server 740, on the mobile device 900a, can have access to other functions of the mobile device 900a when needed. The third-party navigation applications can be opened or used in extensions of the application running the system for keeping a user engaged with a mobile application 1700. By running an extension, the system for keeping a user engaged with a mobile application 1700 can keep users engaged with the application and suggest upcoming or in progress events the user might be interested in.

In certain embodiments, the central processing server 740 can control the GPS module 1701 to transmit a signal. The controlled GPS module 1701 can then cause the mobile device 900a to transmit a signal at a regular interval. The signal is configured to be received by the plurality of merchant servers 651a-n. As the mobile device 900a moves, the signal can be detected by the plurality of merchant servers 651a-n. Similar to the Doppler Effect, the plurality of merchant servers 651a-n are able to determine the speed and direction of the mobile device 900a through the transmitted signal. If one merchant server 651a of the plurality of merchant servers 651a-n determines the mobile device 900a is headed in the direction a location associated with the merchant server 651a, the merchant server 651a can send a message to the central processing server 740, that can in turn send the message to the mobile device 900. The message can include the merchant location, a prompt for directions, upcoming awards from the merchant, other sales or deals available from the merchant, upcoming rules-based events, or combinations thereof.

The one or more merchant servers 651a-n can be networked to the central processing server 740. Each merchant with an award available can house a list of locations and/or locations associated with the award on the corresponding merchant server 651a. Some merchants may have locations across a state, or the nation, and only certain locations are valid for an award. The specific locations for an award can be saved. The central processing server 740 can access the stored locations for the one or more merchants 651a-n. If an award is only valid at certain locations, the central processing server 740 can send a message to the associated merchant server 651a to retrieve the valid locations. Merchants can also store maps of the interior of the locations, or instructions to the location of the product associated with the award on the one or more merchant servers 651a-n. When a user arrives at a merchant location to redeem an award, the user can select a prompt on the mobile device 900a to display the location, and directions, if provided, for the product. When the user selects the prompt, the central processing server 740 can send a message to the merchant server 651a to retrieve the location of the product.

When the central processing server 740 receives the location of the mobile device 900a, the central processing server 740 can compare the mobile device 900a location with the stored locations for the one or more merchant servers 651a-n for the one or more awards in the user's portion of the user database 1110. If the user is within a preset distance of a location of one or more of the one or more merchant servers 651a-n, the central processing server 740 can send a message to the mobile device 900a. The mobile device 900a can receive the message from the central processing server 740 and present the message as a notification. The notification can allow the user to silence notifications for the specific award, close the notification, begin navigation to the merchant location, or combinations thereof.

Figure 10:
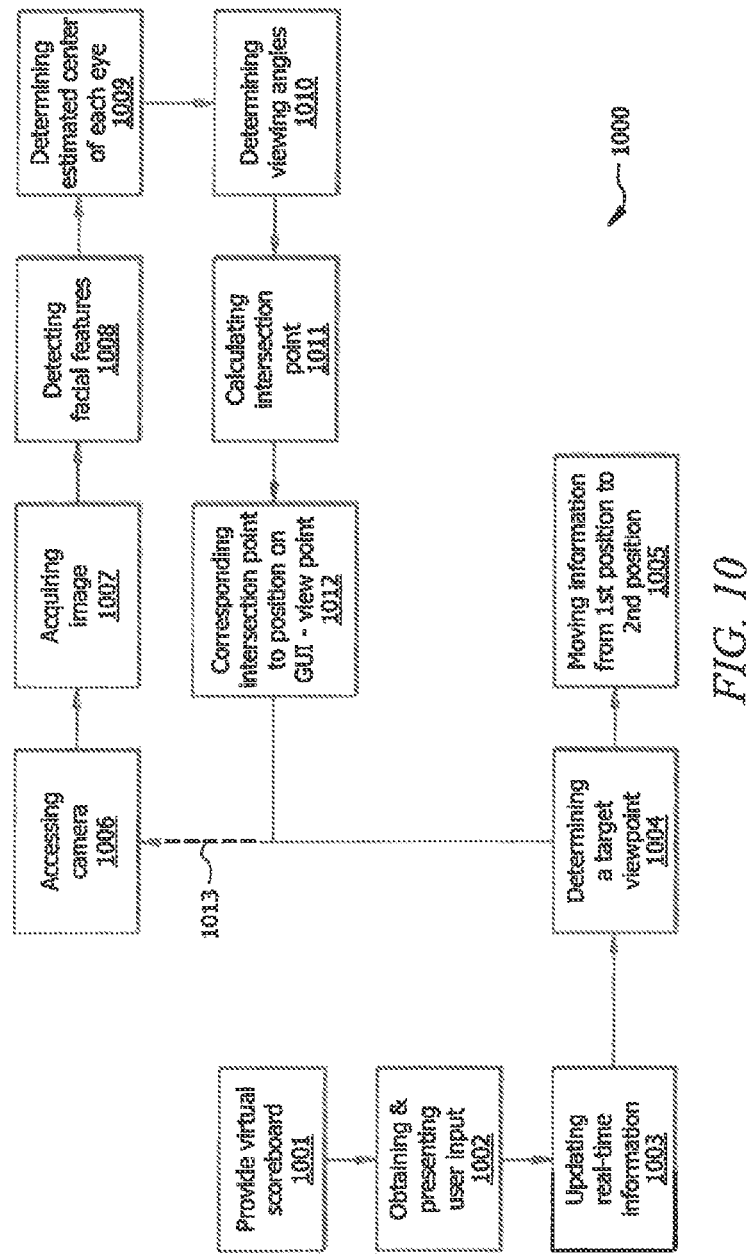
FIG. 10 illustrates a flow diagram of a system for keeping a user engaged with a mobile application with gaze tracking according to an embodiment of the disclosure.

Method Using Mobile Device Gaze Tracking to Improve Fan Engagement with the Mobile Application FIG. 10 depicts a method 1000 according to the embodiment of the system for keeping a user engaged with a mobile application described in FIG. 9A to 9D. The method 1000 can include providing at least one processor than can perform the method steps including providing a virtual scoreboard 110 configured to display real-time information, obtaining and presenting user input, updating the real-time information, performing gaze tracking, and moving information on the screen. The system for keeping a user engaged with a mobile application and all its components appear in the method 1000 as described in FIG. 9.

Step 1002 of the method 1000 can include providing a virtual scoreboard 110 with a graphical user interface (GUI) on a mobile device. The virtual scoreboard 110 can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard can change depending on. The sport or event that is being represented at a given moment.

Step 1003 of the method 1000 can include obtaining and presenting accepted user input for at least one of the plurality of units of gameplay from the mobile device. The input can be a numeral corresponding to a score or statistic for a team or player the user is predicting will occur in the selected unit of gameplay. The system for keeping a user engaged with a mobile application can obtain input guesses for units of gameplay for prescribed time limits before the units of gameplay The obtained guesses can then be presented on the GUI to the user, so the users are able to see their input guesses.

Step 1004 of the method 1000 can include polling one or more data sources for updates to the real-time information. As described above, the system for keeping a user engaged with a mobile application can be connected to event databases 765 that can serve as the one or more data sources. The event databases 765 can have the most up to date statistics for the sporting or rules-based event that is the subject of the system for keeping a user engaged with a mobile application. The system for keeping a user engaged with a mobile application can poll at certain time intervals, such as every one second, the keep refreshing the information shown in the virtual scoreboard 110. If a user has guesses in multiple events at the same time, the system for keeping a user engaged with a mobile application can poll the event database 765 for each of the events a user has input for.

Step 10005 of the method 1000 can include determining a target view point 940x from a plurality of view points 940a-n that the user looked at the most using gaze tracking. The gaze tracking system 930 described in FIG. 9 can be used to create and store a plurality of view points 940a-n. The plurality of view points 940a-n represent positions on the screen that the gaze tracking system 930 calculated the user was looking at. The gaze tracking system 930 can determine from the plurality of view points 940a-n, which view point 940 was viewed more than any of the others. This most viewed view point 940 can be designated as the target view point 940x. The gaze tracking system 930 can store the plurality of view points 940a-n for any number of the different pages in the system for keeping a user engaged with a mobile application and can calculate a target view point 940x for each page. This allows the system for keeping a user engaged with a mobile application to have a target view point 940x ready no matter which of the pages the user is currently on. In certain embodiments, the plurality of view points 940a-n can be linked to specific portions of the GUI, such as the virtual scoreboard 110, links 120, additional content 130, and others. In embodiments where the plurality of view points 940a-n are linked to the GUI, the gaze tracking system 930 can designate the linked element, such as the virtual scoreboard 110, as the target visual, rather than just the position. The method for calculating the plurality of view points 940a-n through the gaze tracking system 930 is described in further detail below.

Step 1006 of the method 1000 can include the step of moving information on the GUI of the mobile device from a first position to a second position to encourage continued interaction with the system for keeping a user engaged with a mobile application, wherein the second position is the target view point 940x. In determining the target view point 940x, the gaze tracking system 930 is determining the position on the screen that the user is looking at more frequently than others. Knowing the position looked at more frequently than others can inform the system for keeping a user engaged with a mobile application of the element or content that is drawing the user's attention the most. The system for keeping a user engaged with a mobile application can then move elements or information deemed important, a new link 120 for example, from a first position to a second position that is at or near the target view point 940x. By moving new or interesting content to the positions on the screen that the user is looking at most frequently, the system for keeping a user engaged with a mobile application can help keep the user looking at the screen and involved submitting inputs or engaging with the links 120 and other content 130.

The next steps in the method 1000 detail the steps performed by the gaze tracking system 930. The gaze tracking system 930 can perform its method and steps continuously while the mobile device and the system for keeping a user engaged with a mobile application are both active. The gaze tracking system 930 can continue to collect the plurality of view points 940*a-n* until the system for keeping a user engaged with a mobile application needs to determine the target view point 940*x*.

Step 1007 of the method 1000 can include accessing a camera 910 of the mobile device 900. The system for keeping a user engaged with a mobile application can access the camera module 920 of the mobile device 900 to access the camera 910. The camera 910 can be operated by the camera module 920 stored on the mobile device 900 and executable for using the camera 910. In certain embodiments, the system for keeping a user engaged with a mobile application can use the camera module 920 of the mobile device 900 to access a front-facing camera 910 of the mobile device 900. In embodiments where the mobile device 900 is a mobile phone, the front-facing camera 910 is the only camera on the device that allows the gaze tracking system 930 to view the user's eyes while the user is using the mobile device 900.

Step 1008 of the method 1000 can include acquiring images of a user. The gaze tracking system 930 can use the camera 910 to acquire still images or a continuous feed from the camera 910 of the user's face. Since the user will be looking at the screen while using the system for keeping a user engaged with a mobile application, the gaze tracking system 930 can get images of the user's eyes and face to track during use.

Step 1009 of the method 1000 can include detecting facial features of the user through the images. The gaze tracking system 930 can have a stored set of images of human faces that the gaze tracking system 930 has been trained on. Through this training, the gaze tracking system 930 can detect certain facial features of the user through the still or live images of the user's face. The facial features can include eyes, nose, mouth, eyebrows, eyelashes, cheekbones, the brow line, other distinguishing features, or combinations thereof.

Step 1010 of the method 1000 can include determining an estimated position of the center of each eye. Every human's eye and eye shape are unique. The gaze tracking system 930 can use the facial features taken from the images to estimate the center of each eye for the user. The center of the eye is important in determining where the user is looking at the screen. The stored set of images that the gaze tracking system 930 has been trained on can include a large number of eye and face shapes to further prepare the gaze tracking system 930 for the different eye and face shapes of the different users. The gaze tracking system 930 can use the shape of a user's eye, and where the eyes are positioned on the user's face relative to the brow line, nose, and cheekbones to estimate the center of the user's eyes.

Step 1011 of the method 1000 can include determining viewing angles 950 based on the center of each eye and the facial features. Viewing angles 950 are used by the gaze tracking system 930 to determine the angle and direction the eyes can be facing. The viewing angles 950 consider the direction the eyes can be rotated in their sockets as well as the angle the head of the user can be tilted upward or downward relative to the mobile device 900. The gaze tracking system 930 can determine if the facial features from the image are straight on, indicating that the user has their mobile device 900 and face in line relative to each other, or if the image is angled in some way, seeing more of the nostrils of the nose for example, indicating that the mobile device 900 is being held at some angle relative to the user's face indicating the iris is higher or lower in the eye socket. Using the determined center of the eye and angle the mobile device is being held relative to the user's face, the gaze tracking system 930 can determine a viewing angle 950 for each of the user's eyes. In certain embodiments, the camera module 920 can include a level function, or have access to a level application. The level function of the camera module 920 The camera module 920 can send data from the level function to the gaze tracking system 930 to be incorporated in calculating the viewing angles 950.

Step 1012 of the method 1000 can include calculating an intersection point 945 of the viewing angles 950 of the eyes. Each of the user's eyes can have a viewing angle 950 and therefore the gaze tracking system 930 can use the viewing angles 950 to determine the point where the eyes are both looking, the intersection point 945. If the user is looking at the mobile device 900, the intersection point 945 is the point on the mobile device where the viewing angles 950 overlap indicating the position on the mobile device 900 the user is focused.

Step 1013 of the method 1000 can include corresponding the intersection point 945 to a position on the GUI of the mobile device. The gaze tracking system 930 can be linked to the system for keeping a user engaged with a mobile application, allowing the gaze tracking system 930 to know what is on the GUI of the mobile device 900 and each elements position. Once the intersection point 945 of the viewing angles 950 is calculated, the gaze tracking system 930 can correspond the intersection point 945 to a position on the GUI, and in some embodiments an element that is present at that position. The position on the GUI that corresponds to the intersection point 945 can become a first view point 940*a* and can be stored by the gaze tracking system 930.

Step 1014 of the method 1000 can include continuously calculating the plurality of view points 940*a-n*. While the mobile device 900 and the system for keeping a user engaged with a mobile application are active, the gaze tracking system 930 can repeat the above process and correspond a plurality of intersection points 945 to a plurality of positions on the GUI of the mobile device 900 storing a plurality of view points 940*a-n*. The plurality of view points 940*a-n* can represent all of the positions that the user has looked while using the system for keeping a user engaged with a mobile application. The plurality of view points 940*a-n* can be stored as a position in relation to the page of the system for keeping a user engaged with a mobile application that was active at the time, and the element of the GUI (e.g. virtual scoreboard 110, link 120, additional content 130, and/or other elements) that the position included.

Step 1015 of the method 1000 can include determining a target view point 940*x* of the plurality of view points 940*a-n*. The target view point 940*x* can be the view point of the plurality of view points 940*a-n* that was looked at the most by the user. In some embodiments this can be the position on the GUI of the mobile device 900 that was looked at the most, and in some embodiments can be the element of the GUI that was looked at the most by the user. The gaze tracking system 930 can determine the target view point 940*x* over the course of a preset span of time, such as one hour, the user's entire history of using the system for keeping a user engaged with a mobile application, the course of one rules-based event, or combinations thereof. If multiple of the plurality of view points 940*a-n* are determined to have been looked at the same number of times, then more than one target view point 940$x_1$ and 940$x_2$ can be determined. Once the target view point 940x has been determined, the target view point 940x can be sent to the system for keeping a user engaged with a mobile application to complete the method 1000.

Method Requiring Fan Engagement with a Mobile Device for Award Redemption

Figure 12A:
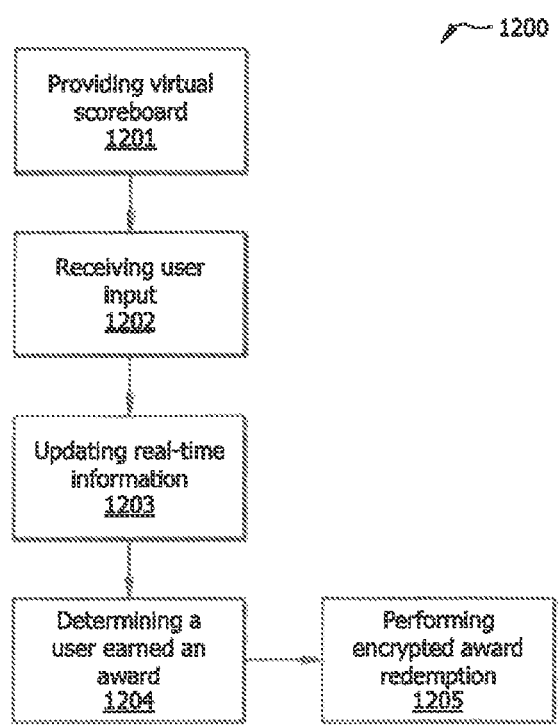
FIGS. 12A and 12B illustrates a flow diagram of a system for keeping a user engaged with a mobile application according to an embodiment of the disclosure.
Figure 12B:
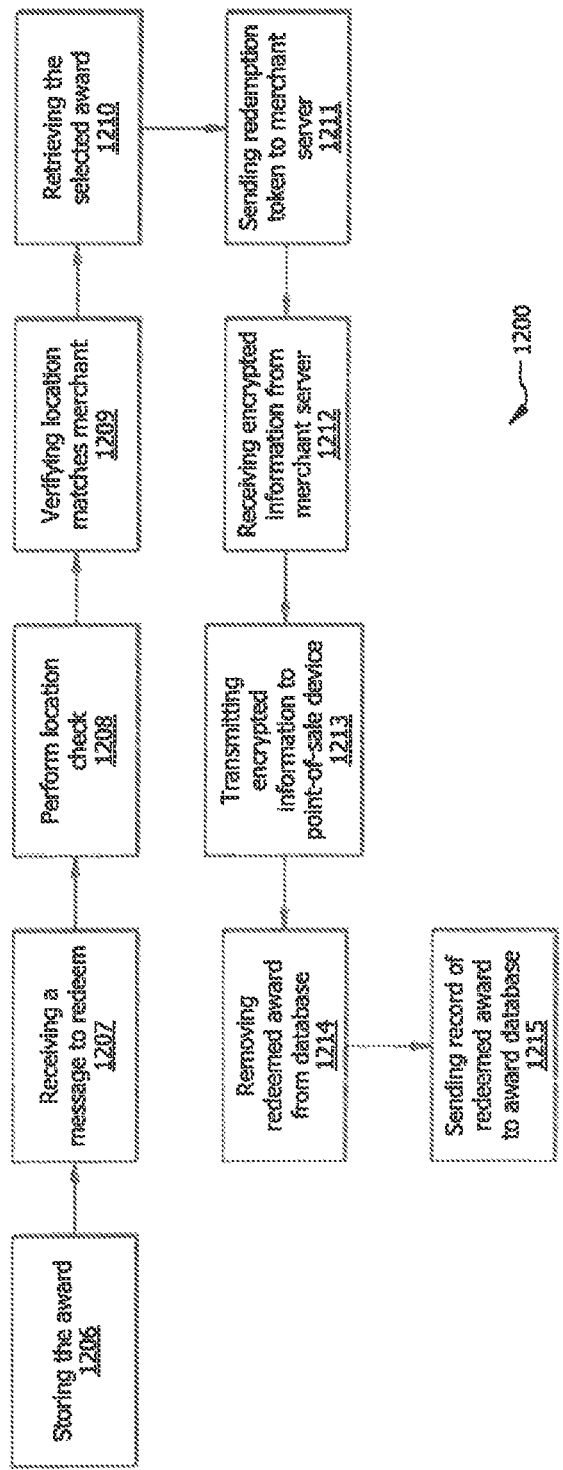

FIGS. 12A and 12B depict method 1200 requiring fan engagement with a mobile device for award redemption. The method 1200 is described with reference to system components illustrated in FIG. 11.

Step 1201 of the method 1200 can include providing a virtual scoreboard 110 with a graphical user interface (GUI) on a mobile device. The virtual scoreboard 110 can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard can change depending on. The sport or event that is being represented at a given moment.

Step 1202 of the method 1200 can include receiving user input for at least one of the plurality of units of gameplay from the mobile device. The input can be a numeral corresponding to a score or statistic for a team or player the user is predicting will occur in the selected unit of gameplay. The central processing server 740 can receive input guesses for units of gameplay for prescribed time limits before the units of gameplay The received guesses can then be presented on the GUI to the user, so the user is able to see input guesses.

Step 1203 of the method 1200 can include polling one or more data sources for updates to the real-time information. As described above, the system for keeping a user engaged with a mobile application can be connected to event databases 765 that can serve as the one or more data sources 648. The event databases 765 can have the most up to date statistics for the sporting or rules-based event that is the subject of the system for keeping a user engaged with a mobile application. The system for keeping a user engaged with a mobile application can poll at certain time intervals, such as every one second, to keep refreshing the information shown in the virtual scoreboard 110. If a user has guesses in multiple events at the same time, the system for keeping a user engaged with a mobile application can poll the event database 765 for each of the events a user has input for.

Step 1204 of the method 1200 can include determining a user earned one or more awards, associated with one or more merchants, based on input for one or more of the plurality of gameplay units. In certain embodiments, awards are earned if the user correctly guessed the score or a statistical value for one or more of the plurality of gameplay units. In other embodiments, an award can be earned by the user or users who input guess is the closest to the correct score or statistical value for one or more of the plurality of gameplay units.

In embodiments where the closest score earns an award, the central processing server 740 can receive the user input from each of the one or more mobile devices 900 that selected the same rules-based event. The central processing server 740 can then compare all of the user input to the real-time information to determine the user or users whose input was the closest to the actual value for the score and each statistical value for each of the plurality of gameplay units. The central processing server 740 can set a minimum number of user inputs received before an award is issued in embodiments where the closest user input earns an award.

Step 1205 of the method 1200 is to perform encrypted award redemption. The award redemption process can be encrypted to make sure there are not cheats or workarounds to duplicate or create additional awards not earned through the system for keeping a user engaged with a mobile application. The encrypted award redemption process is further expanded upon in steps 1208 to 1217. The encrypted award redemption process requires the user to be present in the location of the merchant associated with the award and presenting a page of the system for keeping a user engaged with a mobile application. This process increases security while also bringing the user back into the application, encouraging further interaction with the application at a later time.

Step 1206 of the method 1200 can include storing the one or more earned awards in a user database 1110. Once a user has earned one or more awards, the central processing server 740 can store the one or more earned awards in the user database 1110, until the user is ready to redeem the one or more awards. The user database 1110 can store the one or more awards in a section of memory partitioned for the specific user who earned those awards. This partitioning can allow the central processing server 740 to quickly retrieve information from the database based on the user that is requesting. Storing the earned awards in the user database 1110 can prevent them from being tampered with. The awards can appear "locked" on the GUI to restrict a user's access to any earned awards unless the encrypted redemption process is completed, ensuring security.

Step 1207 of the method 1200 can include receiving a message to redeem one or more of the earned awards. At a time when a user decides to redeem one or more earned awards, the user can select the desired award in the application. When the user selects the desired award, the application can send a message to the central processing server 740 to being the award redemption process. In the message, the central processing server 740 receives the award and associated merchant. The central processing server 740 can then retrieve from memory all of the information related to the specified merchant.

Step 1208 of the method 1200 can include receiving the location data for the mobile device 900. After the user has selected the award to redeem, and the application as sent the message to redeem to the central processing server 740, the application can access the location data of the mobile device 900. The application can get the mobile device's 900 location data from the mobile device's embedded Global Positioning System (GPS). Alternatively, the application can receive the mobile device's 900 location data from the Wi-fi or wireless internet connection and the associated location for the connection. The application can also use any other method for determining the mobile device's 900 location based on the device and the connections present. After determining the mobile device's location, the application can send the location information to the central processing server 740.

Step 1209 of the method 1200 can include verifying the received location matches the merchant location. The central processing server 740 can have one or more locations associated with each of the one or more merchants associated with the one or more awards. When the central processing server 740 receives the message to begin the redemption process in step 1209 and retrieves the associated merchant information, that can include the information for the one or more locations associated with the selected merchant. The central processing server 740 will receive the location data from the mobile device 900 and can then compare the mobile device 900 location with the one or more locations associated with the merchant. If the two compared locations match, then the redemption process can continue, otherwise with central processing server 740 can send a message to the application that the user needs to be at the merchant location to redeem the selected award. A radius can be applied to the one or more locations associated with the merchant such that any slight errors in detecting the mobile device 900 location will not end the redemption process.

Step 1210 of the method 1200 can include retrieving the selected award from the user database 1110. Once the central processing server 740 has confirmed that the mobile device 900 location matches the one or more locations associated with the merchant, the central processing server 740 can send a message to the user database 1110 to unlock the selected award. The message to unlock the selected award allows the redemption process to proceed, but can still be reversed in a situation where the user decides not to redeem the award. Once the award is unlocked, the central processing server can retrieve the award information from the user database 1110. By requiring the user to select the award after arriving at the location of the merchant, the system for keeping a user engaged with a mobile application encourages the user to further engage with the application by bringing the user back into the application at a later time, increasing the chance the user will see a new rules-based event that the user can and want to participate in at that time or in the near future.

Step 1211 of the method 1200 can include sending a redemption token to the merchant. After the central processing server 740 has retrieved the selected award from the user database 1110, the central processing server 740 can place the award information in temporary memory and create a redemption token. The redemption token can include the information on the award, date earned, and other information from the system for keeping a user engaged with a mobile application. The central processing server 740 can send the redemption token to a merchant server 651 that corresponds to the merchant associated with the award.

Step 1212 of the method 1200 can include receiving an encrypted information packet from the merchant server. The encrypted information packet can include any needed information on the award and information needed by the merchant to properly redeem the award. Without the encrypted information packet, the application will not allow the user to select a redeem button. The central processing server 740 can be programmed to read any type of encryption used by the plurality of merchant servers 651*a-n* and can read the contents of the encrypted information packet.

Step 1213 of the method 1200 can include transmitting the encrypted information packet to a point-of-sale device associated with the merchant and merchant server 651. The point-of-sale (POS) device can be used by the merchant to record a customer's order and accept payment for that order. The central processing server 740 can transmit the encrypted information packet, through the mobile device 900, to the POS device to redeem the earned award. In certain embodiments, the central processing server 740, through the application, can use the communication features of the mobile device 900, such as Wi-Fi connection, Near-Field Communication tag, 4G connection, and more to wirelessly transmit the encrypted information packet to the POS device. In other embodiments, the central processing server 740 can display a scannable code (UPC, QR, or other) on the screen of the mobile device 900 that can then be scanned by the POS device to transmit the encrypted information packet. Once the encrypted information packet has been successfully transmitted to the POS device, the user can receive their award from the merchant.

Step 1214 of the method 1200 can include removing the redeemed award from the user database 1110. After the encrypted information packet is transmitted, the central processing server 740 can remove the selected awards from temporary memory. The portion of the user database 1110 for the user can be searched for the redeemed award to ensure that no valid record of the redeemed award in the user database 1110. The central processing server 740 can create a record that the award was redeemed. This record can be sent to the user database and saved with the other awards of the user. This record can be pulled by the central processing server 740 for analytics use in determining what awards earned are most often redeemed. This record can also be used by the central processing server 740 to determine what awards most appeal to an individual user. If one specific type of award is redeemed by a user more often, the central processing server 740 can provide more of that award as an option to encourage the user to engage more with the system for keeping a user engaged with a mobile application.

Step 1215 of the method 1200 can include sending the record of the redeemed award to an award database 699. The award database 699 can contain a record of all previously redeemed awards by any user and the associated redemption dates for those awards of the system for keeping a user engaged with a mobile application. This award database 699 can be used to determine the types of awards most desirable among players as well as perform other metrics, such as if a certain award does better in specific area compared to other areas. The award database 699 can also include a log of any award trades between players.

Figure 14:
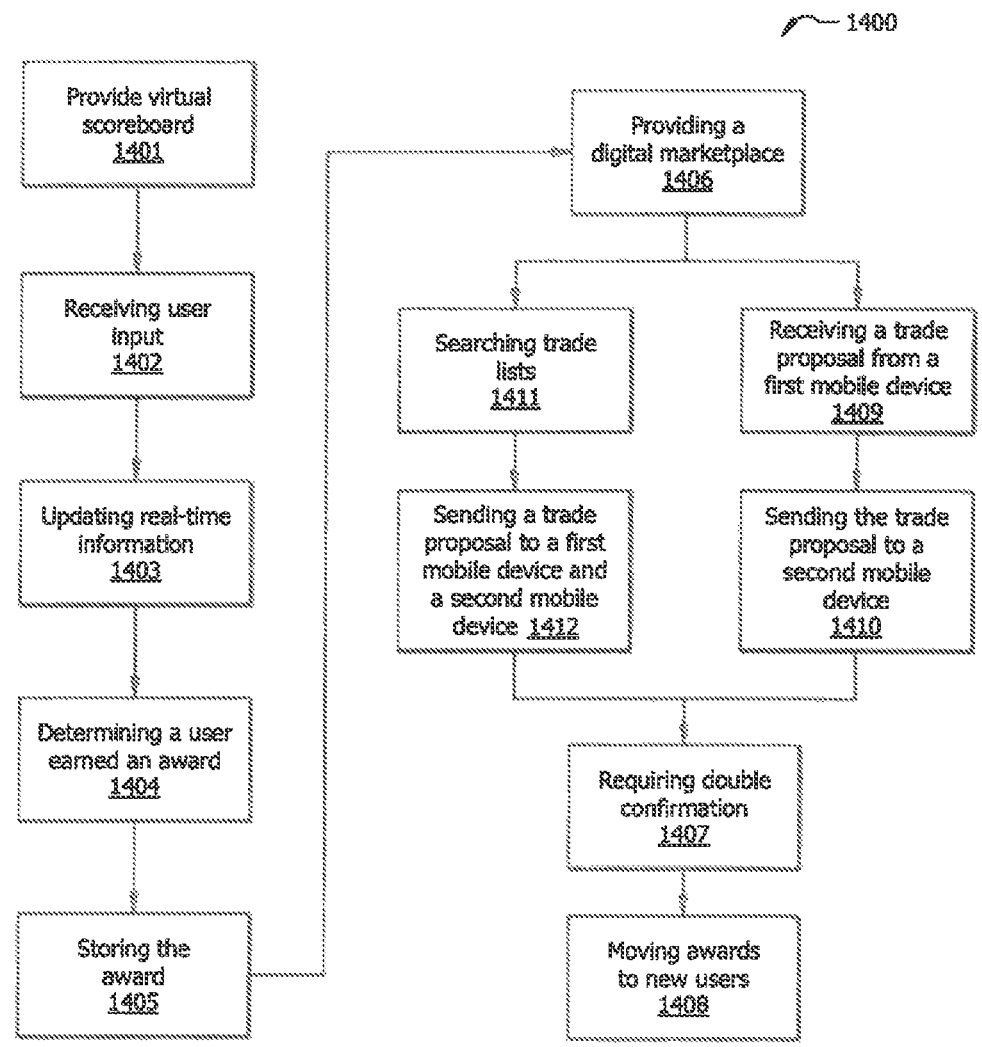
FIG. 14 illustrates a flow diagram of a system for keeping a user engaged with a mobile application according to an embodiment of the disclosure.

Method Requiring Two-Device Confirmation to Improve Fan Engagement with the Mobile Devices FIG. 14 depicts a method 1400 according to an embodiment of the system for keeping a user engaged with a mobile application according to FIG. 13. The method 1400 can include providing a virtual scoreboard 110 configured to display real-time information, receiving user input, updating the real-time information, determining the user has earned any awards based on the user input, providing a digital marketplace for users to trade awards, and requiring at least two mobile devices involved in a trade to confirm the trade. During the step of requiring, the central processing server can display updates to the real-time information encouraging continued interaction with the application. The system for keeping a user engaged with a mobile application and all its components appear in the method 1400 as described in FIG. 13.

Step 1401 of the method 1400 can include providing a virtual scoreboard 110 with a graphical user interface (GUI) on a mobile device 900*a*. The central processing server 740 can provide the virtual scoreboard 110 that can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard can change depending on. The sport or event that is being represented at a given moment.

Step 1402 of the method 1400 can include receiving user input for at least one of the plurality of units of gameplay from the mobile device 900a. The input can be a numeral corresponding to a score or statistic for a team or player the user is predicting will occur in the selected unit of gameplay. The central processing server 740 can obtain input guesses for units of gameplay for prescribed time limits before the units of gameplay The obtained guesses can then be presented on the GUI to the user, so the users are able to see their input guesses.

Step 1403 of the method 1400 can include polling one or more data sources 648 for updates to the real-time information. As described above, the system for keeping a user engaged with a mobile application can be connected to event databases 765 that can serve as the one or more data sources 648. The event databases 765 can have the most up to date statistics for the sporting or rules-based event that is the subject of the system for keeping a user engaged with a mobile application. The central processing server 740 can poll at certain time intervals, such as every one second, to keep refreshing the information shown in the virtual scoreboard 110. If a user has guesses in multiple events at the same time, the system for keeping a user engaged with a mobile application can poll the event database 765 for each of the events a user has input for.

Step 1404 of the method 1400 can include determining a user earned one or more awards, associated with one or more merchants, based on input for one or more of the plurality of gameplay units. In certain embodiments, awards are earned if the user correctly guessed the score or a statistical value for one or more of the plurality of gameplay units. In other embodiments, an award can be earned by the user or users who input guess is the closest to the correct score or statistical value for one or more of the plurality of gameplay units.

In embodiments where the closest score earns an award, the central processing server 740 can receive the user input from each of the one or more mobile devices 900 that selected the same rules-based event. The central processing server 740 can then compare all of the user input to the real-time information to determine the user or users whose input was the closest to the actual value for the score and each statistical value for each of the plurality of gameplay units. The central processing server 740 can set a minimum number of user inputs received before an award is issued in embodiments where the closest user input earns an award.

Step 1405 of the method 1400 can include storing the one or more earned awards in a user database 1110. Once a user has earned one or more awards, the central processing server 740 can store the one or more earned awards in the user database 1110, until the user is ready to redeem the one or more awards. The user database 1110 can store the one or more awards in a section of memory partitioned for the specific user who earned those awards. This partitioning can allow the central processing server 740 to quickly retrieve information from the database based on the user that is requesting.

Step 1406 of the method 1400 can include providing a digital marketplace. The central processing server 740 can host and maintain the digital marketplace. The digital marketplace can be presented to users as a separate page on the application of the system for keeping a user engaged with a mobile application and presented on a display of the mobile device 900a. The digital marketplace can allow users to trade, buy, and/or sell earned awards with other users. The digital marketplace can allow users to create "For Trade" lists and "Wish" lists associated with the users' accounts. Both the "For Trade" and "Wish" list for each user are visible to other users. Users can put earned awards that the user is willing to trade on the "For Trade" list. Users can put awards the user would like to have but has not earned on the users' "Wish" list. The digital marketplace can allow users to search one or more other users' "For Trade" lists to look for a desired earned award. If the desired earned award is found on a "For Trade" list, then the user's corresponding "Wish" list can be pulled up to search for an earned award to present in a trade.

Step 1407 of the method 1400 can include requiring double confirmation from at least two mobile devices 900 to complete a trade. Once a trade has been proposed from one user on a first mobile device 900a to a second user on a second mobile device 900b, both the first user and the second user are able to review the trade to decide if the proposed awards are acceptable. The trade proposal can be sent from the first mobile device 900a to the central processing server 740. The central processing server 740 can verify that the proposed awards are currently owned by the two users. After verifying the awards, the central processing server 740 can send the trade proposal to the second mobile device 900b. The central processing server 740 can also send a confirmation check to the first mobile device 900a and the second mobile device 900b. If each of the users finds the trade acceptable, each user can click a confirm button locking in the trade from that user's mobile device. When each user clicks on the confirm button on that user's mobile device 900, the mobile device 900 sends a message to the central processing server 740. After receiving a confirm message from the first mobile device 900a and the second mobile device 900b, the central processing server 740 can complete the trade by moving the traded awards from the first user to the second user, and vice versa. A trade will not be complete until both the first user and the second user has clicked the confirm button on that user's mobile device, also referred to as double confirmation.

In an embodiment, two users who know each other can send a trade simultaneously. A first user with the first mobile device 900a and a second user with the second mobile device 900b can decide on a trade together and send the trade proposal at the same time. The central processing server 740 can receive the trade proposal from the first mobile device 900a and the second mobile device 900b. The central processing server 740 can verify the trade and then send a confirmation check to the first mobile device 900a and the second mobile device 900b. After the central processing server 740 receives confirmation from the first and second mobile devices 900a, 900b, the trade can be completed.

This above-described method of double confirmation increases the security of the trade system and allows users who select the wrong award in a proposed trade, or a changed mind after a proposed trade is sent to later revoke the award. After the first user proposes a trade and the central processing server 740 receives the trade proposal from the first mobile device 900a, the central processing server 740 can send a confirmation check to the first mobile device 900a. The user of the first mobile device 900a is able to review the trade even after sending it. This can give the user time to realize they selected the wrong award to send to receive in the trade proposal, or time to change their mind and revoke the trade. After the user of the second mobile device 900b receives the trade proposal and confirmation check from the central processing server 740, they have an amount of time to review and confirm the trade. This gives the user time to consider the trade proposal. Even if the offered trade includes awards from the user of the second mobile device's 900b "For Trade" and "Wish" lists, the trade will not complete unless the user confirms the trade offering security and a chance to review the proposal and decide. The double confirmation can also encourage continued interaction with the application by presenting a method to earn more awards the user desires, while maintaining a secure method of trading.

Step 1408 of the method 1400 can include moving the traded awards to new users in the user database 1110. Once the double confirmation has been completed, the central processing server 740 can complete the trade. To complete the trade the central processing server 740 can send a message to the user database 1110, to move the traded awards from the original user to the new user. The central processing server 740 can move traded awards from User 1's section of the user database 1110 memory to User 2's section of the user database 1110 memory, and vice versa. Once the traded awards are moved in the user database, the traded awards can appear to be redeemed by the newly associated users.

Optional step 1409 of the method 1400 can include receiving a trade proposal from a first mobile device 900a. In embodiments, a user can propose a trade to another user by sending a proposed trade. The proposed trade can be received from the user's first mobile device 900a by the central processing server 740.

Optional step 1410 of the method 1400 can include sending the trade proposal from the central processing server 740 to a second mobile device 900b. Once the central processing server 740 has received the trade proposal from the first mobile device 900a, the central processing server 740 can verify the award information. Once the award information is verified, the central processing server 740 can send the trade proposal to the second mobile device 900b that is associated with the second user. Once the second user has received the trade proposal the method can proceed to step 1408 requiring double confirmation.

Optional step 1411 of the method 1400 can include searching a plurality of "For Trade" and "Wish" lists to find matches. The central processing server 740 can search all users' "For Trade" and "Wish" lists to find pairs of users with awards that correspond across the users' lists. This can allow more trades to happen in a timely fashion without individual users needing to search through every possible list to find another user to trade with.

Optional step 1412 of the method 1400 can include sending a trade proposal to a first mobile device 900a and a second mobile device 900b. After the central processing server 740 has searched the plurality of trade lists and found one or more users with awards on trade lists that correspond to another user's trade lists, the central processing server 740 can create one or more trade proposal between the matched users. For every pair of matched users, the central processing server 740 can send a trade proposal to a first mobile device 900a, associated with a first matched user, and a second mobile device 900b, associated with a second matched user. After the trade proposal is sent to the two mobile devices 900a, 900b, the method 1400 can proceed to step 1408 requiring double confirmation.

Method Using Blockchain to Track Fan Engagement with a Mobile Application

Figure 16:
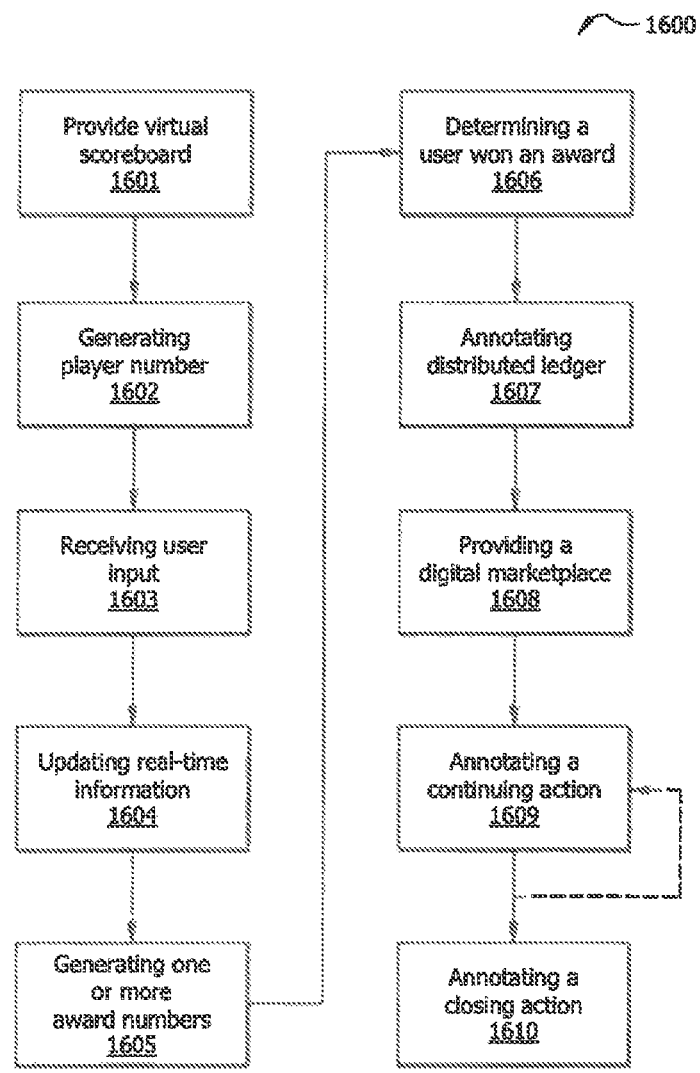
FIG. 16 illustrates a flow diagram of a system for keeping a user engaged with a mobile application using blockchain according to an embodiment of the disclosure.

FIG. 16 depicts a method 1600 according to an embodiment of the system for keeping a user engaged with a mobile application according to FIG. 15. The method 1600 can include providing a virtual scoreboard 110 configured to display real-time information, receiving user input, updating the real-time information, determining the user has earned one or more awards based on the user input, providing a digital marketplace for users to trade awards, and track the awards on a distributed ledger 1501. During the step of requiring, the central processing server 740 can display updates to the real-time information encouraging continued interaction with the application. The system for keeping a user engaged with a mobile application and all its components appear in the method 1400 as described in FIG. 15.

Step 1601 of the method 1600 can include providing a virtual scoreboard 110 with a graphical user interface (GUI) on a mobile device 900a. The central processing server 740 can provide the virtual scoreboard 110 that can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard can change depending on the sport or event that is being represented at a given moment.

Step 1602 of the method 1600 can include generating a unique player registration number and annotating it on a distributed ledger 1501. When one of the one or more mobile devices 900a accesses the system for keeping a user engaged with a mobile application 1500 for the first time, a telephone number can be used to register the user. The central processing server 740 can generate a unique player registration number, also referred to as a Player Number, for the account and phone number. After the user completes registration, the Player Number assigned to the mobile device 900a, and user can be annotated on the distributed ledger 1501. The distributed ledger 1501 can be annotated with the Player Number, associated telephone number, username, date and time of registration, or combinations thereof.

Step 1603 of the method 1600 can include receiving user input for at least one of the plurality of units of gameplay from the mobile device 900a. The input can be a numeral corresponding to a score or statistic for a team or player the user is predicting will occur in the selected unit of gameplay. The central processing server 740 can obtain input guesses for units of gameplay for prescribed time limits before the units of gameplay. The obtained guesses can then be presented on the GUI to the user, so the users are able to see their input guesses.

Step 1604 of the method 1600 can include polling one or more data sources for updates to the real-time information. As described above, the system for keeping a user engaged with a mobile application can be connected to event databases 765 that can serve as the one or more data sources 648. The event databases 765 can have the most up to date statistics for the sporting or rules-based event that is the subject of the system for keeping a user engaged with a mobile application. The central processing server 740 can poll at certain time intervals, such as every one second, to keep refreshing the information shown in the virtual scoreboard 110. If a user has guesses in multiple events at the same time, the central processing server 740 can poll the event databases 765 for each of the events a user has input for.

Step 1605 of the method 1600 can include generating one or more unique Award Numbers and annotating them on the distributed ledger 1501. The central processing server 740 can generate a 25-digit Award Number for each award available for an event. Each Award Number can follow the order described in FIG. 15. The Award Numbers may not be visible on the mobile device 900*a* but can be used by the central processing server 740 to identify the corresponding award. Any number of Award Numbers can be generated for awards corresponding to events with scheduled dates. The generated Award Numbers can be stored on the central processing server 740 until they are needed. On the day of an event, the central processing server 740 can annotate all of the Award Numbers associated with that event on the distributed ledger 1501. Once the Award Numbers have been annotated, the central processing server 740 can allow the awards to be selected by users in the application. The awards are not selectable until being annotated on the distributed ledger 1501 to ensure there is a record of any activity with each award. The central processing server 740 can annotate the distributed ledger 1501 each time a user reviews an award or selects the award for one of the plurality of units of gameplay. Each annotation made on the distributed ledger 1501 can include the date, time, and/or Player Number.

Step 1606 of the method 1600 can include determining a user earned one or more awards, associated with one or more merchants, based on input for one or more of the plurality of gameplay units. In certain embodiments, awards are earned if the user correctly guessed the score or a statistical value for one or more of the plurality of gameplay units. In other embodiments, an award can be earned by the user or users who input guess is the closest to the correct score or statistical value for one or more of the plurality of gameplay units.

In embodiments where the closest score earns an award, the central processing server 740 can receive the user input from each of the one or more mobile devices 900 that selected the same rules-based event. The central processing server 740 can then compare all of the user input to the real-time information to determine the user or users whose input was the closest to the actual value for the score and each statistical value for each of the plurality of gameplay units. The central processing server 740 can set a minimum number of user inputs received before an award is issued in embodiments where the closest user input earns an award.

In embodiments where only exact user inputs earn awards, any award that is not won by a user can be held on to by the central processing server 740. The central processing server 740 can annotate the distributed ledger 1501 that the award was not won. The central processing server 740 can store the unused award with other awards that have not yet been offered. Once the distributed ledger 1501 has been annotated and the unused award is stored, the Award Numbers can be updated for a new event, or the merchant can cancel the award. Both updating the Award Numbers and cancelling the award creates an end of a loop and the distributed ledger 1501 can be closed. In embodiments where the Award Numbers are updated, a new portion of the distributed ledger 1501 can be started for the newly updated Award Numbers.

Step 1607 of the method 1600 can include storing the one or more earned awards in a user database 1110. Once a user has earned one or more awards, the central processing server 740 can store the one or more earned awards in the user database 1110, until the user is ready to redeem the one or more awards. The user database 1110 can store the one or more awards in a section of memory partitioned for the specific user who earned those awards. This partitioning can allow the central processing server 740 to quickly retrieve information from the user database 1110 based on the user that is requesting.

Step 1608 of the method 1600 can include providing a digital marketplace. The central processing server 740 can host and maintain the digital marketplace. The digital marketplace can be presented to users as a separate page on the application of the system for keeping a user engaged with a mobile application 1500 and presented on a display of the mobile device 900*a*. The digital marketplace can allow users to trade, buy, sell, donate, and/or gift earned awards with other users. Once an award has been moved to a user's section of the user database 1110, that user has numerous options regarding their award. The user can choose to donate the award, redeem the award, trade the award, sell the award, or gift the award. Whenever a user accesses the award to review it or take any of the five listed actions, the distributed ledger 1501 can be annotated.

Step 1609 of the method 1600 can include annotating the distributed ledger 1501 with a continuing action. A continuing action can include, reviewing, accessing, trading, selling, gifting, or combinations thereof. Trading, selling, and gifting an award are all continuing actions that a user can take that changes ownership of the award such that the award can still be redeemed later. When any of these three actions are taken, the central processing server 740 can move the award to the new user's account and make one or more annotations on the distributed ledger 1501. The one or more annotations can include the previous owner's Player Number, the new owner's Player Number, the action taken, the date, the time, the Award Number, or combinations thereof. In some embodiments, the central processing server 740 can make one annotation with all the information and categories desired; while in other embodiments, the central processing server 740 can make one annotation for the previous owner, and associated information, and a second annotation for the new owner, and associated information. Once the award has been moved to the new owner, the distributed ledger 1501 can continue, with the central processing server 740 annotating the distributed ledger 1501 each time the award is accessed. Step 1609 can be repeated any number of times before Step 1610 is taken.

Step 1610 of the method 1600 can include annotating the distributed ledger 1501 with a closing action. Donating an award and redeeming an award are closing actions; that when taken will close the branch of the distributed ledger 1501 for the award. When a user chooses to donate the award, the system can view the associated value of the award and the donation value. The user can then either choose a charitable organization to make the donation to or choose to donate to the selected charitable organization of their favorite sports team. The central processing server 740 can annotate the distributed ledger 1501 with the date, time, Player Number, Award Number, and/or the charitable organization. Donating awards closes the loop for the award as there is no longer an award available for redemption and so the portion of the distributed ledger 1501 can be closed. When a user chooses to redeem the award, the method described above can be followed. After the award is redeemed by the user, the central processing server 740 can annotate the distributed ledger 1501. Redeeming the award closes the loop for the award and so the portion of the distributed ledger 1501 can be closed. In embodiments where the distributed ledger 1501 is a blockchain, a block can be added to the chain each time the distributed ledger 1501 is annotated. When a user donates or redeems the award and the loop is closed, the branch of the blockchain for that award can end and no new blocks added to that chain.

Figure 18:
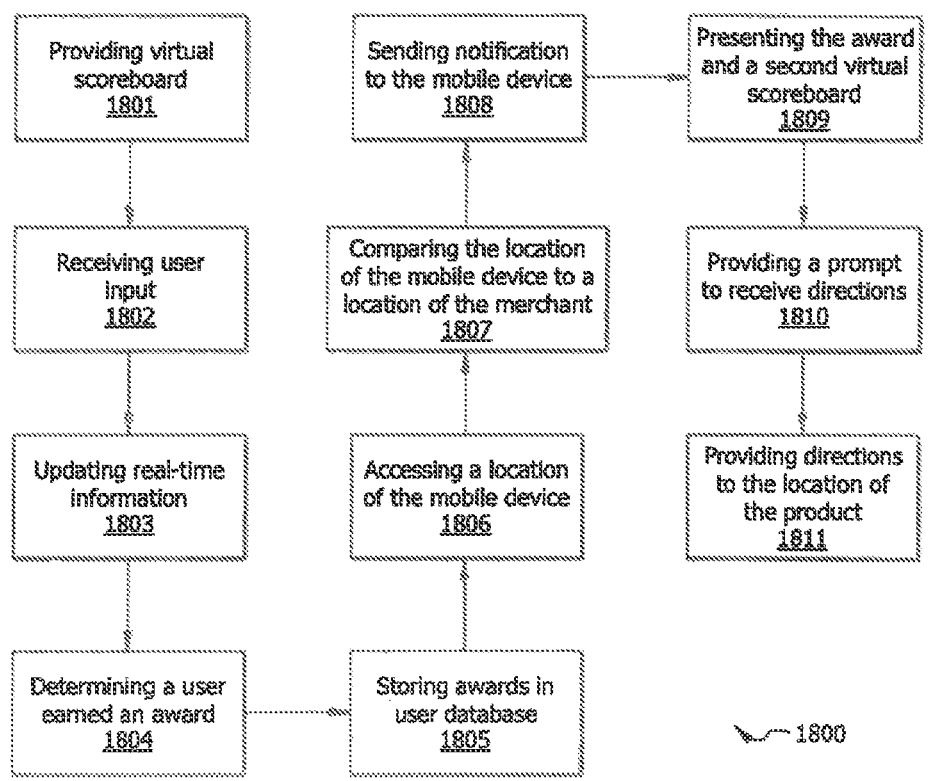
FIG. 18 illustrates a flow diagram of a system for keeping a user engaged with a mobile application according to an embodiment of the disclosure.

Method Using Mobile Device Location to Improve Fan Engagement with the Mobile Application FIG. 18 depicts a method 1800 according to an embodiment of the system for keeping a user engaged with a mobile application 1700 according to FIG. 17. The method 1800 can include providing a virtual scoreboard 110 configured to display real-time information, receiving user input, updating the real-time information, determining the user has earned one or more awards based on the user input, and performing encrypted award redemption. The award redemption process can be completed after the awards are earned by using the system for keeping a user engaged with a mobile application, encouraging further interaction with the application at a later time. The system for keeping a user engaged with a mobile application and all its components appear in the method 1800 as described in FIG. 17. The system for keeping a user engaged with a mobile application 1700 can have one or more mobile devices 900, the method will describe one of the one or more mobile devices 900a.

Step 1801 of the method 1800 can include providing a virtual scoreboard 110 with a graphical user interface (GUI) on the one or more mobile devices 900. The central processing server 740 can provide the virtual scoreboard 110 that can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard 110 can change depending on the sport or event that is being represented at a given moment.

Step 1802 of the method 1800 can include receiving user input for at least one of the plurality of units of gameplay from the mobile device. The input can be a numeral corresponding to a score or statistic for a team or player the user is predicting will occur in the selected unit of gameplay. The central processing server 740 can receive input guesses for units of gameplay for prescribed time limits before the units of gameplay. The received guesses can then be presented on the GUI to the user, so the user is able to see input guesses.

Step 1803 of the method 1800 can include polling one or more data sources 648 for updates to the real-time information. As described above, the system for keeping a user engaged with a mobile application can be connected to event databases 765 that can serve as the one or more data sources 648. The event databases 765 can have the most up to date statistics for the sporting or rules-based event that is the subject of the system for keeping a user engaged with a mobile application. The central processing server 740 can poll at certain time intervals, such as every one second, to keep refreshing the information shown in the virtual scoreboard 110. If a user has guesses in multiple events at the same time, the central processing server 740 can poll the event database 765 for each of the events a user has input for.

Step 1804 of the method 1800 can include determining a user earned one or more awards, associated with one or more merchants, based on input for one or more of the plurality of gameplay units. In certain embodiments, awards are earned if the user correctly guessed the score or a statistical value for one or more of the plurality of gameplay units. In other embodiments, an award can be earned by the user or users whose input guess is the closest to the correct score or statistical value for one or more of the plurality of gameplay units.

In embodiments where the closest score earns an award, the central processing server 740 can receive the user input from each of the one or more mobile devices 900 that selected the same rules-based event. The central processing server 740 can then compare all of the user input to the real-time information to determine the user or users whose input was the closest to the actual value for the score and each statistical value for each of the plurality of gameplay units. The central processing server 740 can set a minimum number of user inputs received before an award is issued in embodiments where the closest user input earns an award.

Step 1805 of the method 1800 can include storing the one or more earned awards in a user database 1110. Once a user has earned one or more awards, the central processing server 740 can store the one or more earned awards in the user database 1110, until the user is ready to redeem the one or more awards. The user database 1110 can store the one or more awards in a section of memory partitioned for the specific user who earned those awards. This partitioning can allow the central processing server 740 to quickly retrieve information from the database based on the user that is requesting. Storing the earned awards in the user database 1110 can prevent them from being tampered with. The awards can appear "locked" on the GUI to restrict a user's access to any earned awards unless the encrypted redemption process is completed, ensuring security.

Step 1806 of the method 1800 can include accessing a location of one of the one or more mobile devices 900a. In embodiments of the disclosure the central processing server 740 can access the GPS module 1701 of the mobile device 900a. When the mobile device 900a first downloads the application of the system, the application can prompt the user for permission to access the GPS and location of the mobile device 900a. When the user accepts the prompt, the central processing server 740 can pull the location of the mobile device 900. In other embodiments, the central processing server 740 can send a message to the mobile device 900a to access the location. In the embodiment where the central processing server 740 sends a message, the central processing server 740 may not have as up to date and continuous location data.

Step 1807 of the method 1800 can include comparing the location of the mobile device 900a to a location of the merchant server 651*a* associated with the merchant. The plurality of awards stored in the user database 1110 can be associated with a specific merchant. The central processing server 740 can store one or more locations for each of the plurality of merchants. After the step of accessing the mobile device's 900*a* location, the central processing server 740 can compare the accessed location of the mobile device 900*a* to the one or more locations of the merchant associated with the award. The central processing server 740 can determine the distance between the location of the mobile device 900*a* and the location for the merchant.

Step 1808 of the method 1800 can include sending a notification to the mobile device 900*a* when the mobile device is within a specified distance of a merchant location associated with the award. Each of the plurality of merchants can set a specified distance for associated awards. If a merchant does not set a specified distance, the central processing server 740 can have default distances based on the merchant and the type of award. For example, if an award was a free burger from a local restaurant, the restaurant could set the distance to five miles. When the central processing server 740 determines a mobile device 900*a* that has the free burger award in the user database 1110 is within 5 miles of the local restaurant, the central processing server 740 can send a notification to the mobile device 900*a*. The notification can include the award, name of the merchant, distance away, prompt for navigation, prompt to silence, or combinations thereof.

Step 1809 of the method 1800 can include presenting the award and a second virtual scoreboard 110 for a rules-based event when the notification is selected. When a user selects the notification on their mobile device 900*a*, the user can be presented with a page in the application that shows the award details and virtual scoreboard 110 for a current or upcoming rules-based event. The second virtual scoreboard 110 can be selected by the central processing server 740 based on the user's history, an event with awards from the same merchant as the award in the notification, an event with a similar award to the award in the notification, or combinations thereof. The second virtual scoreboard 110 can be provided to encourage the user to continue interacting with the system for keeping a user engaged with a mobile application 1700 by providing a virtual scoreboard 110 for a current or upcoming rules-based event the user might be interested in. The award details can include the award, name of the merchant, distance away, prompt for navigation, prompt to silence, or combinations thereof.

Optional step 1810 of the method 1800 can include providing a prompt on the display of the mobile device 900*a* to receive directions. The central processing server 740 can send a prompt to the mobile device 900*a*, that can then be displayed on the display of the mobile device 900*a*. The notification and the award details can both include a prompt to receive directions to the merchant associated with the award. When the user selects the prompt, the central processing server 740 can send the address associated with the award to a navigation application of the user's choice. If more than one navigation application is present on the mobile device 900, the prompt may ask the user to select one navigation application to use.

Optional step 1811 of the method 1800 can include providing directions to the product associated with the award. Each location of the merchant can save a map or directions within the location of the merchant to the merchant server 651. If a user selects the prompt on the mobile device 900*a* to receive directions to the product, the central processing server 740 can send a message to the merchant server 651 requesting the map or directions. After the central processing server 740 receives the map or directions, the central processing server 740 can send the map or directions to the mobile device 900*a*.

Figure 19:
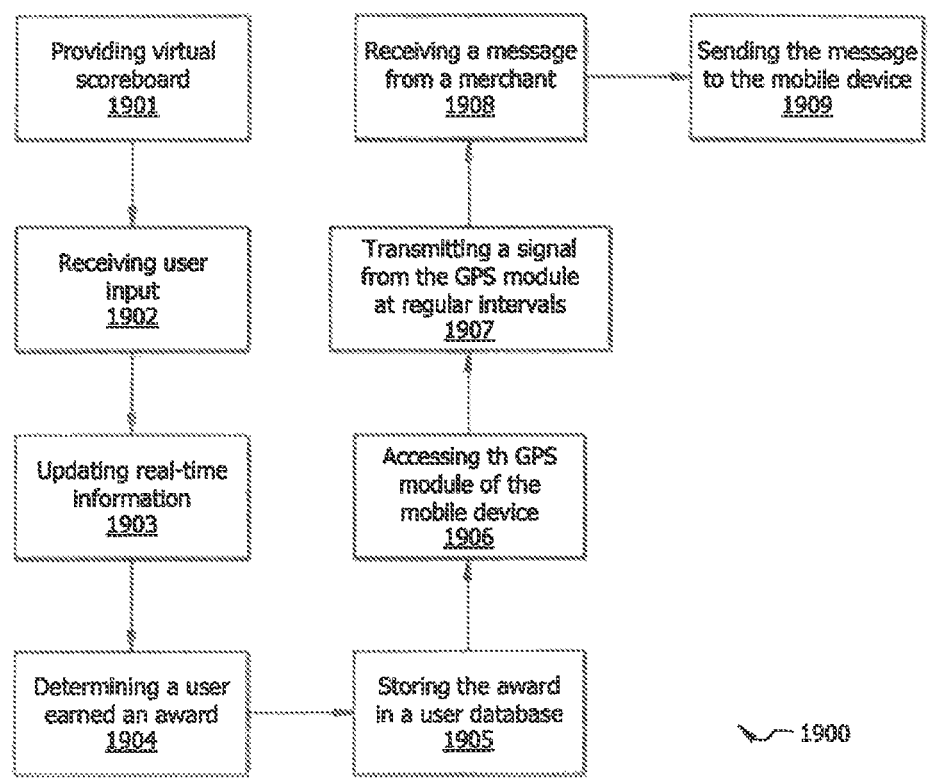
FIG. 19 illustrates a flow diagram of a system for keeping a user engaged with a mobile application according to an embodiment of the disclosure.

Method Using Mobile Device Location to Improve Fan Engagement with the Mobile Application FIG. 19 depicts a method 1900 according to an embodiment of the system for keeping a user engaged with a mobile application according to FIG. 17. The method 1900 can include providing a virtual scoreboard 110 configured to display real-time information, receiving user input, updating the real-time information, determining the user has earned one or more awards based on the user input, and accessing a GPS module of the one or more mobile devices 900, and transmitting a signal to the plurality of merchant servers 651*a-n*. The system for keeping a user engaged with a mobile application 1700 and all its components appear in the method 1900 as described in FIG. 17. The system for keeping a user engaged with a mobile application 1700 can include one or more mobile devices 900, the method 1900 will be described in relation to one of the one or more mobile devices 900*a*.

Step 1901 of the method 1900 can include providing a virtual scoreboard 110 with a graphical user interface (GUI) on a mobile device. The central processing server 740 can provide the virtual scoreboard 110 that can be configured to display real-time information and accept user input for a plurality of units of gameplay related to the real-time information within a prescribed time limit. The real-time information displayed can be related to a sporting event, election, or other rules-based event. The plurality of gameplay units can include quarters, innings, sets, periods, laps, rounds, races, stages, halves, cycles, other specified periods of counting time, or combinations thereof. The prescribed time limit can be any amount of time set before the unit of gameplay begins. Users can input their guesses for scores, outcomes, statistics, other occurrences, or combinations thereof to occur within the specified unit of gameplay. The rows and columns in the virtual scoreboard 110 can change depending on the sport or event that is being represented at a given moment.

Step 1902 of the method 1900 can include receiving user input for at least one of the plurality of units of gameplay input from the mobile device. The input can be a numeral corresponding to a score or statistic for a team or player the user is predicting will occur in the selected unit of gameplay. The central processing server 740 can receive input guesses for units of gameplay for prescribed time limits before the units of gameplay The received guesses can then be presented on the GUI to the user, so the user is able to see input guesses.

Step 1903 of the method 1900 can include polling one or more data sources 648 for updates to the real-time information. As described in FIG. 7, the system for keeping a user engaged with a mobile application can be connected to event databases 765 that can serve as the one or more data sources 648. The event databases 765 can have the most up to date statistics for the sporting or rules-based event that is the subject of the system for keeping a user engaged with a mobile application. The central processing server 740 can poll at certain time intervals, such as every one second, to keep refreshing the information shown in the virtual scoreboard 110. If a user has guesses in multiple events at the same time, the central processing server 740 can poll the event databases 765 for each of the events a user has input for.

Step 1904 of the method 1900 can include determining a user earned one or more awards, associated with one or more merchants, based on input for one or more of the plurality of gameplay units. In certain embodiments, awards are earned if the user correctly guessed the score or a statistical value for one or more of the plurality of gameplay units. In other embodiments, an award can be earned by the user or users whose input guess is the closest to the correct score or statistical value for one or more of the plurality of gameplay units.

In embodiments where the closest score earns an award, the central processing server 740 can receive the user input from each of the one or more mobile devices 900 that selected the same rules-based event. The central processing server 740 can then compare all of the user input to the real-time information to determine the user or users whose input was the closest to the actual value for the score and each statistical value for each of the plurality of gameplay units. The central processing server 740 can set a minimum number of user inputs received before an award is issued in embodiments where the closest user input earns an award.

Step 1905 of the method 1900 can include storing the one or more earned awards in a user database 1110. Once a user has earned one or more awards, the central processing server 740 can store the one or more earned awards in the user database 1110, until the user is ready to redeem the one or more awards. The user database 1110 can store the one or more awards in a section of memory partitioned for the specific user who earned those awards. This partitioning can allow the central processing server 740 to quickly retrieve information from the user database 1110 based on the user that is requesting. Storing the earned awards in the user database 1110 can prevent them from being tampered with. The awards can appear "locked" on the GUI to restrict a user's access to any earned awards unless the encrypted redemption process is completed, ensuring security.

Step 1906 of the method of 1900 can include accessing the GPS module 1701 of one of the mobile devices 900*a*. When the mobile device 900*a* first downloads the application of the system, the application can prompt the user for permission to access the GPS module 1701 and location of the mobile device 900*a*. When the user accepts the prompt, the central processing server 740 can pull the location of the mobile device 900*a*. In other embodiments, the central processing server 740 can send a message to the mobile device 900 to access the location. In the embodiment where the central processing server 740 sends a message, the central processing server 740 may not have as up to date and continuous location data. By accepting the permission, the mobile device 900*a* can also grant the central processing server 740 access and control of the GPS module 1701.

Step 1907 of the method 1900 can include instructing or controlling the GPS module 1701 of the mobile device 900*a* to transmit a signal to one or more of the plurality of merchant services 651*a*-*n*. Upon receiving the instruction or control from the central processing server 740, the GPS module 1701 of the mobile device 900 can transmit the signal from the mobile device 900*a* to the one or more of the plurality of merchant servers 651*a*-*n*. The central processing server 740 can cause the GPS module 1701 to transmit a signal at a regular interval, also known as a ping, wherein the signal can be at a specific frequency or be encrypted so that it is only received by the plurality of merchant servers 651*a*-*n*. The interval can be every thousandth of a second, every second, every ten seconds, and/or anywhere in between. The interval should be regular to allow a process similar to the Doppler Effect. In embodiments, the central processing server 740 can send a message to the mobile device 900*a* that instructs the mobile device 900*a* to transmit the signal when the GPS module 1701 of the mobile device 900*a* determines that the mobile device 900*a* is moving. The plurality of merchant servers 651*a*-*n* can be configured to receive the signal from the mobile device 900*a*, and using an algorithm similar to the Doppler Effect, determine the speed and direction the mobile device 900*a* is moving.

Step 1908 of the method 1900 can include receiving a message from one of the one or more merchant servers 651*a*, wherein the message contains directions to a location of the merchant. If one of the merchant servers 651*a* of the plurality of merchant servers 651*a*-*n* detects that the mobile device 900*a* is moving towards the merchant server 651*a*, the merchant server 651*a* can send a message to the central processing server 740. The message can include the merchant location, a prompt for directions, upcoming awards from the merchant, other sales or deals available from the merchant, upcoming rules-based events, or combinations thereof. In certain embodiments, more than one merchant can be in the direction the mobile device 900*a* is moving. In these embodiments, the merchant servers 651*a*, 651*b*, can both send a message to the central processing server 740. This process can include as many of the one or more merchant servers 651*a*-*n* determining the mobile device 900 is moving towards a location of the one or more merchant servers 651*a*-*n*.

Step 1909 of the method 1900 can include sending the message to the mobile device 900*a*. Once the central processing server 740 has received a message from a merchant server 651*a*, the central processing server 740 can send that message to the mobile device 900*a*. In embodiments where more than one merchant server 651*a*, 651*b*, sent a message, the central processing server 740 can send all messages received to the mobile device 900*a*.

As indicated above, aspects of the method pertain to specific "method functions" implementable through various computer systems. In an alternate embodiment, the method may be implemented as a computer program product for use with a computer system. Programs defining the functions of the present method can be delivered to a computer in many forms, which include, but are not limited to (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network, a telephone network, a public network like the Internet. It should be understood, therefore, that such media, when carrying computer readable instructions that direct the method functions of the present method, represent alternate embodiments of the present method.

The systems and methods may be embodied in other specific forms without departing from the spirit or essential characteristics thereof. The present embodiments are therefore to be considered in all respects as illustrative and not restrictive. Accordingly, the scope of the system and method is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than recited unless the particular claim expressly states otherwise.

ADDITIONAL EMBODIMENTS

Embodiment A1 is a method for providing a virtual scoreboard with a graphical user interface on a mobile device, displaying real-time information on the virtual scoreboard, receiving from the mobile device a user input for at least one of a plurality of units of gameplay within a prescribed time, wherein the plurality of units of gameplay are related to the real-time information, polling one or more data sources for updates to the real-time information; determining a user earned an award, associated with a merchant, based on the user input, and performing encrypted award redemption with a merchant server for the award.

Embodiment A2 is the method of embodiment A1, wherein performing encrypted award redemption comprises storing the award in a user database; receiving a request from an application on the mobile device to redeem the award; performing a location check of the mobile device; verifying a mobile device location matches a location for a point-of-sale device associated with the merchant server; retrieving the award the user database; sending a redemption token to the merchant server; receiving an encrypted information packet from the merchant server; transmitting the encrypted information packet through the mobile device to a point-of-sale device of the merchant; removing the award at were redeemed from the user database; and sending a message to an award database indicating the award has been redeemed.

Embodiment A3 is the method of embodiment A2, wherein the award database is configured to send a message to a merchant server associated with the award, that the award has been redeemed.

Embodiment A4 is the method of embodiment A2, wherein the application displays the encrypted information packet as a scannable code on a display of the mobile device.

Embodiment A5 is the method of embodiment A2 wherein the point-of-sale device can be one of a tablet, a mobile phone, a barcode scanner, or combinations thereof.

Embodiment A6 is the method of embodiment A1 wherein the award cannot be redeemed unless the mobile device is present at a location of a point-of-sale device associated with the merchant.

Embodiment B1 is a system for providing an interactive fan engagement experience, the system comprising: a central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; and communicate with a merchant server associated with the award to redeem the award; and a user database configured to communicate with the central processing server.

Embodiment B2 is the system of embodiment B1, wherein the central processing server is configured to communicate with a point-of-sale device of the merchant server.

Embodiment B3 is the system of embodiment B1, wherein the user database is configured to send and receive encrypted information between the merchant server and the central processing server.

Embodiment B4 is the system of embodiment B1, wherein the central processing server can remove the award from the user database and leave a record detailing the award and associated redemption date.

Embodiment C1 is a method for providing a virtual scoreboard with a graphical user interface on a mobile device; displaying real-time information on the virtual scoreboard; receiving from the mobile device a user input for at least one of a plurality of units of gameplay within a prescribed time limit, wherein the plurality of units of gameplay are related to the real-time information; polling one or more data sources for updates to the real-time information; determining a user earned an award, associated with a merchant, based on the user input for one or more of the plurality of units of gameplay; providing a digital marketplace for users to trade earned rewards; requiring at least two mobile devices involved in a trade to confirm the trade; and during the step of requiring, displaying the updates to the real-time information.

Embodiment C2 is the method of embodiment C1, wherein the digital marketplace allows a user to create a list of earned awards for trade, create a list of awards the user desires, set a price for earned awards, and purchase awards from other users.

Embodiment C3 is the method of embodiment C2, before the step of requiring, further comprising: comparing a plurality of lists of earned awards for trade and a plurality of lists of awards the user desires; determining a list of the plurality of lists of earned awards for trade and a list of the plurality of lists of awards the user desires match; sending a trade proposal to a first mobile device and a second mobile device, wherein the trade proposal includes at least one award from the list of the plurality of lists of earned awards for trade and at least one award from the list of the plurality of lists of awards the user desires; and sending a confirmation to a first mobile device and a second mobile device.

Embodiment C4 is the method of embodiment C1 before the step of requiring, further comprising receiving a trade proposal from a first mobile device, wherein the trade proposal includes at least one award for trade; sending the trade proposal to a second mobile device; and sending a confirmation to the first mobile device.

Embodiment C5 is the method of embodiment C1 before the step of requiring, further comprising receiving a trade proposal from a first mobile device and a second mobile device, wherein the trade proposal includes at least one award of the first mobile device and at least one award of the second mobile device; and sending a confirmation to the first mobile device and the second mobile device.

Embodiment D1 is a system for providing an interactive fan engagement experience, the system comprising: a central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information and is configured to accept user input for a plurality of units of gameplay related to the real-time information within a prescribed time limit; receive and present, via the application, the user input for a plurality of units of gameplay, wherein the user input comprises a numeral from the one or more mobile devices; poll one or more data sources for updates to the real-time information; determine the user input matches the real-time information for one or more of the plurality of units of gameplay; and distribute an award for matching input; provide a digital marketplace, configured to allow users to trade earned awards; complete a trade between users who have agreed to trade earned awards; and a user database configured to communicate with the central processing server; wherein to complete a trade, the central processing server requires at least two mobile devices to confirm the trade.

Embodiment D2 is the system of embodiment D1, wherein users can set for trade award lists and searching for award lists.

Embodiment D3 is the system of embodiment D2, wherein the central processing server compares one or more for trade award lists and one or more searching for award lists to match users creating a trade proposal that is sent to each user.

Embodiment E1 is a method for providing a virtual scoreboard with a graphical user interface on a mobile device; generating a player registration number associated with a mobile device and annotating the player registration number on a distributed ledger; displaying real-time information on the virtual scoreboard; receiving from the mobile device a user input for at least one of a plurality of units of gameplay within a prescribed time limit, wherein the plurality of units of gameplay are related to the real-time information; polling one or more data sources for updates to the real-time information; generating one or more Award Numbers and annotating the one or more Award Numbers on the distributed ledger; determining a user earned an award, associated with a merchant, based on input for one or more of the plurality of units of gameplay; annotating the award and the player registration number associated with the user on the distributed ledger; and providing a digital marketplace configured to allow users to donate awards, trade awards, gift awards, sell awards, buy awards, redeem awards, and combinations thereof; wherein the distributed ledger is used to track the award and the distributed ledger is annotated each time the award is accessed or moved.

Embodiment E2 is the method of embodiment E1, wherein the distributed ledger is a blockchain.

Embodiment E3 is the method of embodiment E1, wherein the distributed ledger can close if the user donates the award or redeems the award.

Embodiment E4 is the method of embodiment E1, wherein the step of annotating the distributed ledger includes annotating the distributed ledger with time the award was won, date the award was won, player registration number, Award Number, and combinations thereof.

Embodiment F1 is a system for providing an interactive fan engagement experience, the system comprising: a central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information and is configured to accept user input for a plurality of units of gameplay related to the real-time information within a prescribed time limit; receive and present, via the application, the user input for a plurality of units of gameplay, wherein the user input comprises a numeral from the one or more mobile devices; poll one or more data sources for updates to the real-time information; determine the user input matches the real-time information for one or more of the plurality of units of gameplay; distribute an award for matching input; and provide a digital marketplace configured to allow users to donate awards, trade awards, gift awards, sell awards, buy awards, redeem awards, and combinations thereof; a user database configured to communicate with the central processing server; and a distributed ledger networked with the central processing server, wherein the central processing server can annotate player registration numbers, Award Numbers, continuing actions, closing actions, and combinations thereof on the distributed ledger.

Embodiment F2 is the system of embodiment F1, wherein each award has a 25-digit Award Number, that is annotated on the distributed ledger.

Embodiment F3 is the system of embodiment F1, wherein the central processing server generates a player registration number for each mobile device.

Embodiment G1 is a method for providing a virtual scoreboard with a graphical user interface on a mobile device; displaying real-time information on the virtual scoreboard; receiving from the mobile device a user input for at least one of a plurality of units of gameplay within a prescribed time, wherein the plurality of units of gameplay are related to the real-time information; polling one or more data sources for updates to the real-time information; determining a user earned an award, associated with a merchant, based on the user input; accessing a location of the mobile device; sending a notification to the mobile device when the mobile device is within a specified distance of a merchant location associated with the award; and presenting the award and a second virtual scoreboard for a rules-based event when the notification is selected.

Embodiment G2 is the method of embodiment G1, wherein the rules-based event for the second virtual scoreboard can be chosen based on a user's history.

Embodiment G3 is the method of embodiment G1, before the step of sending, further comprising comparing the location of the mobile device to the merchant location associated with the award.

Embodiment G4 is the method of embodiment G1, after the step of sending, further comprising presenting a prompt allowing the user to get navigation to the merchant location.

Embodiment G5 is the method of embodiment G1 further comprising providing directions at the merchant location to a product that corresponds to the award.

Embodiment H1 is a system for providing an interactive fan engagement experience, the system comprising: a central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; access a location of the mobile device; provide a notification that a location for a merchant associated with the award is close; and provide directions to the location of the merchant; and a user database configured to communicate with the central processing server.

Embodiment H2 is the system of embodiment H1, wherein the central processing server can access the location of the mobile device using a global positioning system of the mobile device.

Embodiment H3 is the system of embodiment H1, wherein the central processing server can access a third-party navigation application to provide directions to the merchant location.

Embodiment I1 is a method for providing a virtual scoreboard with a graphical user interface on a mobile device; displaying real-time information on the virtual scoreboard; receiving from the mobile device a user input for at least one of a plurality of units of gameplay within a prescribed time, wherein the plurality of units of gameplay are related to the real-time information; polling one or more data sources for updates to the real-time information; determining a user earned an award, associated with a merchant, based on the user input; accessing a GPS module of the mobile device; controlling the GPS module of the mobile device to transmit a signal at an interval from the mobile device to one or more merchant servers; receiving a message from one of the one or more merchant servers, wherein the message contains directions to a location of the merchant; and sending the message to the mobile device.

Embodiment I2 is the method of embodiment I1, wherein the message contains one or more of upcoming awards offered by the merchant, other sales offered by the merchant, operating hours of the merchant, or combinations thereof.

Embodiment I3 is the method of embodiment I1, wherein the message includes a virtual scoreboard for a rules-based event offering more awards from the merchant.

Embodiment I4 is the method of embodiment I1, wherein the step of receiving includes receiving at least two messages from the one or more merchant servers.

Embodiment I5 is the method of embodiment I4, after the step of receiving further comprising sending the at least two messages to the mobile device; and receiving a message from the mobile device selecting one of the at least two messages.

Embodiment J1 is a system for providing an interactive fan engagement experience, the system comprising: a central processing server in communication with at least one computer network and an application running on one or more mobile devices, wherein the central processing server is configured to: obtain real-time information from one or more data sources; present, to a user via the application, a virtual scoreboard with a graphical user interface, wherein the virtual scoreboard is configured to display the real-time information; receive from the mobile device a user input for at least one of a plurality of units of gameplay within a prescribed time, wherein the plurality of units of gameplay are related to the real-time information; poll one or more data sources for updates to the real-time information; determine the user input matches the real-time information for one or more of the plurality of units of gameplay; distribute an award for matching input; access a GPS module of the mobile device; receive a message from the one or more merchant servers; and send the message to the mobile device.

Embodiment J2 is the system of embodiment J1, wherein the messages from the one or more merchant servers contains one or more of upcoming awards offered by the merchant, other sales offered by the merchant, operating hours of the merchant, or combinations thereof.

Embodiment J3 is the system of embodiment J1, wherein when the central processing server sends the messages to the mobile device, it presents a virtual scoreboard for a rules-based event with awards offered by the one or more merchants that sent the messages.

What is claimed is:

1. A computer-implemented method comprising:
providing a virtual scoreboard with a graphical user interface on an application on a mobile device,
displaying real-time information on the virtual scoreboard;
receiving from the mobile device a user input for at least one of a plurality of units of gameplay within a prescribed time limit, wherein the plurality of units of gameplay are related to the real-time information;
polling one or more data sources for updates to the real-time information;
determining a target view point on a screen of the mobile device from a plurality of view points that a user looked at the most using gaze tracking; and
moving information on the graphical user interface of the mobile device from a first position to a second position to encourage continued interaction with the virtual scoreboard wherein the second position is the target view point.

2. The method of claim 1, wherein determining comprises:
accessing a camera of the mobile device;
acquiring images of a user through the camera of the mobile device;
detecting facial features of the user through the camera of the mobile device;
determining an estimated position of the center of each eye based on the facial features of the user;
determining viewing angles based on the center of each eye and the angle of the facial features;
calculating an intersection point of the viewing angles of the eyes;
corresponding the intersection point to a position on the graphical user interface of the mobile device, and storing the position as a first view point;
continuously calculating the plurality of view points while the screen of the mobile device is active; and
determining a target view point of the plurality of view points on the graphical user interface of the mobile device, wherein the target view point is the view point from the plurality of view points the user looked at the most.

3. The method of claim 2, wherein the user undergoes a calibration process before using the application, the calibration process comprising:
accessing the camera of the mobile device;
taking an image of a user's face;
providing visuals at specific positions on the screen asking the user to look at the specific positions;
determining the viewing angles and calculating the intersection point at each of the specific positions; and
storing the information for use with the application.

4. The method of claim 2, further comprising:
presenting messages that require interaction from the user; and
determining the viewing angles and the intersection point to a known position of the message to recalibrate the gaze tracking system.

5. The method of claim 1, further comprising:
sending the view points and data displayed on the screen to a server.

6. The method of claim 1, further comprising:
confirming a geographic location of the mobile device using Geographical Positioning System (GPS), Assisted GPS, Differential GPS, Time of Arrival, Enhanced Time of Arrival, Received Signal Strength localization, WIFI, RFID, or combinations thereof.

7. The method of claim 1 further comprising:
providing a virtual scoreboard wherein the virtual scoreboard is configured to display real-time information and is configured to accept user input for a plurality of units of gameplay related to the real-time information within a prescribed time limit, wherein the gaze tracking system can move information on the screen of the mobile device to encourage interaction with the virtual scoreboard.

8. The method of claim 6, wherein the plurality of units of gameplay include quarters, innings, sets, periods, laps, rounds, races, stages, halves, cycles, other specified periods of counting time, or combinations thereof.

9. The method of claim 6, further comprising:
configuring the screen and the information contained thereon based on a specific event and geographic location chosen by the user.

10. The method of claim 1, wherein the application uses a user's application history to present information in a position of the screen with the most view points to encourage the user to continue interacting with the application.

11. The method of claim 2, further comprising:
after the step of detecting facial features, determining 3D positions of the facial features from the images.

12. The method of claim 10, wherein the step of determining 3D positions for a user's face is stored in a database to improve subsequent determination.

13. A system for providing an interactive fan engagement experience, the system comprising:
a central processing server in communication with at least one computer network and an application running on one or more mobile devices, wherein the central processing server is configured to:
obtain real-time information from one or more data sources;
present, via the application, a virtual scoreboard with a graphical user interface, wherein the virtual scoreboard is configured to display the real-time information and is configured to accept user input for a plurality of units of gameplay related to the real-time information within a prescribed time limit;
receive and present, via the application, the user input for a plurality of units of gameplay, wherein the user input comprises a numeral from the one or more mobile devices; and
a gaze tracking system that utilizes a camera of the one more mobile devices, wherein the camera uses one or more images of a user's eyes and facial features to determine a plurality of view points on a screen of the one or more mobile devices a user is looking; and
wherein the application is configured to receive data from the gaze tracking system and change the graphical user interface of application seen by the user to present information to target view points from the plurality of view points determined to be viewed more frequently by the user to encourage continued interaction with the application.

14. The system of claim 13, wherein the one or more mobile devices can include mobile phones, tablets, smart watches, laptops, other computing devices, or combinations thereof.

15. The system of claim 13, further comprising:
a database in communication with the central processing server, configured to receive information from the gaze tracking system.

16. The system of claim 13, wherein the central processing server is further configured to confirm a geographical location of the one or more mobile devices using Global Positioning System (GPS), Assisted GPS, Differential GPS, Time of Arrival, Enhanced Time of Arrival, Received Signal Strength localization, WIFI, RFID, or combinations thereof.

17. The system of claim 13, wherein the central processing server is further configured to:
poll the one or more data sources for updated to the real-time information;
present information and potential awards when the user input matches the real-time information for one or more of the plurality of units of gameplay; and
present an award notification to the user via the application based upon a set of rules in response to the user input relating to the real-time information, and store the award notification in a database for later redemption.

18. The system of claim 13, wherein the gaze tracking system comprises:
executable instructions to determine facial features of a human head from a still image, wherein the executable instructions include determining a location of the center of eyes and viewing angles for the eyes.

19. The system of claim 18, wherein the gaze tracking system comprises:
executable instructions to calculate an intersection point of viewing angles of the user's eyes determined from a still image.

* * * * *